(12) United States Patent
Piszczek et al.

(10) Patent No.: US 8,560,772 B1
(45) Date of Patent: *Oct. 15, 2013

(54) SYSTEM AND METHOD FOR DATA MIGRATION BETWEEN HIGH-PERFORMANCE COMPUTING ARCHITECTURES AND DATA STORAGE DEVICES

(75) Inventors: Michael J. Piszczek, Laurel, MD (US); Cedric T. Fernandes, Columbia, MD (US); Pavan Kumar Uppu, Laurel, MD (US); Manjari Mishra, Rosedale, MD (US); Shivkumar Pandit, Elkridge, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 12/981,013

(22) Filed: Dec. 29, 2010

(51) Int. Cl.
*G06F 12/00* (2006.01)
(52) U.S. Cl.
USPC ............ 711/114; 711/162; 711/170; 711/154
(58) Field of Classification Search
USPC .................................. 711/114, 162, 170, 154
See application file for complete search history.

(56) References Cited

U.S. PATENT DOCUMENTS

| | | | | |
|---|---|---|---|---|
| 5,502,836 | A * | 3/1996 | Hale et al. ...................... | 711/170 |
| 6,052,759 | A * | 4/2000 | Stallmo et al. ................ | 711/114 |
| 6,799,284 | B1 * | 9/2004 | Patel et al. .................... | 714/6.21 |
| 8,463,991 | B2 * | 6/2013 | Colgrove et al. ............. | 711/114 |
| 2003/0237019 | A1 * | 12/2003 | Kleiman et al. ................. | 714/6 |
| 2012/0084506 | A1 * | 4/2012 | Colgrove et al. ............. | 711/114 |

* cited by examiner

*Primary Examiner* — Mardochee Chery
(74) *Attorney, Agent, or Firm* — Rosenberg, Klein & Lee

(57) ABSTRACT

A data migration system between computing architectures and disk drives includes an intermediate data migration handling system having an intermediate data storage module coupled to the computer architecture, and a data controller module including data management software supporting the data transfers between the intermediate data storage module and the disk drives independent of the random I/O activity of the computer architecture. RAID calculations are performed on the data prior to storage in the intermediate storage module, as well as when read therefrom for assuring data integrity, and reconstruction of corrupted data. The data transfer to the disk drives is actuated in a sequence determined by the data management software based on predetermined criteria. The RAID capability is complimented with a real time adaptive RAID stripe size selection depending on the overall capacity of "healthy" components capable of supporting data striping both for RAID 5 and RAID 6 configurations.

33 Claims, 35 Drawing Sheets

FIG. 6

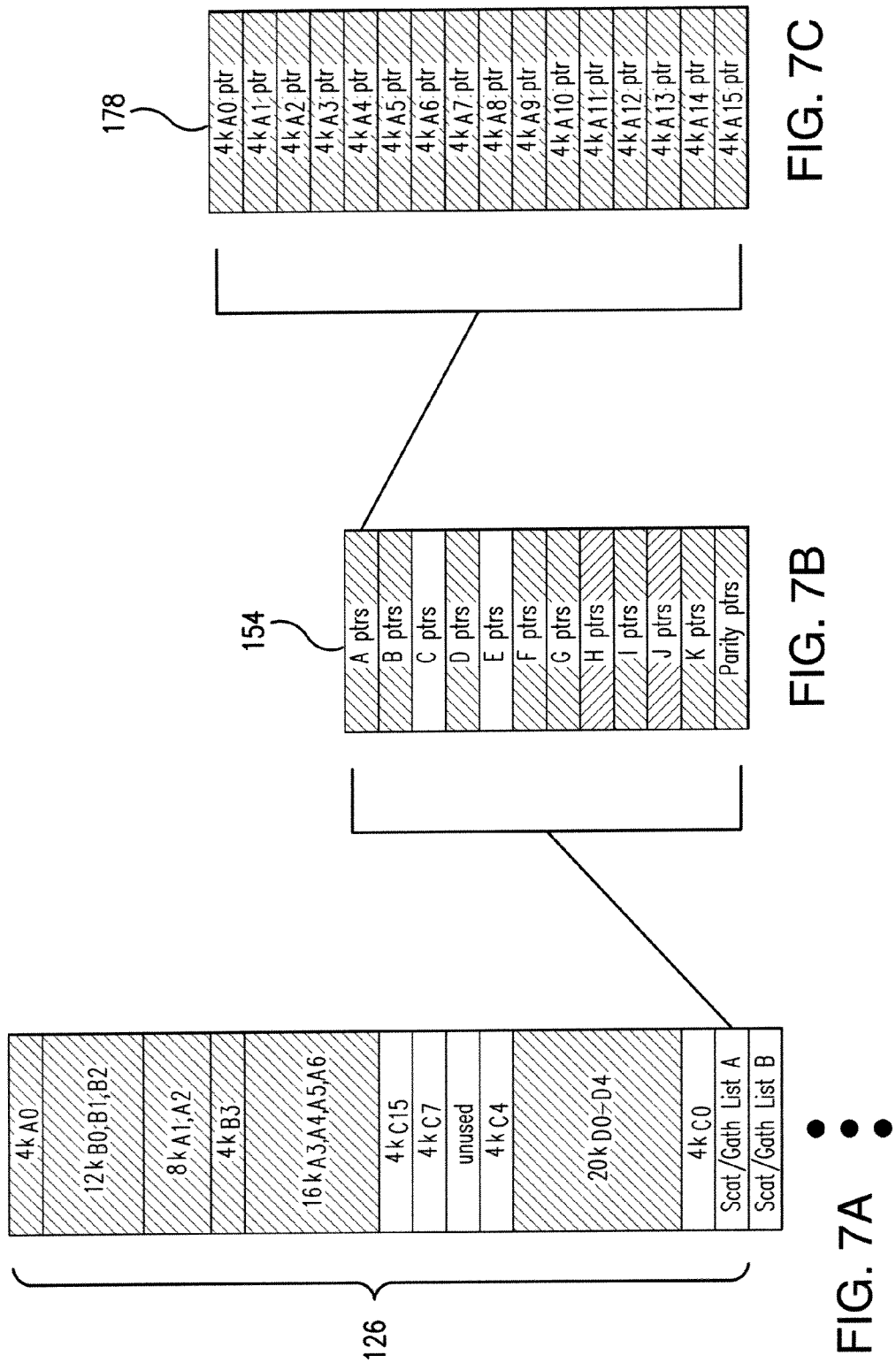

SYSTEM AND METHOD FOR DATA MIGRATION BETWEEN HIGH-PERFORMANCE COMPUTING ARCHITECTURES AND DATA STORAGE DEVICES

FIELD OF THE INVENTION

The present invention is directed to data migration between high performance computing cluster architectures (data generating entities) and data storage disks. Particularly, the present invention relates to a data migration technique rendering an orderly access favored by data storage disks which is decoupled from a randomized input/output (I/O) activity of data generating entities.

In overall concept, the present invention is directed to a system and method for storing data generated by computing architectures which uses an intermediate storage data management entity communicating with a target storage independent of the computing architectures requirements and providing RAID-ed data protection enforced by adaptive RAID stripe selection capability at high ingress speeds, thereby protecting the incoming data generated by the computing architectures in case of a single or two channels failure, depending upon the failure tolerance level configured for the subject system.

More in particular, the present invention is directed to a data migration system employing an intermediate data migration handling system that performs high speed non-volatile data caching with RAID protection into an intermediate data storage layer from data generating devices, and further controls migration of the cached data to a target data storage device in a manner that is most efficient for the target storage devices. The RAID capability of the system is complimented with an adaptive RAID stripe selection routine performed during boot-up and runtime, thereby ensuring data reliability in real time.

The present invention is also directed to a data migration system which employs an intermediate data storage layer in which the data generated by computing cluster architectures are stored in the intermediate data storage layer, and the computing cluster may return from the I/O state to the compute state without idling for access to the target data storage device. In this manner the I/O cycle is minimized and the overall computing architecture's performance is improved. The independent access of the egress data from the intermediate data storage layer to the data storage devices attains bandwidth maximization and power consumption minimization.

The present invention is further directed to a data migration system in which an intermediate data migration handling system, which bridges the data generating architectures and data storage disks, performs RAID (Redundant Array of Independent Disks) calculations on the random ingress data received from the data generating architectures prior to storing the data, thus providing data reliability and preserving data integrity. RAID calculations are also performed when the data is "read" from the intermediate storage layer for data reconstruction of corrupted data and data integrity checking.

In addition, the present invention is directed to a data migration system which uses an intermediate data migration handling system which, in addition to performing the RAID calculations over the random data received from the high speed computer nodes prior to the data storing, also adaptively selects the longest RAID stripe supported by the available healthy channels during the start-up and operation of the system. By adaptively selecting the RAID stripes after a single channel or two channels failure, depending on the RAID algorithm chosen, the subject system provides a mechanism for maintaining the incoming data reliability while permitting reconstruction of the data on the failed channels.

The present system is also directed to a data migration system implemented with an intermediate data storage module containing memory cards, the number of which may be changed in accordance with the size of the data generating architecture and needed memory space, as well as with a controller modular enclosure which houses a data migration controller virtualized on the storage controller of the disks array and RAID software.

The data protection provided by the RAID algorithm with adaptive selection of the RAID stripe is ensured in the system as long as the pre-configured minimum RAID stripe size is maintained during system operation. The number of "healthy" memory entities is chosen to support the block striping of the ingress data across the memory entities. The RAID stripe size is adjusted (e.g. shrunk or grown) within the pre-configured system limits in accordance with the available "healthy" components in the intermediate data storage module.

BACKGROUND OF THE INVENTION

Computer clusters, or groups of linked computers, have been widely used to improve performance over that provided by a single computer, especially in extended computations, for example, involving simulations of complex physical phenomena. Conventionally, in a computer cluster, computer nodes (also referred to herein as client nodes) are linked by a high speed network which permits the sharing of the computers resources and memory. Data transfers to or from the computer nodes are performed through the high speed network and are managed by additional computer devices, also referred to as File Servers. The File Servers file data from multiple computer nodes and assign a unique location for each computer node in the overall file system. Typically, the data migrates from the File Servers to be stored on rotating media such as, for example, common disk drives arranged in storage disk arrays.

The computer cluster may assume either the compute state (or compute cycle) or the input/output (I/O) state (or I/O cycle), which are typically mutually exclusive. The process of moving data is carried out during the I/O cycle of the computer nodes, e.g., the data transfers are executed during time intervals when the computer activity has ceased. Since during the I/O cycle no actual computations occur, it is important to keep the I/O cycle as short as possible to maximize the overall computer duty cycle of the computer cluster.

Since the File Servers satisfy the requests of the computer devices in the order that the requests are received, the disk drives appear to be accessed randomly as multiple computer devices may require access to the servers at random times. In this scheme, disk drives operate as "push" devices, and store the data on demand. Disk drives do not favor the regime of satisfying random requests since the recording heads have to be moved to various sectors of the drive (aka "seeking"), and this "seeking" movement takes a greater amount of time when compared to actual "write" or "read" operations. To "work around" this problem, a large number of disk drives may be utilized that are accessed by a control system (storage controller) which schedules disk operations in an attempt to spread the random activity over a large number of disk drives to diminish the effects of the disk head movement.

The size of computer clusters and the aggregate I/O bandwidths that is to be supported may require thousands of disk drives for servicing the computing architecture in order to minimize the duration of the I/O cycle. The I/O activity itself occupies only a short period of the overall "active" time of the disk system. Even though the duty cycle of write activity may occupy only a portion of the clusters total operational time, all the disk drives nevertheless are powered in expectation of the I/O activity.

Therefore, it is beneficial to provide a data migrating technique between the computing cluster architectures and the disk drives which provides the RAID protection for the data randomly received from the computing cluster architectures complimented with a mechanism for adjusting RAID striping to the number of available "healthy" components, and which attains a shortened I/O cycle of the high performance computer clusters as well as an effective aggregate I/O bandwidths of the disk drives operation provided with a reduced number of disk drives activated for data storage, without excessive power consumption, and simultaneously maintaining data reliability as well as data integrity.

In order to increase data reliability and performance of storage systems, the Redundant Array of Independent Disks (RAID) technology has been customarily used in the industry that provides increased storage reliability through redundancy by combining multiple disk drive components into a logical unit where all drives in the storage disk array are independent. RAID protection contemplates the striping technique to provide greater protection from data loss. In some modifications of the RAID systems, data D is interleaved in stripe units distributed with parity information P across all of the disk drives.

For example, in the RAID 5 scheme, which uses block-level striping with distributed parity, the system distributes parity P along with the data D and requires all drives but one to be present for operation. Drive failure requires replacement, but the array is not destroyed by a single drive failure. Upon drive failure, any subsequent "reads" may be calculated from the distributed parity such that the drive failure is masked from the end user. The array may lose data in the event of a second drive failure and is vulnerable until the data that was on the failed drive is rebuilt onto a replacement drive. A single drive failure in the set will result in reduced performance of the entire set until the failed drive has been replaced and rebuilt.

The RAID 6 scheme uses the block-level striping with double distributed parity $P_1+P_2$, and thus provides fault tolerance from two drive failures. The array continues to operate with up to two failed drives. This makes larger RAID groups more practical, especially for high-availability systems.

The data reliability provided by the RAID striping depends heavily on the availability of "healthy" storage components capable of supporting the stripe size, and, in the case of an insufficient number of reliable storage components for the striping, system performance may suffer.

SUMMARY OF THE INVENTION

It is an object of the present invention to provide a data migration system in which an intermediate data migration handling system is installed between a data generating entity and an array of storage devices (disks) to decouple the random I/O activity favored by the data generating entity from orderly (non-random) data transfers to the data storage disks in a manner optimal for disk exploitation.

It is a further object of the present invention to provide a data migration system and method in which an intermediate data migration handling system, which "bridges" the data computing entities to data storage disks, renders the RAID (Redundant Array of Independent Disks) protection of the data prior to "flushing" the same to the disks.

It is an additional object of the present invention to provide a data migration system which permits data transfer between the data generating entities and disk drives via an intermediate data storage layer that performs high speed non-volatile data caching with RAID protection complimented with an adaptive RAID stripe size selection in accordance with available "healthy" storage components capable of supporting the RAID striping.

It is also an object of the present invention to provide a data migration system with increased data reliability and integrity which includes a virtualized RAID protection mechanism associated with an intermediate data storage layer bridging the computing architectures and target storage disk arrays. This performs RAID calculations on the random data ingress from the computing architectures prior to storing the data in the intermediate data storage layer, as well as on the egress data to the target storage disk arrays for data reconstruction and data integrity checking. The system is enhanced with the capability of adaptively selecting the largest possible RAID stripe supported by available "healthy" channels during booting the system as well as during runtime.

In overall concept, the present invention is directed to a system for data migration between at least one data generating entity and at least one array of data storage units (disks), where the data storage array is controlled by a storage controller. The subject system comprises an intermediate data migration handling system installed between the data generating entity and the array of data storage units to decouple data transfer to the data storage disks from input/output activity of the data generating entity.

The intermediate data migration handling system includes an intermediate data storage module operatively coupled to the data generating entity to store data received therefrom, and at least one data migration controller module operatively coupled between the intermediate data storage module and the array of data storage disks to control data transfer therebetween.

The data migration controller module includes the storage controller of the disk array and a data storage management unit operatively coupled between the intermediate data storage module and the storage controller to generate requests to the storage controller for data transfer between the intermediate data storage module and a designated data storage disk in an optimal manner substantially independent of the input/output activity of the data generating entity based on predetermined conditions of the intermediate data migration handling system and the disk array.

The predetermined conditions may include, but are not limited to the fullness of the intermediate data storage module, time elapsed since a previous I/O activity of the data generating entity, minimization of the usage of the disks, reduction of the "seeking" time for disk drives, and data transfer priority.

The system also may operate in a "pass-through" mode, in which the I/O data requests of the data generating entity may by-pass the intermediate storage and be directly applied to the target storage. When the intermediate data migration controller module determines, (based on pre-configured attributes of the I/O requests), that for efficiency reasons, and/or if the intermediate data storage module has exhausted its storage capacity, a command is issued for switching the system into the "pass-through" mode. In this mode, the incoming "write" requests are transferred directly to the target storage disk(s)

provided that the data integrity is not compromised. This preserves the I/O performance of the system in question as a whole and prevents deadlocks. This scheme permits orderly servicing of data transfer to the target storage disk(s), and allows the intermediate data migration handling layer to adjust and control the peak power requirements of the target storage disk(s), maximize the power savings, and manage the throughput.

The target storage disk(s) that are not used for the scheduled data transfers are spun down or are left in the deactivated state since they are not needed for data migration, thereby further reducing the power consumption in a large target storage environment. The intermediate data migration handling system additionally permits the usage of a lesser number of storage controllers than needed in traditional systems to ingest "checkpoint" data from computer clusters, thereby minimizing the operational cost of the system.

The intermediate data migration handling system provides Redundant Array of Independent Disks (RAID) data protection at high ingress speeds and communicates with the target storage disk(s) independently of the computer node requirements. Thus, a periodic verification of data integrity is performed by running a verification process over the data waiting for "flushing out" in the intermediate data storage module. In the event of detection data corruption within the tolerable limits, the data is reconstructed using redundant information. The reconstructed data is marked with "high flush" priority.

The RAID protection mechanism is enhanced by ability to adaptively select the largest possible RAID stripe which may be supported by available "healthy" memory components in the intermediate data migration data handling system.

Performing the RAID over the computer node's data before storing provides data reliability for single channel failures or two channel failures depending upon whether RAID 5 or RAID 6 is used. By adaptively selecting the RAID stripe after single channel or two channel failures, depending upon the RAID algorithm chosen, the data reliability for new incoming data is maintained while reconstruction of the previous data on the failed channel(s) is also performed. Thus, the adaptive RAID stripe protection in the subject system provides runtime data protection for new incoming compute node data during the I/O cycle.

The protection provided by RAID with adaptive selection of the RAID stripe is ensured as long as pre-configured minimum RAID stripe size is maintained during runtime. The RAID stripe size may shrink and grow within the pre-configured system limits during runtime without requiring the system to go offline. The metadata information is kept up to date reflecting adaptive RAID stripe information and the data stored therein.

The data storage management unit schedules the data transfer activity between the intermediate data storage module and the target storage disk(s). The data storage management unit is software which runs on the data migration controller module. When the intermediate data storage module approaches the predetermined "fullness" (or capacity), or when sufficient time has elapsed since the last I/O cycle of the computer node (or data generating entity), the data storage management unit determines an optimal sequence of "flushing" the data from the intermediate data storage module to the target storage disk(s) based on several criterion such as, for example, flushing priority, minimized tier usage in the disks array, minimized disk "seeking" times, along with bandwidth maximizations. The optimized I/O activity of the target storage disk(s) may further result in power savings at the target disk storage system, when only the disk(s) which is (are) needed for the data transfers are activated.

The data migration controller module includes a virtualized Redundant Array of Independent Disks (RAID) unit contained in the controller modular enclosure in operative connection with the intermediate data storage module and the data storage management unit. The RAID unit is configured to apply RAID calculations to data ingress from the data generating entity prior to "writing" in the intermediate data storage module.

As a part of the RAID calculations, the RAID unit generates parity values for ingress data. The RAID unit allocates space in the intermediate data storage module for the data (D) and the parity values (P).

The RAID unit also performs data reconstruction when "read" requests are serviced when corrupted or lost data is found in the intermediate data storage module. For the reconstruction operation, the RAID unit uses "healthy" redundant data stored in the intermediate data storage module.

The intermediate data storage module houses a number of data storage cards. The number of "healthy" storage cards within the intermediate data storage module is chosen to support RAID striping function of the RAID protection mechanism provided by the intermediate data storage module. If however, one or more storage cards fail(s), the system changes the RAID stripe size in accordance with the number of "healthy" components capable to support the RAID striping function, as long as a pre-configured minimum RAID stripe size is maintained during the runtime.

Each of the data storage cards includes a Dynamic Random Access Memory (DRAM) and Flash Memory Unit, which is formed with a Non-Volatile Random Access Memory (NVRAM) for storing data. The number of the data storage cards in the modular enclosure may vary to correspond to the number of the data generating entities serviced by the intermediate data storage module, as well as to support the striping function of the RAID protection mechanism. The size of the NVRAM may also vary depending on the system requirements, for example, the size of the I/O request, as well as to correspond to the RAID striping.

The system incorporates a Field-Programmable Gate Array (FPGA) Controller residing on each data storage card. The FPGA Controller includes a FPGA controller unit and a Redundant Array of Independent Disks (RAID) FPGA controller unit.

The Flash FPGA Controller unit is operatively coupled between the data generating entities and the Flash Memory unit. The RAID FPGA controller is operatively coupled between the data generating entity and the DRAM block.

The Flash FPGA Controller Unit includes:
a first PCIe interface unit coupled to the front end interface of the respective data storage card,
a Flash Control block operatively coupled to the Flash Memory Unit,
a first Work Order Interface unit coupled, at an input thereof, to the first PCIe interface unit, and at an output thereof, to the Flash Control block to command the data flow to/from the Flash Memory unit as requested by the data generating entity.

The RAID FPGA Controller Unit includes:
a second PCIe interface unit coupled to the front end interface of the data storage card,
a RAID operation block operatively coupled to the DRAM, and
a second Work Order Interface unit operatively coupled between the second PCIe interface unit and the RAID operation block to command the data flow to/from the DRAM unit as requested by the data generating entity.

The RAID operation block includes Parity/Data generation unit, RAID memory, and a Scatter/Gather Point List. The data is read from the DRAM into the RAID operation block for processing. The data read from the DRAM is transferred to the Flash Control block via the first and second PCIe interfaces upon a request issued by the Flash Control Unit. The RAID Parity Data are written into the DRAM as instructed by the second Work Order Interface Unit.

The RAID operation block locates and processes the parity/RAID data in the DRAM as specified by the Scatter/Gather Pointer List. Data are striped across a plurality of Flash Memory cards in the Flash Memory block. The Scatter/Gather Pointer List is placed into said DRAM to define how to reconstruct the fragmented (scattered) data in the DRAM.

An Adaptive RAID Stripe Selection Unit is operatively coupled to the RAID operation block, Flash Memory Unit, and the data storage cards to inspect the "healthy" or "fail" status of the Flash Memory Unit, as well as of the data storage cards, and to "instruct" the RAID operation block accordingly.

The subject system maintains data reliability by performing RAID computations over the computing nodes data in the DRAM before storing the data D, and parity P (or $P_1+P_2$) generated in the intermediate data migration handling system, which may be configured with either RAID D+P (RAID 5) or RAID D+$P_1$+$P_2$ (RAID 6) depending upon the failure tolerance level pre-configured for the system. The redundancy is provided by block striping host data across the data storage entities which is used in data reconstruction in case of errors or failures in the system.

A predetermined number N of data storage cards, e.g., DDN cards, is housed in the intermediate data storage module. The number of the data storage cards may vary as per the system requirements. A predetermined minimum number of data storage cards are used by the Adaptive RAID Stripe Selection Unit for normal operations. A RAID stripe may be defined as N−1 cells from N−1 different data storage cards for data D and 1 (or 2) cell(s) from the $N^{th}$ (or N and N+1) data storage card for parity P (or $P_1+P_2$).

The subject system is capable of adaptively selecting the RAID stripe from the available healthy components at the runtime. The RAID stripe size may grow or shrink according to the available healthy components in the intermediate data storage module, thereby protecting new data incoming data from the computing architectures.

The metadata information is updated to keep track of the dynamically changing RAID stripe size and the members (blocks) constituting the RAID stripe. The components that impact the RAID stripe are data storage cards, (DDN cards), and the Flash Memory cards within the data storage cards in a properly inserted or plugged in data storage card, as well as flash cells within the Flash Memory cards. If the data storage card is not plugged in properly, it is not found and is assumed to be missing during normal operations.

The present invention is also envisioned as a method for data transfer between at least one data generating entity and a plurality of data storage units, for example, a disk array. The method comprises the steps of:

(a) operatively coupling an intermediate data storage module (also referred to herein as a flash node) to at least one data generating entity, (b) operatively coupling at least one data migration controller module between the intermediate data storage module and the disks array. The data migration controller includes a data storage management unit (software) and a storage controller of the disk array.

(c) operatively coupling an Adaptive RAID Stripe Selection Unit to the intermediate data storage module and the data storage management software in the data migration controller module;

(d) sending a "write" request from the data generating entity to the intermediate data storage module during an Input/Output (I/O) cycle of the data generating entity, (e) generating parity values P (or $P_{1+P2}$) to data D at the data migration controller module, (f) polling said intermediate data storage module to find available "healthy" storage components capable to support the RAID striping function of the data migration controller, (g) defining a largest RAID stripe size which may be supported by the "healthy" storage components, and (h) striping the data D and parity values P (or $P_1+P_2$) across the "healthy" storage components in the intermediate data storage module, in accordance with the failure tolerance level, e.g., RAID 5 or RAID 6 configuration of the system.

In accordance with the subject method, upon detection of a single channel failure due to at least one data storage card failure, the software protects "write" requests from the data generating entity by RAID D+P scheme by (adjusting the size of the RAID stripe to the available resources, e.g. by decreasing) the size of said respective RAID stripe by 1; and, upon a "read" command, uses the decreased RAID stripe in data reconstruction.

Upon detection of a multi-channel failure due to the failure of F data storage cards or flash memory cards, the system marks the data priorly stored at the failed F data storage cards or flash memory cards as unavailable, and selects a RAID stripe size corresponding to H=H−F healthy data storage entities for RAID protection of new ingress data.

Upon detection of a flash memory card failure, the system performs the RAID protection of new data by adaptively selecting the size of the RAID stripe corresponding to H=H−1 flash memory cards removing the failed flash memory card from the stripe. Upon a "read" command, the system reconstructs the missing data and then marks the reconstructed data with a high priority for a flush to the data storage units.

Further, upon detection of a flash cell on a respective flash memory card failure, the process selects another flash cell on the respective flash memory card to form the respective RAID stripe, marks the respective flash memory card as failed if no spare healthy flash cells are available, and adaptively changes the size of the respective RAID stripe to H−1.

When the failure of F flash cells on a respective flash memory card is detected, the respective RAID stripe size is updated to H=H−F if no spare healthy flash cells are available on the respective flash memory card, and new ingress data are protected by RAID D+P with the decreased RAID stripe.

In addition, upon failure of F channels, the software selects the size of the respective RAID stripe to correspond to H=H−F healthy data storage entities, where F=1, 2, ... N, and new ingress data are adaptively protected by RAID D+$P_1$+$P_2$ configuration with the decreased RAID stripe as long as H−F X, where X is the minimum number of healthy data storage entities capable of supporting the data RAID striping.

The method further includes the steps of:
upon meeting the predetermined conditions, building, at the data storage management unit, a command for efficient data transfer from the intermediate data storage module to target disk the disk array,
sending a "write" request to the storage controller, and flushing the data D from the intermediate data storage module to the target disk upon receipt of a permission signal from the storage controller.

The method preferably includes also the step of performing a validity check for the "write" request prior to storing the data D and parity P (or $P_1+P_2$) in the intermediate data storage module.

After receiving the "write" request from the data generating entity, the efficiency check is applied to the "write" request by comparing a length of the "write" request to a predefined length for efficiency, and the availability of memory space in the intermediate data storage module for the "write" request is checked.

The data storage management software unit appoints at least one designated data storage unit, determines an optimal sequence of data transfers from the intermediate data storage module, and schedules the data transfer requests in the optimal sequence.

If memory space is not available, or if the "write" request is shorter than the predefined length for efficiency, the data storage management unit switches to a "pass-through" mode, thereby passing the "write" request directly to the storage controller of the disk array.

After "writing" the data D and parity P in the intermediate data storage module, a signal is generated to the data generating entity to switch to the compute state, thereby reducing its I/O cycle.

When sufficient time has elapsed since the last I/O cycle of the computer node, and/or it is determined that the flash node had reached its pre-defined fullness, the data storage management system starts sending efficient write requests to the target storage. If the system is pre-configured to perform data verification then, before sending the "write" requests to the target storage disk(s), data verification is performed. If any corruption is seen, then the intermediate data migration handling system activates a process for reconstruction of the data. Upon the successful reconstruction of the data, the "write" requests are sent to the target storage disk(s). Otherwise, the data remains in the intermediate data storage module and it is marked as unavailable for further use.

The data storage management software unit maintains information about "healthy" and "failed" components and thus helps in the allocation of the RAID stripe resources in the intermediate data storage module. The software also maintains the description of the data contained in a RAID stripe which is used for searching old requests or adding new ones for the I/O requests sent to the intermediate data migration handling system by the data generating architecture.

These and other objects and advantages of the present invention will be readily seen as provided in the following detailed description of the preferred embodiments when taken in conjunction with the Drawing Figures.

BRIEF DESCRIPTION OF THE DRAWINGS

FIG. 6 is a representation of the 64 KB striping of data across Flash Memory cards in an 11+1 RAIDS configuration in the system of the present invention;

FIGS. 7A-7C represent schematically the process of reconstruction of the fragmented data in stage buffer (FIG. 7A), as commanded by the Work Order function (FIG. 7B) in accordance with specifications of the Scatter/Gather Pointer List (FIG. 7C) defining a proper order of fragmented data reconstruction in the system of the present invention;

DETAILED DESCRIPTION OF THE PREFERRED EMBODIMENTS

Figure 1A:
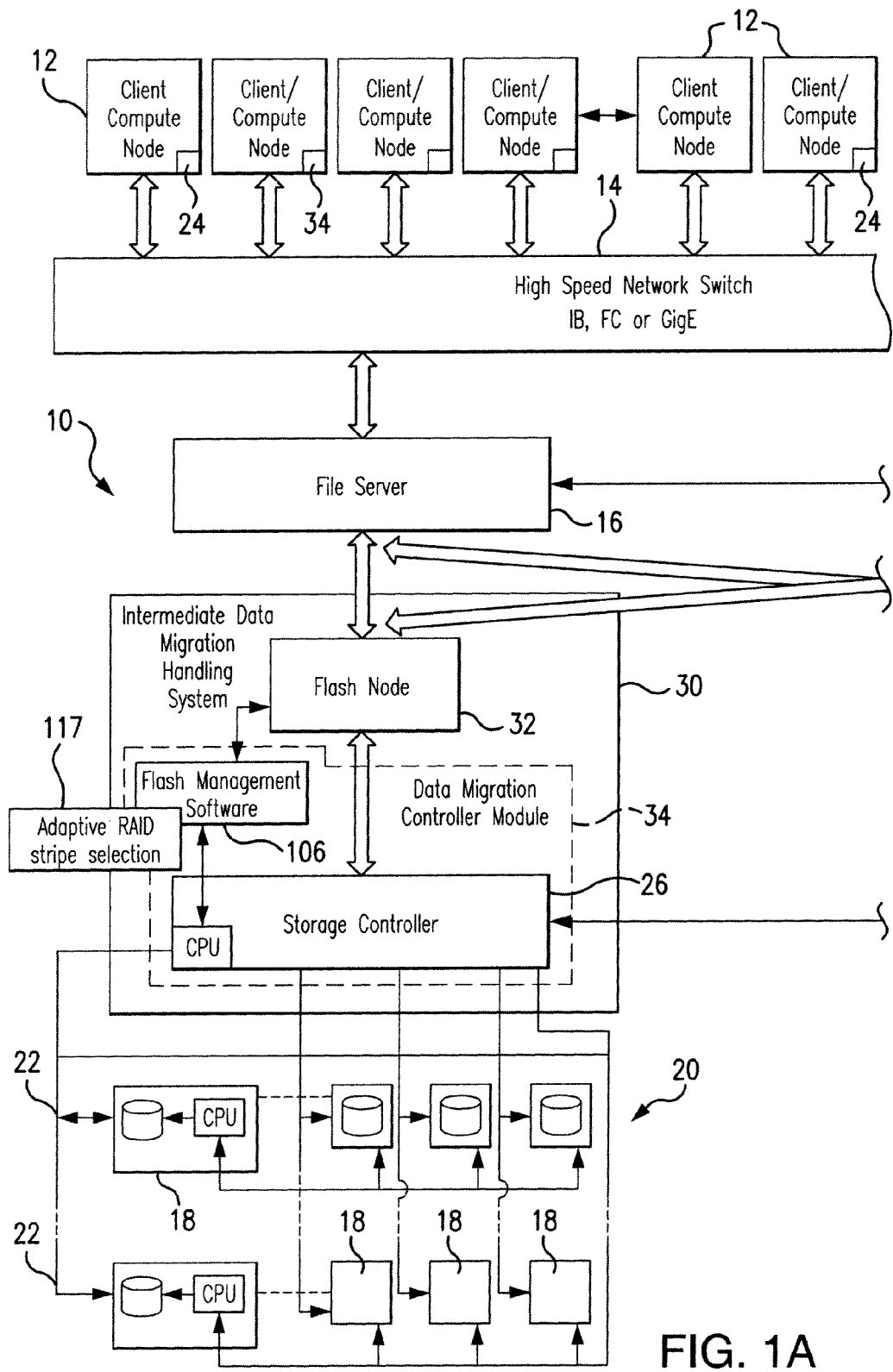
FIGS. 1A-1B represent schematically the data migration system of the present invention employing an intermediate data migration handling system.
Figure 1B:
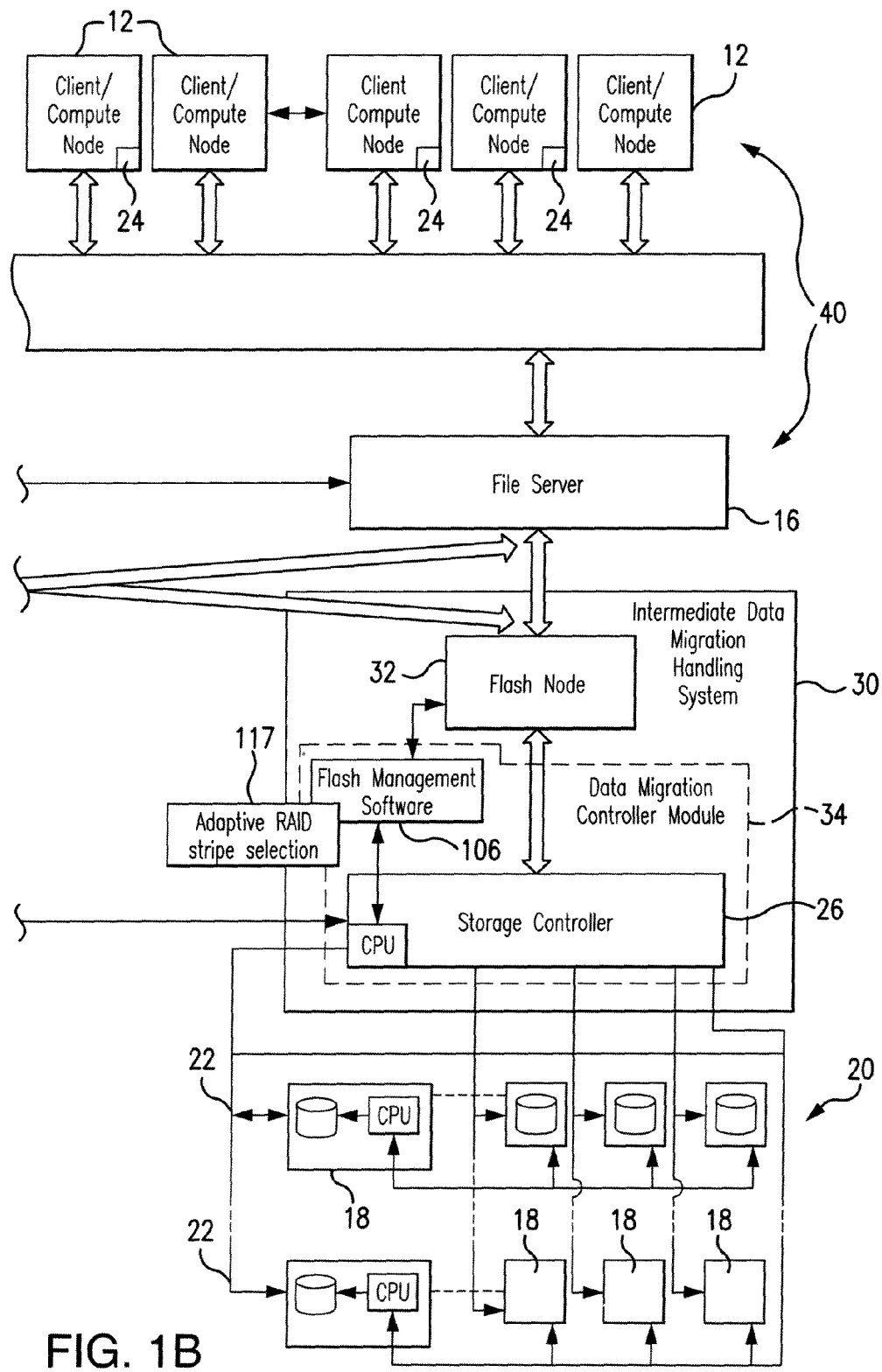

Referring to FIGS. 1A-1B, the system 10 of the present invention includes a number of computer nodes (or client nodes) 12. The computer nodes may be arranged in computing groups, or computer clusters, to perform complex computations of various types. The operation of the computer nodes depends on the system application. They may function as servers, super computing clusters, etc., and have the capacity to "write" by outputting data, as well as "read" from an external memory or any other device. In the present description, the above-presented devices will also be intermittently referenced further as data generating entities, or computing architectures.

The computer nodes 12 are connected through a high speed network 14 to file servers 16 which manage data migration from and to the computer nodes 12. The ratio of the computer nodes 12 to the servers 16 may in some cases be in excess of a thousand. The file servers 16 satisfy requests of the computer nodes 12 in the same order as the requests are received at the file server. Therefore, the file servers receive data from the computer node 12 in a substantially random fashion.

During the input/output (I/O) cycle the computer nodes 12 operation, the data may be transferred from the computer nodes' cache to the file servers which may place data in the file system for subsequent retrieval. The high speed network 14 functions as a high speed switch and is capable of being based on any of the network transport protocols, such as, for example, Infiniband (IB), Fibre Channel (FC), and Gigabit Ethernet (GigE).

The subject system 10 is capable of handling any type of data transfer. However, for the sake of simplicity, and as an example, the following description of the system operation will be presented regarding the "checkpoint" data. The "checkpoint" data is the data which is written into the program during the execution of a simulation, with the purpose of restoration of the simulation from the "checkpoint" in the event the application software or hardware fails.

Data retrieved from computer nodes, and/or file servers (combinably referred to herein also as data generating entities) are intended to be stored on disk drives 18 which may be arrayed in any format shown as storage disk array 20. The storage disk array may be arranged, for example, in the RAID (Redundant Array of Independent Drives) format. The RAID storage system 20 is a multi-dimensional array of disk drives 18 distributed in Read/Write tier groups 22 for storing data D and parity values P corresponding to the data stored in the array. Each tier group 22 in the array 20 constitutes a multiplicity of data disk storage channels.

Each computer node 12 has a software unit 24 which controls the operation of the computer node for the intended purposes and allocates I/O cycles during the execution of the computer node process for the "checkpoint". The "checkpoint" changes the status of the computer node from the computing mode into the I/O cycle when no actual computation takes place. Since the time of the I/O cycle allocated for the checkpoint is waste time from the overall duty cycle of the computer node, it is preferred that the I/O cycles be kept as short as possible in order to improve the computing duty cycle of the computer node.

Preferably, the disk drives 18 are spared from random operations, since in randomly granted access, the heads that record the data on the disks have to move over various sectors of the drive, thus taking a great deal of time (seeking time) compared to the actual write or read operation of the system.

A storage controller 26 controls the operation of the disks in the disk array 20. In the present system, the disk drives 18 are accessed in an optimally sequential manner for the disk drives exploitation, or in another efficient manner providing the uncompromised I/O performance of a storage controller 26 of the storage disk array 20. Disk drives 18 are provided with the capability of receiving data in the most efficient manner so that the system 10 avoids the need for an excessive number of disk drives for storing the "checkpoint" data. Thus, the disks which do not participate in data transfer, may stay deactivated, as controlled by the storage controller 16 for the period they are not accessed. This avoids excessive power consumption of the storage disk arrays 20.

The capability of storing the data at the disk drives in an orderly (or other efficient manner) in the system 10 is provided by utilizing an additional (intermediate) data migration handling system 30 operatively coupled between the computer nodes 12 (through the file servers 16) and the storage disk array 20 to enable an improved duty cycle with a shorter I/O cycle of the computer nodes operation. Additionally, this provides orderly data transfer to the disk drives 18 independently of the I/O cycles of the computer nodes 12. The intermediate data migration handling system 30 acts as a bridge between the highly random I/O activity favored by the computer nodes 12 (as well as by the file servers 16), and the orderly activity favored by the storage disk arrays 20.

The intermediate data migration handling system 30 includes an intermediate data storage module (further referred to herein intermittently as a flash node) 32, coupled to the computer nodes 12 through the file servers 16. The intermediate data migration handling system 30 further includes a data migration controller module 34 operatively coupled between the flash node 32 and the storage disk array 20.

Figure 2A:
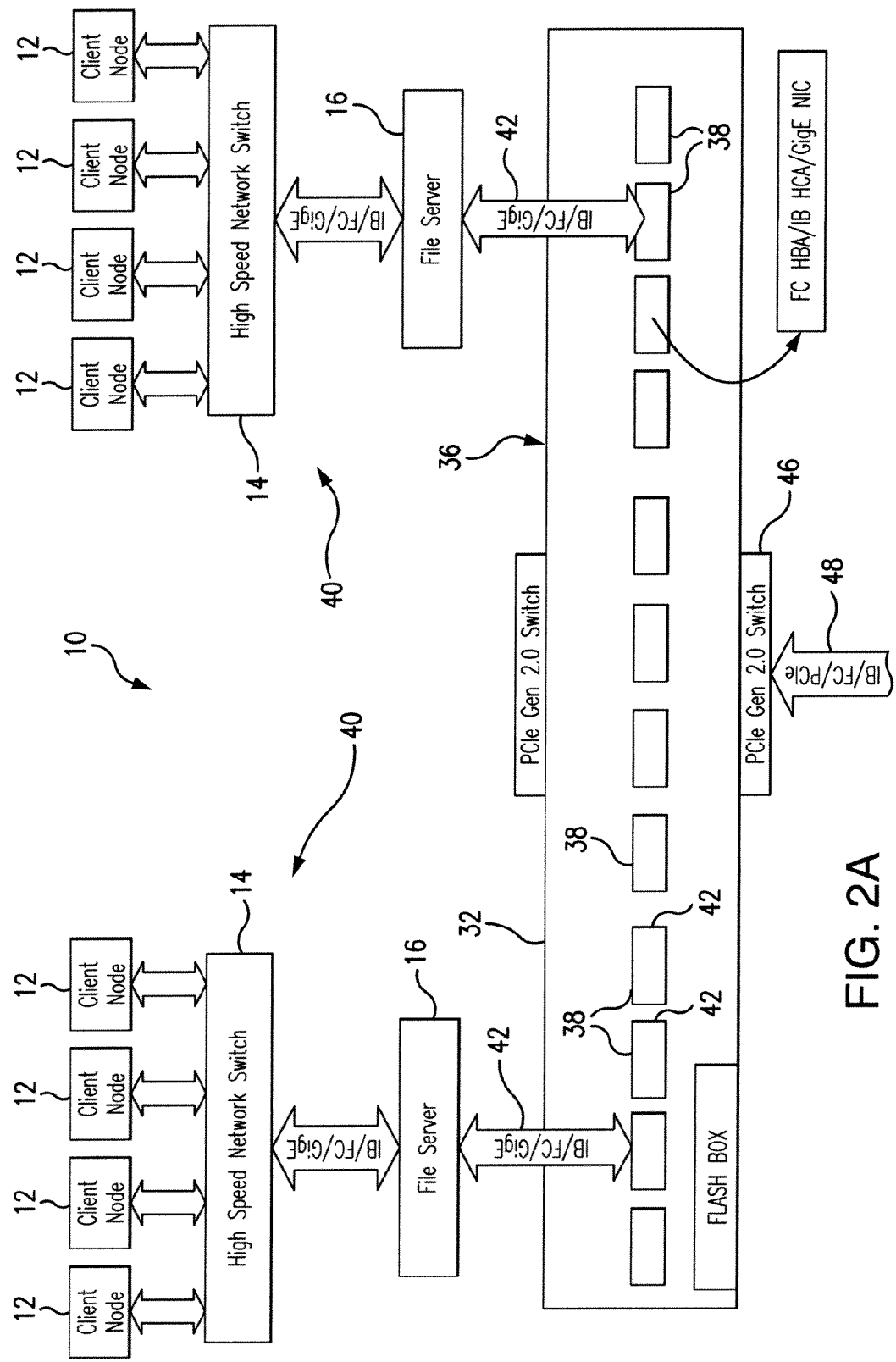
FIGS. 2A-2B represent schematically the subject system showing a modular structure of the intermediate data migration handling system.
Figure 2B:
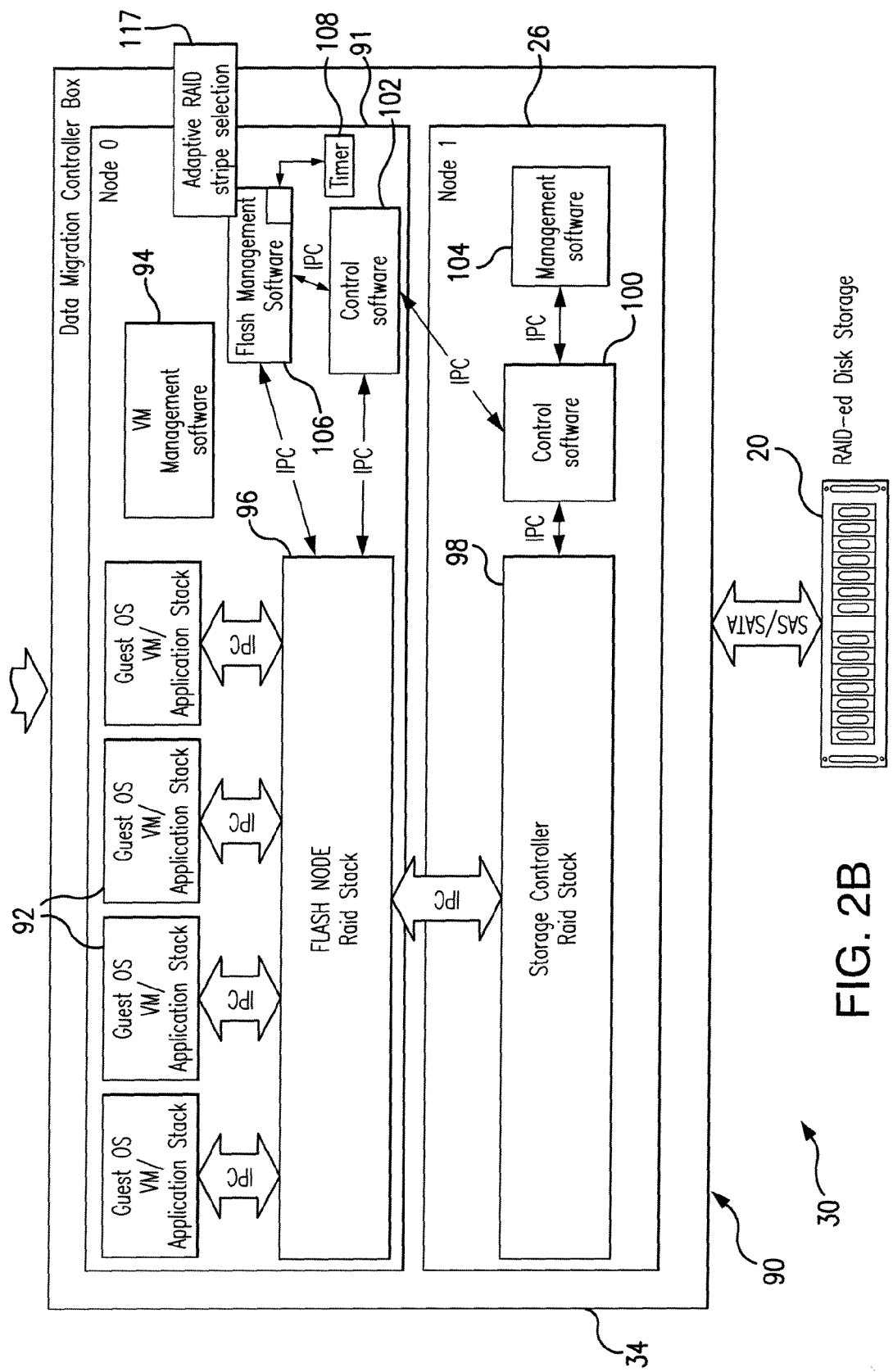
Figure 3:
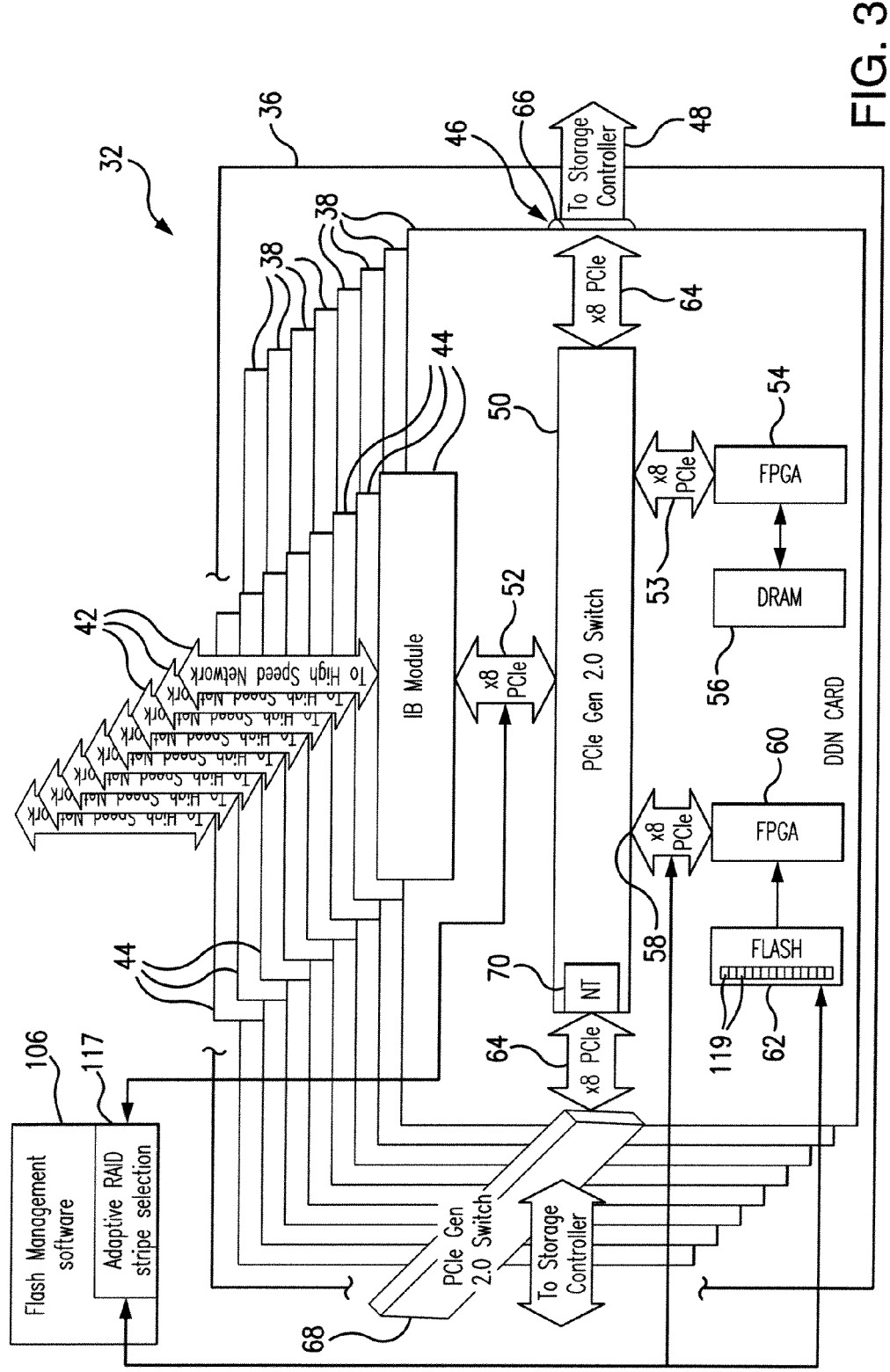
FIG. 3 is a schematic representation of the intermediate data storage module (flash node) and connections to external interfaces.

Referring to FIGS. 2A-2B, the intermediate data migration handling system 30 is configured as a modular structure. Specifically, the intermediate data storage module 32 is formed within a modular enclosure 36, referred to herein in some cases as a flash box. The modular enclosure 36, as shown in FIGS. 2A and 3, houses a number of data storage cards 38, further intermittently referred to as DDN (Data Direct Networks) cards. The DDN cards 38 are interconnected through a system of interfaces to the data generating entity 40 and to the storage controller(s) 26, as will be disclosed in detail in further paragraphs.

The modular enclosure 36 of the intermediate data storage module (flash node) 32 is formed with slots 42, schematically shown in FIG. 2A, for receiving the DDN cards 38. The number of DDN cards 38 in the modular enclosure 36 is determined by the system requirements, such as specifically, the number of data generating entities to be serviced, the size of requests to service, RAID striping requirements, or in accordance with failure tolerance level pre-configured for the system.

As an example, twelve DDN cards are shown in FIG. 2A which are housed in the modular enclosure 36. A system enclosing eight DDN cards in the modular enclosure 36 is presented in FIG. 3. These embodiments are given as an example, and it is understood that any number of DDN cards may be enclosed in the modular enclosure 36.

The flash node 32 is essentially a redundant array of DDN cards, where each DDN card 38 has an I/O front end module 44 connected to the high speed network 14 at the front end. Referring again to FIGS. 2A and 3, the modular enclosure 36 has a number of external connectors 42 (corresponding to a number of the DDN cards in the flash node 32) which render communication between the I/O modules 44 and the data generating entities 40 as required by the system 10.

The hosts (data generating entities) 40 connect to the host ports of the flash node (intermediate data storage module) 32 using different data transfer protocols (IB, FC, GigE), as needed by the system. Although in this particular example of the system implementation, the module 44 is presented as the IB HCA (Host Channel Adaptor), the GigE NIC (Network Interface Controller), or FC (Fiber Channel) HBA (Host Bus Adaptor) may be used as well.

The flash node 32 also has a back end (or storage) interface which includes a storage I/O module 46 and a back end external connector 48, both of which are adapted for interfacing with the data migration controller module 34 at the back end of the intermediate data storage module 32. The back end (or storage) interface may support any of the high speed protocols, including IB (Infiniband), FC (Fibre Channel), or PCIe (Peripheral Component Interconnect express). As an example for simplicity of understanding a further discussion will relate to the data storage system which will connect to the target storage 20 over the PCIe interface.

Referring once again to FIG. 3, the IB module 44 internally connects to PCIe Gen 2.0 switch 50 over ×8 PCIe bus 52. The switch 50 provided at the DDN storage card 38 has a bridge port 53 connected to the Field-Programmable Gate Array (FPGA) 54 supporting all the Direct Memory Access (DMA) operations related to the Dynamic Random Access Memory (DRAM) 56, as well as RAID calculations in the system.

Another bridge port 58 of the switch 50 is connected to an FPGA 60 to control the movement of data to and from a flash card 62. The flash card 62 provided at each DDN card 38 is a Non-Volatile Random Access Memory (NVRAM) residing on or operatively attached to the file servers. The flash card 62 may be implemented using Multi-Level Cell (MLC) or Single-Level Cell (SLC) memory technologies. The choice of selecting the MLC or SLC based flash card, depends on the type of system objectives, such as for example, either achieving high performance at an attractive cost-per-bit ratio or achieving even higher performance over an intended period of time with a lesser cost sensitivity. Such devices have similar characteristic latency for either random or sequential activities. The amount of the non-volatile memory or the number of the flash cards 62 within the DDN card 38 in the flash box 36 must be sufficient to store the data from at least one "checkpoint" of the computer node associated with the specific file server after performing a RAID operation.

The DRAM 56 is shared between the external file servers and the flash cache (flash card 62) for data migration operations. The amount of the NVRAM 62 or the number of the DDN cards 38 housed in the flash node 32 is selected to be sufficient to support the storage of the data from at least one "checkpoint" associated with a specific server after the RAID calculations have been performed, as well as to support the RAID striping, as will be presented in further paragraphs. The size of the DRAM 56 may be, for example, about 4 GB, while the size of the flash card 62 may be, for example, about 4TB.

The switch 50 also participates in external connection to the target storage. As presented in FIG. 3, the switch 50 connects Flash card 62/FPGA 60, as well as the DRAM 56/FPGA 54 through the cable x8PCIe 64 to the external PCIe Gen 2.0 switch 66 (supporting the function of the back end interface 46) which supports the external connection of the flash node 32 to the data migration controller module 34.

The efficiency of the present system is enhanced by providing a mechanism for copying data between the primary and the backup (redundant) systems. As shown in FIG. 3, a second PCIe Gen 2.0 switch 68 is connected to the switch 50 through the Non-Transparent (NT) port 70 to serve as the failover path provided in the present system to transfer the intelligence to the backup system. The NT port 70 provides isolation required between primary and backup systems while allowing access to each other's addressed domain through translation registers.

Referring once again to FIG. 2B, the system 10 of the present invention includes at least one data migration controller module 34, also referred to herein as a data migration controller box, which has a storage controller modular enclosure 90. The modular enclosure 90 contains two interconnected portions, e.g. Node 0 unit 91 and Node 1 unit which represent the storage controller 26.

The Node 0 unit 91 is responsible for the flash node 32 operation. For example, the Node 0 unit 91 determines the timing of I/O cycles, performs RAID calculations over the data prior to storing in the flash node 32, issues flush requests in the most optimal fashion, etc. The Node 0 unit 91 is a software module containing virtual machines and software units running to interactively support the operation of the intermediate data storage module 32.

Node 0 unit 91 of the data migration controller module 34 includes Guest OS VM/Application stack units 92. The Guest OS is the operating system running on the virtual machines 92 using kernel based virtualization techniques which make use of Hyper calls. The Application Stack is the portion of the software stack running in the Node 0 unit 91 on which a number of host applications may run. The Application Stack unit interfaces through the HCAs. HBAs, and NICs to the high speed network 14 to receive the computational data from the data generating entity.

Virtual Machine (VM) Management software unit 94 is the software which establishes the connection to the Flash Node RAID Stack software 96, as well as to the Storage Controller RAID stack 98 and, in the pass-through mode of operation, directly to the Storage Controller RAID Stack 98 of the Storage Controller 96. The Virtual Machine Management software 94 also controls the presentation of Logical Units to the client nodes 12 as block devices. Software 94 controls the assignment of the PCIe slots to each user for their I/O activity and also provides other configuration information such as for example "the location of the guest operating system" which must be emulated. The software 94 also controls how many Guest Operating Systems may run with the available system memory.

The Flash Node RAID Stack unit 96 is a part of the Flash Node 0's software which deals with the data flow path as will be further described. Briefly, the Flash Node RAID unit 96 supports RAID calculation and the RAID protection scheme provided in the subject system 10.

The subject system provides RAID protection, e.g., capability to retrieve data from existing parts of data in case of system failure. The lost or corrupted data may be reconstructed using the redundant information residing in the flash cards 62 of the flash node 32, which may be either mirrored or may be reproduced by performing certain calculations using remaining data and parity information.

The virtualized RAID type in the system corresponds to the RAID type of the arrayed disks 20. The RAID calculations are the operations of the RAID software performed in accordance with the configuration parameters, such as, for example, RAID type (RAID 5 or RAID 6) used in the system, RAID stripe size, or data file size.

In RAID 5, data is written across all the drives along with the extra information, e.g. parity, such that the data may be retrieved if any one of the channels fails. With the RAID 5 level, both data and encoded data protection information are spread across all the drives in the array. Level 5 is designed to provide a high transfer rate (one-way transmission of data) and a moderate I/O rate (two-way transmission of data).

If the Flash Node RAID Stack 96 is configured in the manner of RAID 5 technology, it reads and writes parity information to the flash cards 62 corresponding to each module in the array. If a module fails, the system processor may reconstruct all user data from the user data and parity information residing on the flash cards 62 corresponding to the other modules. When a failed module is replaced, the system processor automatically rebuilds the array using the information stored on the remaining modules. The rebuilt array contains an exact replica of the information it would have contained if the original module had not failed.

In the RAID 6 configuration, the data is written across all the drives along with the parity information in a manner that data may be recovered (or reconstructed) for up to two channel failures at a given time which is attained by a double parity technique.

The present data migration system employs an intermediate storage system positioned between the computing architectures and target storage devices which performs high speed non-volatile data caching with RAID protection over the random data from the high speed computing architectures before storing the same. This is complimented by the capability to adaptively select the largest possible RAID stripe supported by the available healthy channels during the startup and during runtime of the system.

The RAID protection provided by the subject system ensures a tolerance of pre-established failure rate and preserves and protects computer architectures data integrity. The RAID calculations are performed on all ingress data from the computing architectures, and may be used on the egress cycle to the target storage devices for data reconstruction and data integrity checking.

By performing the RAID over the random data generated by the computing architectures before their storage, data reliability for single channel failures or two channel failures is provided, depending whether RAID 5 or RAID 6 configuration is used. By adaptively selecting RAID stripe after the single or two channel failures, depending upon the RAID algorithm chosen, the data reliability is maintained for new incoming data while reconstruction of the priorly stored data on the failed channels is permitted. Thus, in the present system, the adaptive RAID stripe protection provides runtime data protection for new incoming compute node data during the I/O cycle. The protection provided by the RAID with adaptive selection of the RAID stripe is ensured as long as prior configured minimum RAID stripe size is maintained during the runtime. The RAID stripe size may shrink and grow within the pre-configured system limits during runtime without requiring the system to go offline. The metadata information is kept up to date to reflect adaptive RAID stripe information and the data stored in the system.

Referring to FIGS. 1A-1B and 2A-2B, the intermediate data migration handling system 30 not only provides the buffering to the ingress data from the data generating entities 40, but also maintains the data reliability by performing RAID over the compute node's data in the DRAM 56 before storing the data D and parity P generated in the flash node 30. The flash node 30 may be configured with either RAID 5, e.g., D+P fashion, or RAID 6, e.g., D+$P_1$+$P_2$ scheme, depending upon the failure tolerance level pre-configured for the system 10. The data coming into the intermediate data migration handling system 30 undergo the data striping which is the technique of segmenting logical and sequential data in a way that access to sequential segment is made to different physical storage devices.

In the subject system, the data striping is performed over the number of the DDN cards 38 best shown in FIGS. 2A-2B and 3, housed in the modular enclosure 36 of the intermediate data storage module 32. The number of the DDN cards 38 is chosen to support the system requirements. For example as shown in FIG. 2A, 12 DDN cards 38 are housed in the modular enclosure 36. Alternatively, as shown in FIG. 3, 8 DDN cards 38 are housed in the modular enclosure 36. However, it is to be understood that the presented exemplary numbers of the DDN cards 38 may be larger or smaller or in between, subject to the system requirements.

As an example, it is assumed that the minimum number of the DDN cards 38 sufficient to support the normal operation of the system 10 might be discovered or found by the flash node management software 106. Theoretically, the minimum number of the DDN cards may be as low as 3 in case of the RAID 5 configuration, and 4 in case of the RAID 6 configuration for the normal operation of the flash node with the RAID protection enabled.

The RAID stripe may be defined in the example shown in FIG. 2A, as the stripe having 11 cells from 11 different DDN cards 38 for data D, and 1 additional cell from the $12^{th}$ flash DDN cards 38 for parity P. It is assumed that the RAID configuration (D+P) is provided for all the tiers in the flash node 32. The redundancy is provided by block striping the host data across all flash cards 38 in the flash cells 119 which are used in data reconstruction in case of any errors or failures occurring in the system 10.

The control software unit 102 in the Node 0 unit 91, is a program responsible for setting up connections to the control software 100 in the Node 1, e.g., storage controller 26, by performing the required memory mapping for inter-process communication and DMA processing.

The Node 1 in the data migration controller module 34 represents the storage controller 26 containing software units supporting the flow of data relative to the storage disk array 20.

In the Node 1, e.g., storage controller 26, the Controller RAID stack 98 supports the data flow path of the storage controller software 100. The storage control software unit 100 provides an interface between the RAID stack 98 and a management software block 104, which performs the RAID stack monitoring and specific functions required during various error conditions. The control software 100 also interfaces with the management software 104 and services its requests for the presentation information, statistics information, or establishing the system configuration.

The software units of the storage controller (Node 1) 26 are responsible for receiving the incoming data from the Node 0, e.g., data flushed from the flash node 32 or from hosts 12 (in the pass-through mode if permitted by the configuration), breaking incoming requests on the RAID stripe boundaries in the Storage Controller RAID Stack 98, allocation of cache nodes and buffers to store the data, RAID operations such as parity generation, and flushing the cache to the disks 18 in an optimum manner during the "write" requests as commanded by the flash management software unit 106.

During "read" requests (to "read" data from the disks 18), the storage controller 26 operates to break the requests on the stripe boundaries (a parameter of the RAID), and to allocate the cache nodes and buffers, wherein buffers are allocated for RAID operations which could be "read-modify-write" operations, as well as to send a request to the disks for reading the data. Responsive thereto, the data from the disks is transferred to cache in the Storage Controller RAID Stack 98, parity check operations are performed (if the system is configured for this purpose), and the data transfer from the cache 98 to the requesting host takes place (in the "pass-through" mode) or to the intermediate flash node 32, subject to the system configuration.

In addition to above-described software units of the Node 0 unit 91, the flash node data storage management software, referred to herein as flash management software 106, runs on the data controller module 34. In its entirety, the management software 106 underlies the operation of the system 10 by supporting the migration of data from the computer/client nodes 12 and/or file servers 16 over the separate network 30 formed by the intermediate data storage system (e.g., flash node) 32 in conjunction with the data controller module 34, which includes the storage controller 26.

Flash Management Software unit 106 is coupled to the storage controller control software 100 and controls the flushing of the flash node 32 data periodically to the disk storage 20 by generating the most efficient write request for the storage controller architecture.

The Flash Management Software 106 is coupled to the storage controller's management software 104 and therefore is capable of determining the most efficient "write" requests for the target storage architecture 20. The Flash Management Software 106 uses the I/O metadata information for the data in the flash cache, and based on predetermined criteria, such as high flush priority, minimization of the disk seek time and/or tier usage then, generates largely sequential I/O "write" requests to the target storage controller 26 favored by the disk drives 18.

The subject system is provided with the capability of adaptively selecting the RAID stripe based on the available healthy components at runtime. For this the flash management software 106, schematically presented in FIGS. 1A-1B, 2B and 3, is equipped with the function of Adaptively RAID Stripe Selection 117 which may adaptively change the RAID stripe size in accordance with the available "healthy" components in the flash node 30, thereby greatly enhancing the RAID protection provided for new incoming data from the data generating entities 40.

The Adaptive RAID Stripe Selection Unit 117 schematically shown in FIGS. 1A-1B, 2B, 3, 4, and 5A, cooperates with control software 112 to keep the metadata information constantly updated to keep track of the dynamically changing RAID stripe size, as well as the numbers constituting the RAID stripe. The components that effect the RAID stripe size include the flash cards 62 (best shown in FIGS. 3 and 4), as well as the cells 119 within the flash card 62 in a properly inserted or plugged in DDN card 38. In addition, if the DDN cards 38 are not plugged in properly, it is not discovered or found during the polling routine, and is assumed to be missing during the normal operations, thereby requiring the adaptive RAID stripe selection unit 117 to adjust the RAID stripe size accordingly.

As best shown in FIGS. 1A-5B, the adaptive RAID stripe selection unit 117 is operatively coupled to each DDN card 38, (specifically to the interface 52 thereof), to discover the number of properly inserted (or plugged in) DDN cards 38 available for striping routine. The adaptive RAID stripe selection unit 117 is also operatively coupled to the flash cards 62 through the FPGA 60 to discover the "healthy" or "fail" status of the flash card 62, as well as the cells 119 in each flash card 62.

The Flash Node Management Software 106 runs on the data controller module 34, as shown in FIG. 2, and manages the operation of the flash node 32. The Flash Management Software 106 affects the movement of data from the non-volatile memory of the flash cards 62 to a large pool of disk drives 18 operated by the storage controller 26. The operations include moving of the I/O cycle data from the DRAM 56 of each DDN card 38 to the flash card 62 after performing RAID calculations on the data received from the data generating entity, moving that data from the flash cards 62 to the target storage 20 during flush operations, performing data integrity checks during "reads" of data from the flash node 32, either before flushing to target storage or before completing the "READ" request from the computer (or client) node 12.

Upon receiving a "write" request from the host (either computer node or a client node, as well as file server), the operation of the intermediate data migration handling system 30 involves receiving the host request, validating the request, checking the flash cache lookup table for the matching requests, creation of metadata entry for flash cache 62, and computation of the number and size of flash arrayed RAID stripes required to hold the entire request. Further, the RAID engine allocates the space for data and parity in the DRAM 56 in the DDN Cards 38 of the intermediate data storage module 32, followed by writing of RAID data and parity information to the flash card 62.

The incoming host data is striped across the flash cards 62 in the flash node 32. Further, a statement is sent to the host that the data is received by the flash node 32. After predetermined conditions are met (such as, for example, after the elapse of a predetermined time since the last I/O cycle or expiration of a configured flush timer), the data is flushed to the storage controller 26.

Upon receiving "read" requests from hosts (computer/client nodes, or servers), the requests are broken on the stripe boundaries and are checked if the requested data is in the flash node 32 or is absent therefrom. The request is further serviced by transferring the data to the host from the flash cache, if the requested data is contained therein. Otherwise, the request is forwarded to the target disk storage.

The flash management system 106 maintains a software timer 108 which determines when the last I/O cycle was concluded for the computer node 12 and when the computer node returned to its compute state. When a predetermined sufficient time has elapsed from the last I/O cycle of the compute node, the data from the flash node 32 is flushed to the target storage system 20. The Flash Management Software 106 schedules the flushing of the data to storage controller 26 if it is determined that the flash node 32 has reached a preconfigured threshold of fullness. In this arrangement, the writing of computer nodes data from the flash node 32 to the target storage 20 is performed independently of the I/O cycle of the computer node.

The flash node 32 acts as a large buffer which operates to increase the bandwidth during ingesting of data from a number of different file servers or computer (client) nodes during the I/O cycle which would otherwise require availability of several target storage controllers and a large number of disk drives to support the ingest rate. Thus, the usage of the flash nodes 32 as the intermediate data storage layer, not only provides an increased bandwidth but also results in reduced operational costs of the system.

The system attains an improved duty cycle of the computer nodes, increased effective bandwidth of the disk drives, reduced operational costs of the system and minimized power consumption during the data migration between the computer nodes and the disk drives by using the intermediate data storage system (flash node) 32 in conjunction with the data storage management system (data migration controller module) 34 operatively coupled between the file servers and the disk drives. The Flash Management Software 106 in the data migration controller module appoints a disk drive and determines an optimal sequence of data transfer from the flash node to the designated disk drive and schedules the data transfer in an optimal sequence.

The flash node (or cache) 32 maintains metadata information to aid in requests of sorting for flushing. The flash node receives the "raw" data from the computer nodes. The flash cache uses the internal flash cache descriptors for tracking the metadata information about the data received from the computer nodes. The metadata information is used by the flash node 32 to sort I/O requests to the back end in the order which minimizes the access time to the disk drives.

The storage controller 26 works in conjunction with the flash node 32 to improve bandwidths and reduce latency and power consumption. The Flash Management Software 106 determines when the compute node "write" cycle has finished and determines when the compute node is likely to begin its next I/O write cycle. In between, the Flash Management Software issues a "flush" request to the storage controller to fetch the data and store it on the disks. The storage controller receives the "write" requests from the Flash Management Software 106 which are sorted and ordered for the optimal data transfer sequence for the target disk(s).

The present system, in addition to being capable of serving as an intermediate buffer, also is configured to maintain the data reliability by performing RAID calculations over the "checkpoint" data in the DRAM 56 before storing the data D and generated parity P values in the flash cache. The flash node system may be configured with either RAID D+P (RAID 5) or RAID D+$P_1$+$P_2$ (RAID 6) depending upon the failure tolerance level configured for the system.

Returning to FIG. 3, a RAID/Flash Controller (RFC) 120 incorporates the FPGA units 54 and 60, and resides on the storage flash card 38. The RFC 120 hosts the stage buffer memories between the host interfaces and the Flash Memory 62 as will be presented in detail in future paragraphs.

Figure 4:
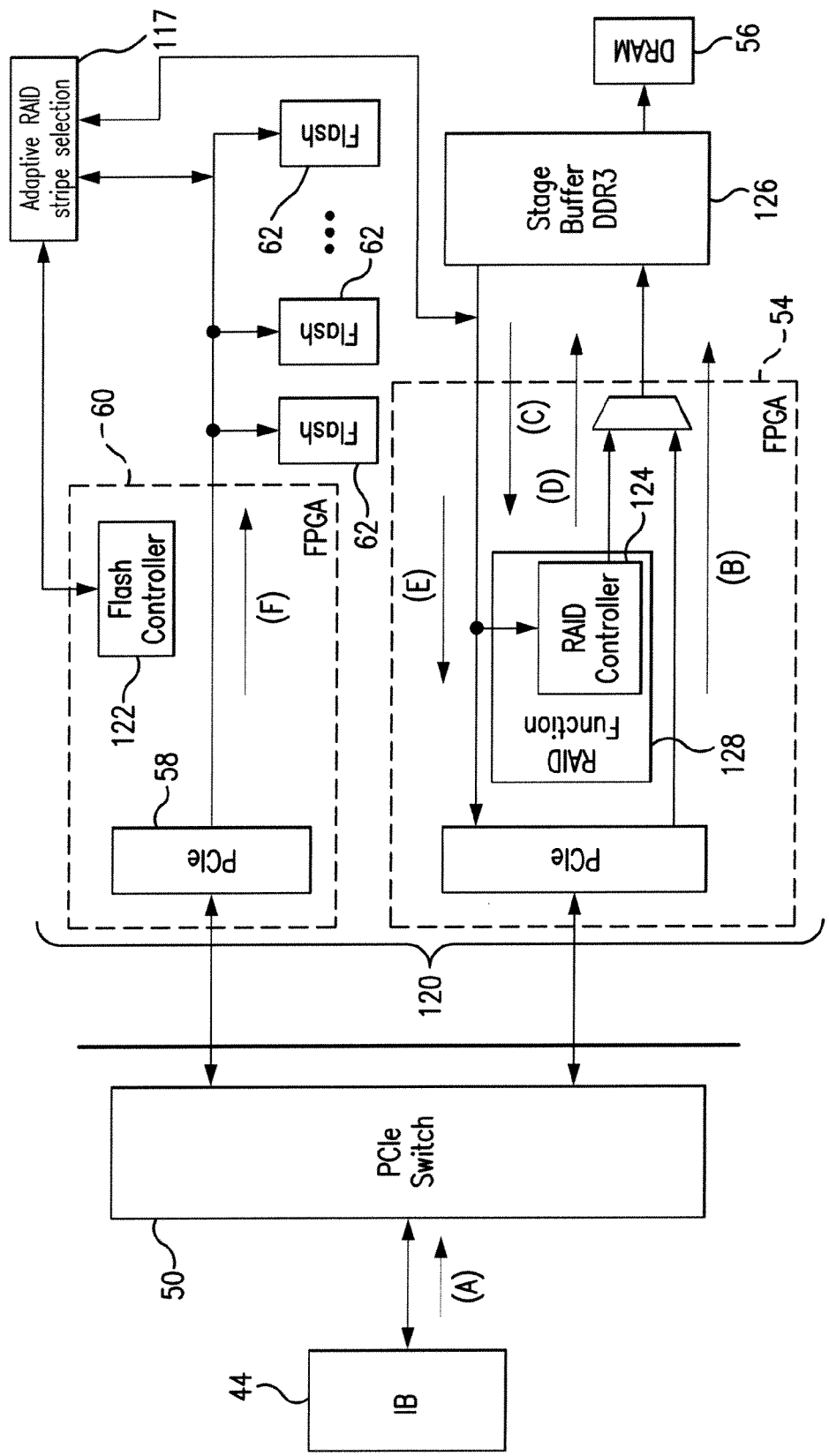
FIG. 4 is a block diagram representing data flow for RAID parity generation supported by RAID/Flash Controller (FPGA) in the system of the present invention.
Figure 5A:
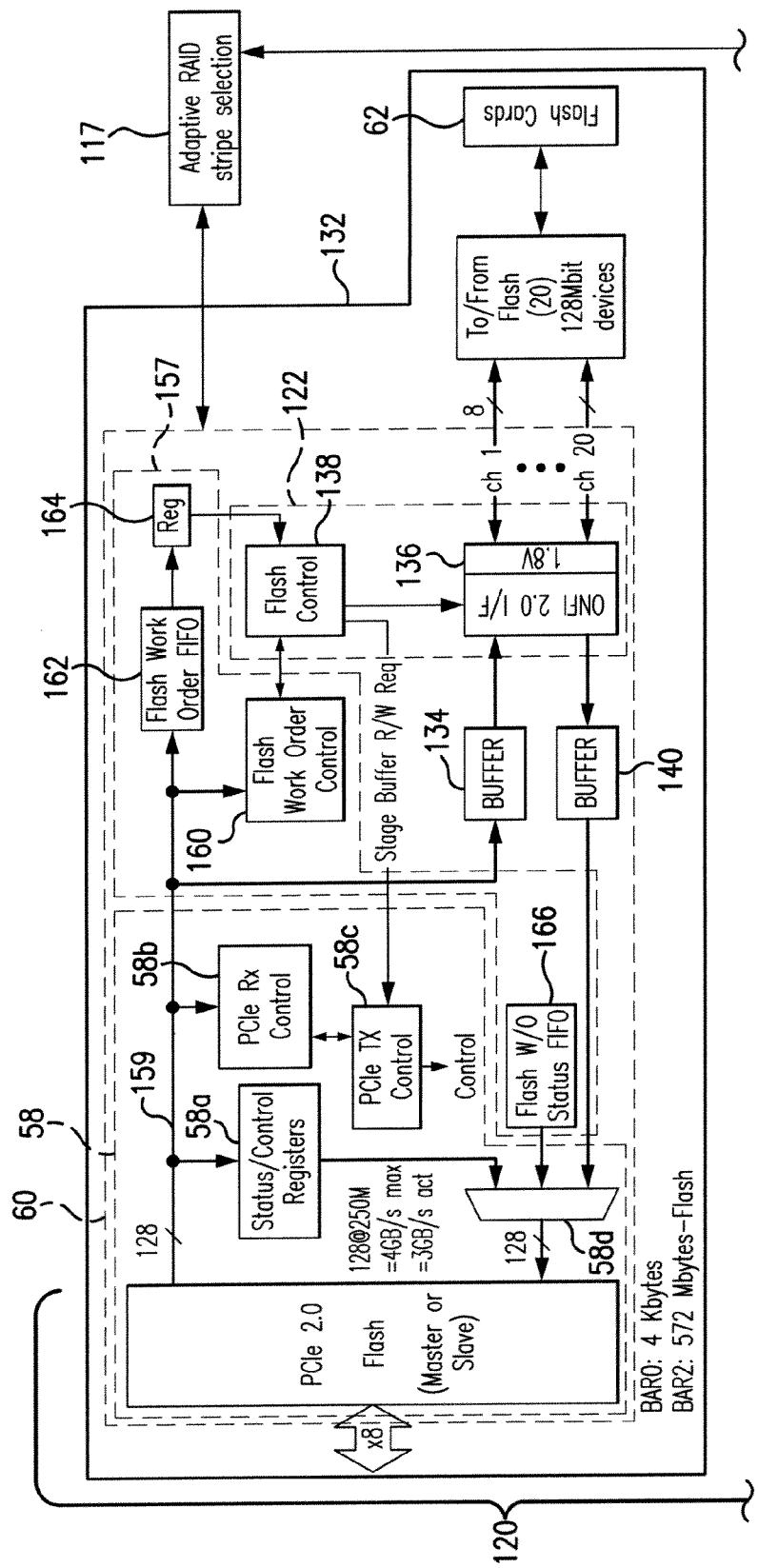
FIGS. 5A-5B represent a functional block diagram of the RAID/Flash Controller in the system of the present invention.
Figure 5B:
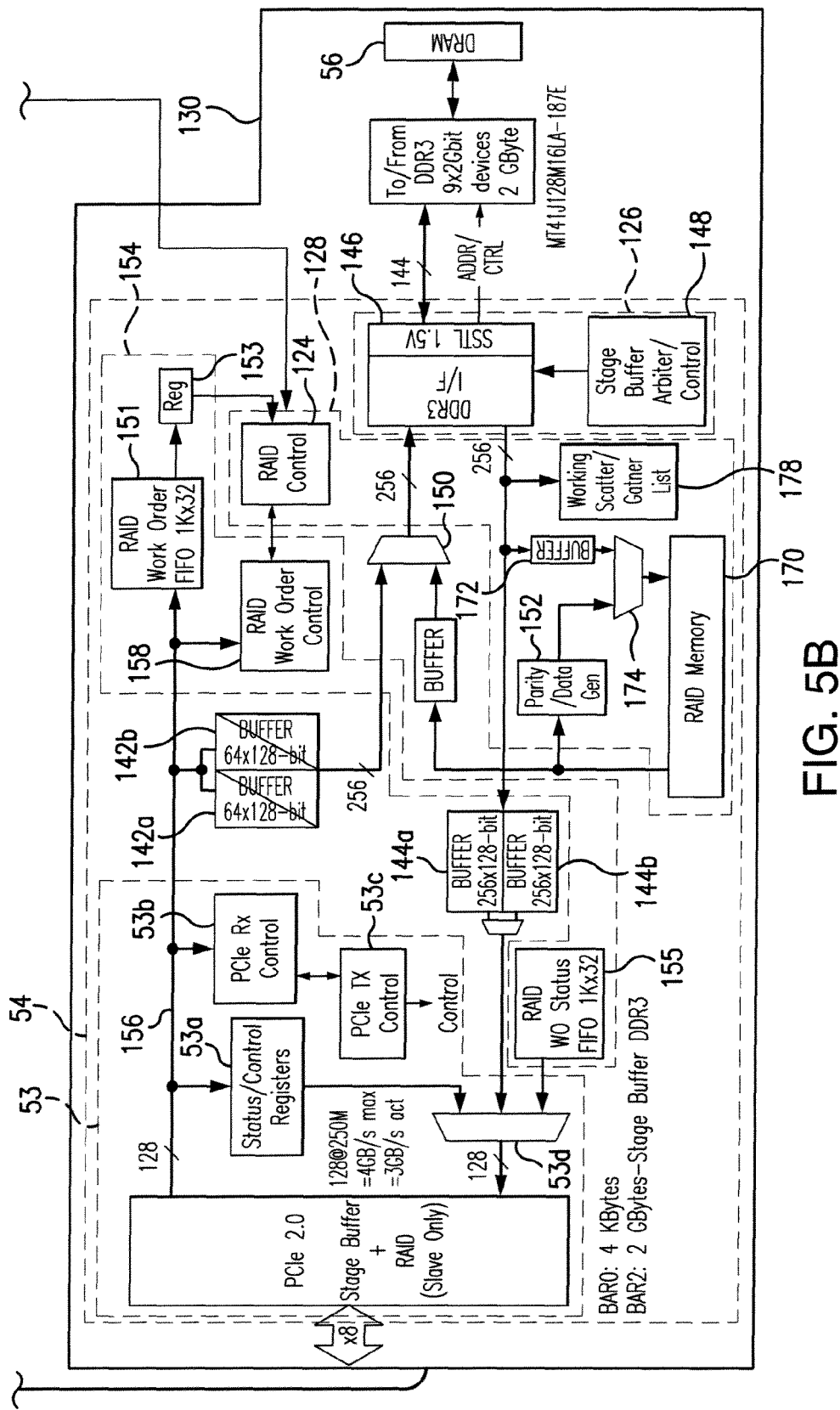

As presented in FIGS. 4 and 5A-5B, data is transferred between the host interfaces 44 and the Flash Controller 122 in the FPGA 60 via the 8-lane PCI Express 2.0 interface 58. The data is transferred from a RAID Controller 124 in the FPGA 54 via the 8-lane PCI Express 2.0 interface 53.

Specifically, as shown in FIG. 4, data flows A and B represent the transfer of data from the IB host interface 44 to a stage buffer 126 (to be detailed further herein) for storage in the DRAM 56.

The data flow C represents data read from the stage buffer 126 into a RAID function 128 for processing. The data flow D represents RAID parity data written into the stage buffer 126 per Work Order requests, as will be described infra herein. The data flows E and F represent data read from the stage buffer 126 which is transferred to the Flash Controller 122 via the PCI Express 2.0 interfaces 53 and 58 as requested by the Flash Controller 122.

As presented in detail in FIGS. 5A-5B, the RAID/Flash Controller 120 includes two functional sections, e.g., (1) the RAID/stage buffer function 130 corresponding to the FPGA portion 54, and (2) the Flash Controller function 132 corresponding to the FPGA 60. Each function 130 and 132 uses its own PCI Express 2.0 interface, e.g., the PCI Express (PCIe) 2.0 Interface 58 for the Flash Controller function 132, and the PCIe 2.0 Interface 53 for the RAID/stage buffer function 130, respectively.

As shown in FIGS. 5A-5B, the status/control registers 58a, PCIe RX control unit 58b, PCIe TX control unit 58c, and Multiplexer 58d form the user interface to the PCI Express 2.0 function 58 within the FPGA 60.

A hardware buffer 134 is used for transferring the data flow to the ONFI 2.0 interface 136 which, together with the flash control function 138, form the Flash Controller 122 of the RFC 120. The buffer 140 is used for buffering data from the ONFI 2.0 interface 136 to the PCIe 2.0 flash interface 58.

The user interface to the PCI Express 2.0 function 53 within the FPGA 54, is formed by the status/control registers 53a, PCIe RX control 53b, PCIe TX control 53c, Multiplexer 53d, and Multiplexer 53e.

Further, in the RAID/storage buffer 130, the hardware buffer labeled 142a and 142b is used for data flow to the stage buffer module 126. As presented in FIG. 5B, the stage buffer 126 has the DDR interface unit 146 and stage buffer arbiter/control 148. Hardware buffer 144a and hardware buffer 144b are used for buffering data from the DDR3 interface 146 of the stage buffer 126 to the PCIe 2.0 RAID interface 53. Multiplexer 150 select(s) the data coming from the RAID PCIe interface 53 or the parity generation unit 152.

Work Order Interface function 154 issues commands to control the RAID function 124. The Work Order Interface function 154 is accessed by the data generated entity via the 8-lane PCI Express 2.0 bus 156. The Work Order Interface 154 is composed of RAID Work Order Control Unit 158, RAID Work Order FIFO 151, Register 153, and the RAID Work Order Status FIFO 155.

The Work Order commands to control the flash function in the FPGA 60 are handled by a Work Order Interface 157 that is accessed via an 8-lane PCI Express 2.0 bus 159. The Work Order Interface 157 is composed of Flash Work Order Control Unit 160, Flash Work Order FIFO 162, Register 164, and the Flash Work Order Status FIFO 166. Data between the Flash Memory 62, the RAID Controller 124, and Flash Controller 122 is transmitted via multiple ONFI 2.0 interfaces 136 running at 250 mHz.

Work Order commands to control the flow of data to/from the Flash Memory 62 are handled by the Work Order Interface 160 that is accessed via the 8-lane PCI Express 2.0 bus 159.

The Stage Buffer Module 126 is implemented using DDR3 interface 146 interconnected with the DRAM 56. The Stage Buffer operates at 333 MHz. RAID/stage buffer function carried out by the FPGA 54 includes the following functions:
PCI Express 2.0×8 Lane Interface—RAID/Stage Buffer 130

The RAID/Stage Buffer function 130 contains the 8-Lane PCI Express 2.0 endpoint interface 53. The Host Interfaces 44 issue "read" and "write" commands to the Stage Buffer Memory 56 through the interface 53. RAID Work Orders 154 are also received through the interface 53.

BAR0 Status/Control Registers for 58a and for 53a, Work Orders

Internal status and control registers 53a, as well as the RAID Work Order Interface 154 are memory mapped to BAR0. BAR0 is configured as a 64-bit Address/32 bit Data function with a total size of 4096 Bytes. All transactions to BAR0 are 1-DW in length. Requests not adhering to this requirement are flagged as "Unsupported".

BAR2 DDR3 Stage Buffer Memory

The Stage Buffer Memory 56 is memory mapped to BAR2. BAR2 is configured as a 64-bit addressable function with a total size of 2 GBytes. All transactions to/from this function must be in even multiples of 512-Bytes. Requests not adhering to this requirement are flagged as "Unsupported".

Stage Buffer Module

The RFC 120 is responsible for accepting the Stage Buffer memory 56 requests from both the Host (IB) I/F and the RAID Controller 124 and executing those requests to the Stage Buffer memory 56. When conflicts occur, the Stage Buffer Arbiter/Controller 148 arbitrates PCIe and RAID Accesses to the Stage Buffer Memory 56. Additionally, the DDR3 devices 146 require periodic refresh cycles. The DDR3 I/F 146 is responsible for executing these refresh commands at the proper time. The DDR3 devices require a refresh cycle every 7.8us.

Memory Devices 56

The DDR3 device 146 used to implement the Stage Buffer memory 56 is MT41J128M16LA-187E. Each memory is 128M×16-bits. Nine devices are organized to implement a 128M×144 Stage Buffer memory (2-GBytes+ECC).

Work Order Interface 158 for RAID FPGA 54

Work Order messages are used to control the RAID function. The RFC 120 receives the Work Order messages from the RAID PCI Express Interface 53. Work Orders are placed into a RAID Work Order FIFO 150 for processing. Each RAID Work Order consists of ×32-bit words.

Additionally, a RAID Work Order Readback Status FIFO 155 holds the completion status of each submitted Work Order as defined by the Work Order Code Response.

Work Order Interface 157 for Flash FPGA 60

Work Order messages are used to control the FLASH function 60 using Flash Work Order Control 157. The RFC 120 receives these Work Order messages from the data generating entities via the FLASH PCI Express Interface 60. The FLASH Work Orders are placed in the Flash Work Order FIFO 162 for processing. The FLASH Work Order Readback Status FIFO 166 holds the completion status of each submitted Work Order as defined by the Work Order code Response.

RAID Function

The hardware has logical blocks shown as Parity/Data Generation Unit 152 to perform the RAID operations. The RAID Memory 170 is hardware memory used for performing RAID operations. The Hardware Buffer 172 is used for buffering data from the DDR3 Interface 146 on which a RAID operation will be performed. The Multiplexer 174 is used to select between the data from the DDR3 I/F 146 and from the Parity/Data Generation Unit 152 before it is written to the RAID Memory 170.

Figure 6:
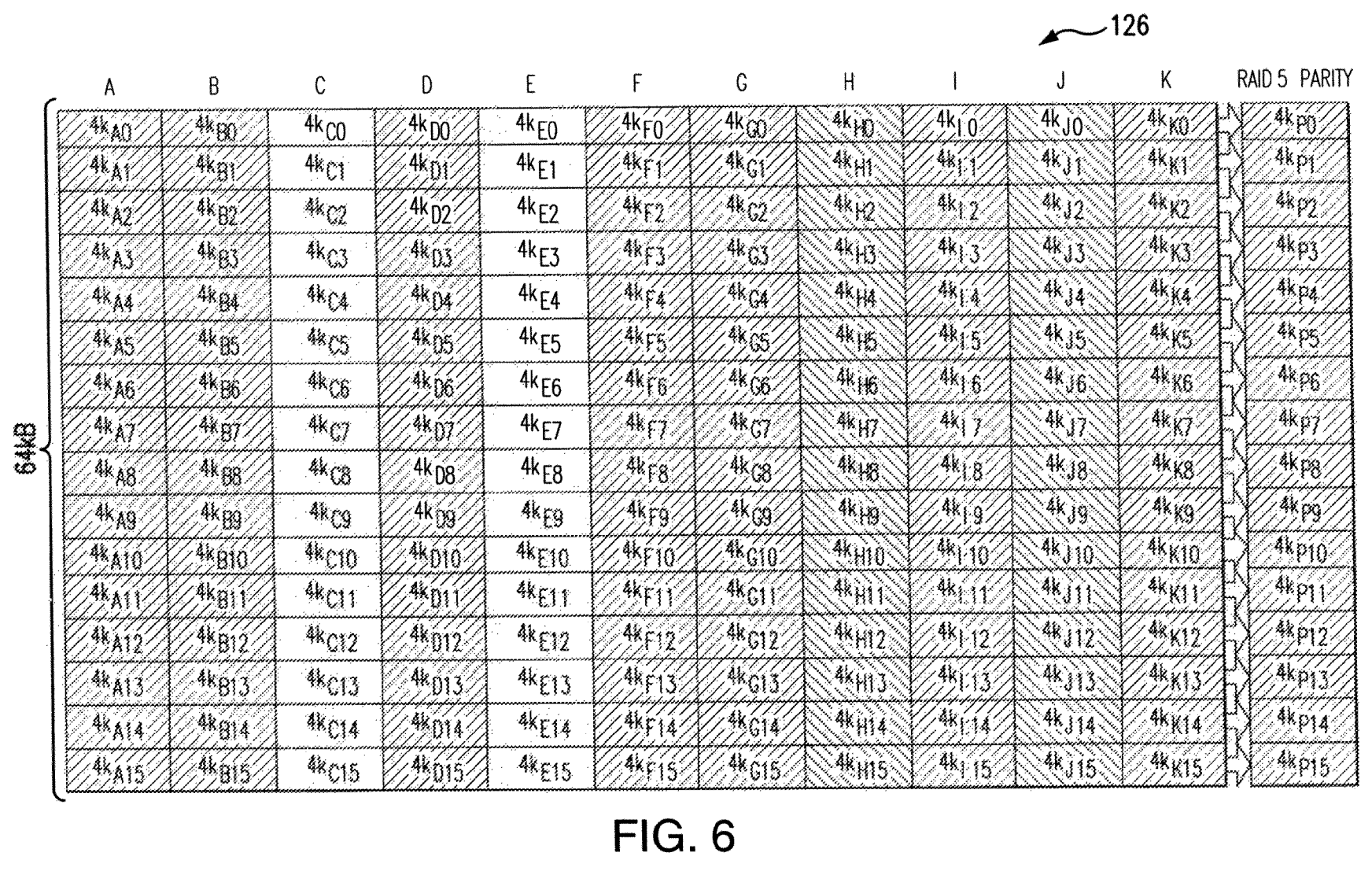

Data is striped in 64 kByte blocks across 11 Flash Memory 62 cards in an 11+1 RAIDS configuration, as shown in FIG. 6. Parity is distributed across all Flash Memory cards 62.

In accordance with the RAID principles, data is placed into the stage buffer Memory 56 in a fragmented fashion via the PCI Express 2.0 interface 53, as presented in FIG. 7A-7C. As shown in FIG. 7A, Stage Buffer data is fragmented into blocks which may vary in size.

Additionally, a Scatter/Gather Pointer List 178 is placed into the Stage Buffer 126/DRAM 56 to define how to reconstruct the fragmented data in the proper order. In operation, the Work Orders are submitted to the RFC 120 conveying the location of the Scatter/Gather Pointer Lists. The RAID function uses the Scatter/Gather Pointer List 178 to locate and process data in the Stage Buffer 126 for parity/RAID generation 152, with the parity stripe written back to the Stage Buffer 126 according to the Parity Pointer list 178. As shown in FIG. 7B, the Work Order calls out the starting address of the Scatter/Gather pointer list.

The Scatter/Gather Pointer List 178 breaks down each 64 kB stripe into (16) 4 kB subblocks by providing pointers to where each 4 kB sub-block resides in the Stage Buffer Memory (DRAM) 56. Thus, as shown in FIG. 7C, 16 pointers define a 64 kB block stripe. Each list entry holds a pointer to a 4 kB sub-block in Stage Buffer memory.

The Scatter/Gather Pointer List 178, as shown in FIG. 7B, specifies the unfragmented 64 kB data block as an ordered set of (16) data block pointers. The 4 kB data blocks can then be located and processed in the proper order. The list must also specify where generated parity should be placed. Total number of entries in a pointer list is defined as 12×16=192 Pointers.

Figure 8A:
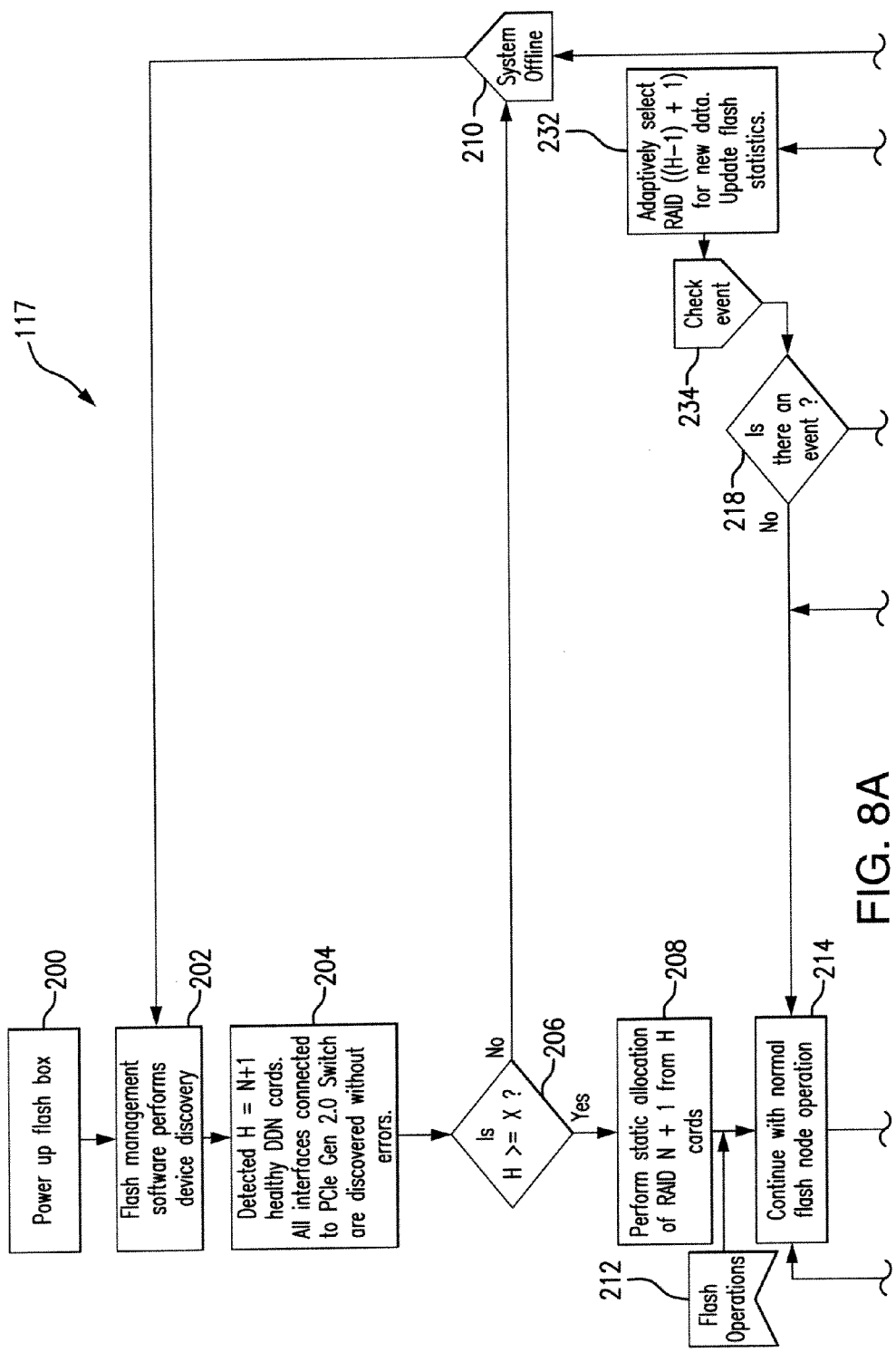
FIGS. 8A-8B represent a flow-chart diagram of the process for the adaptive RAID stripe selection when a single channel failure occurs due to a DDN card failure in the RAID 5 configuration.
Figure 8B:
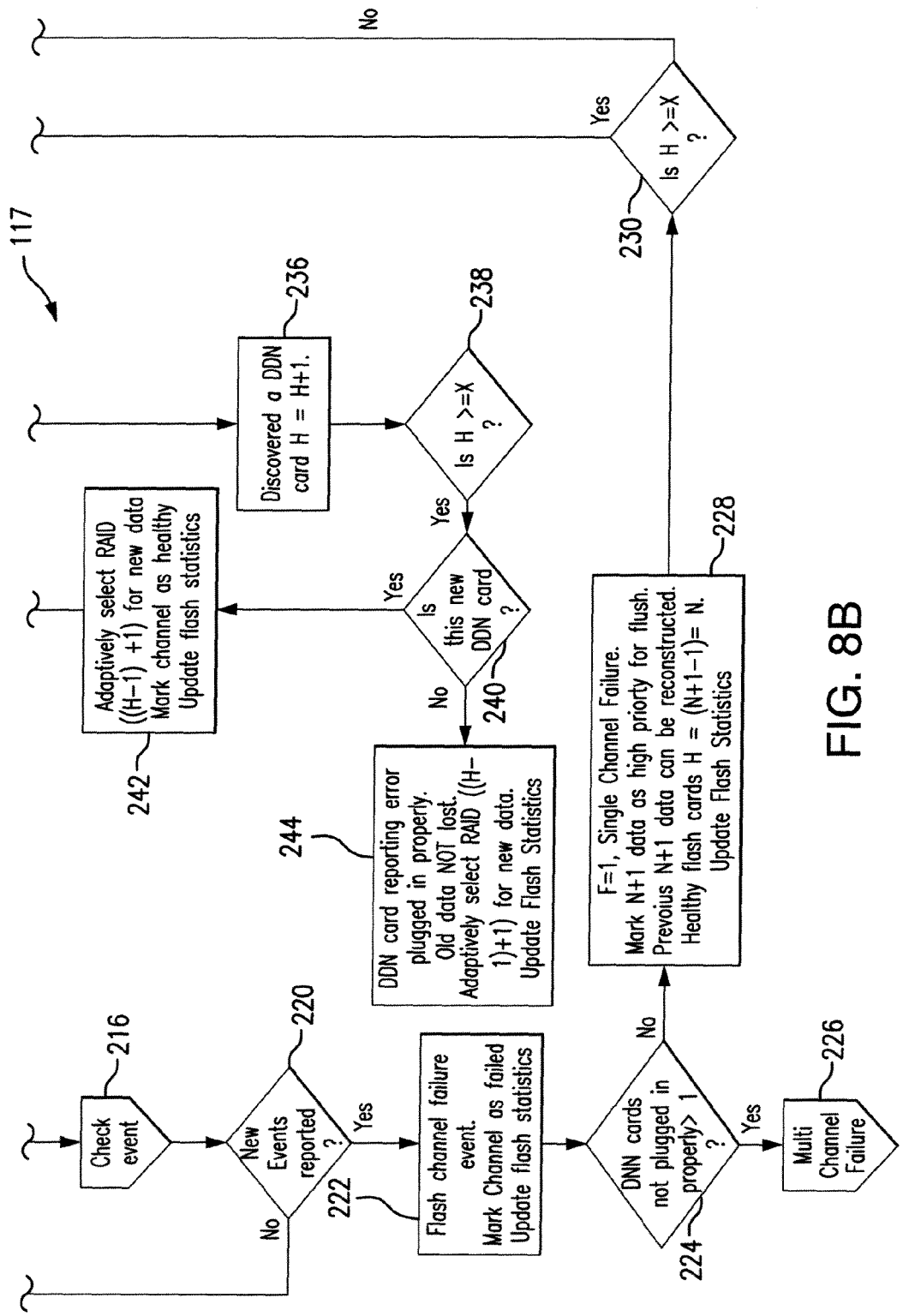

Turning to FIGS. 8A-8B, which represent the routine of the discovering or finding of healthy devices and selection of the adaptive RAID stripe during normal flash node operations when a single channel failure occurs due to DDN card 38 failure is detected. The RAID D+P configuration is being used in the arrangement presented in FIGS. 8A-8B for introducing redundancy during the full stripe "write".

Upon the energizing (boot-up) the flash node 30 in block 200 "Power Up Flash Box", the device discovery routine is performed in block 202 "Flash management software performs device discovery". In this routine, all the interfaces 46 connecting the DDN cards 38 in the flash node 32 to the storage data migration controller box 34 through the PCIe Gen 2.0 switch interface 66 must be discovered in order to report the discovery of "healthy" DDN cards 38. Upon polling the interfaces 46, the number H of the healthy DDN cards is discovered in the block 204.

The number of healthy DDN cards sufficient enough to support the normal operation of flash node 32 is predetermined. For example, the system 10 may be configured to have at least X=8 number of the "healthy" DDN cards 38 at any time to continue normal operations. In block 206, the logic checks whether the number H of the discovered healthy DDN cards is larger than the predetermined minimum number X of the healthy cards pre-configured for the system in question. If the number of the healthy cards exceeds the minimum predetermined number X of the healthy cards, the logic flows from block 206 to block 208 to perform the static location of all possible flash RAID stripes from the discovered H healthy DDN cards 38 and at this time, the metadata information about the RAID stripes is initialized.

The incoming data from the data generating entity is protected using RAID D+P scheme, where D is saved in the H−1 channels and P is saved in the remaining 1 channel, so that normal flash node operation continues in the block 214. Block 212 "Flash Operations" represents the configuration and other parameters of the flash system when the flash node boots up.

If, however, in block 206, the number of the healthy DDN cards discovered in blocks 202-204, is smaller than the predefined minimum number X of the healthy DDN cards, the system goes offline in block 210 so that the system administrator can intervene. As best presented in FIG. 9, the system administrator intervenes in block 210a to replace failed DDN cards or plug in the DDN cards again and restart the flash node in block 210b. In this mode, the data from the data generating entities 40 will be directly sent to the target controller 36 using the "pass through" mode if the system is configured to use the same. The system administrator is to ensure that at least 8 (or more than 8) healthy DDN cards are available in the system for the flash node to continue normal operation.

As shown in FIGS. 8A-8B, when the number of the healthy DDN cards 38 meets the requirements of the minimum healthy cards X, the logic returns to block 202 and the procedure resumes.

The flash management software 106, and particularly the adaptive RAID stripe selection unit 117 thereof, continuously checks the status of the flash channels, flash cards, DDN cards, DRAM, IB link in block 216 by polling the flash node components and informing the system 10 in block 220 on the status of the hardware such as DDN cards, flash cards, and I/O modules.

Figure 10:
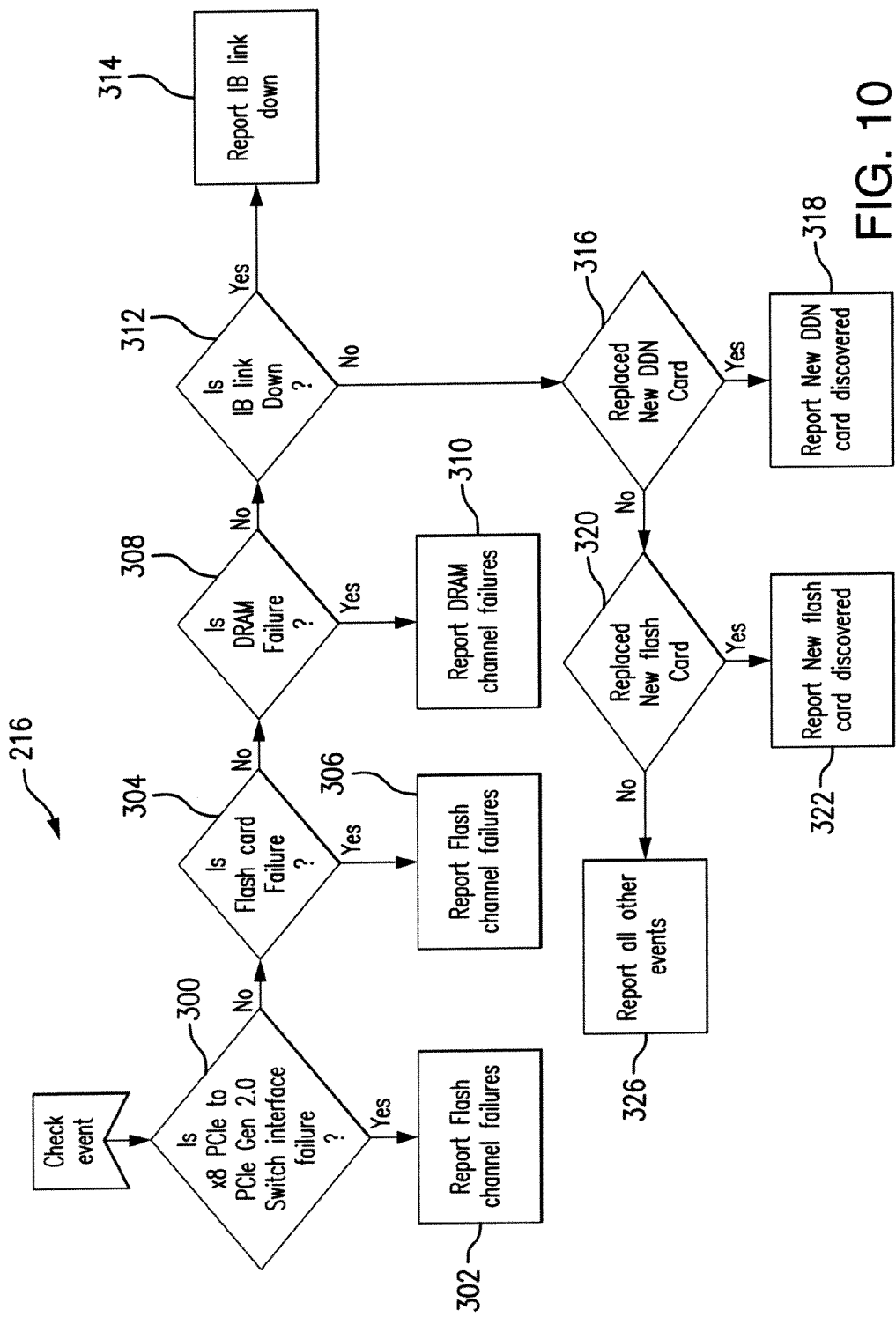
FIG. 10 is a flow-chart diagram of the "check event" routine performed by the management software during normal flash node operations.

Referring to FIG. 10, the flow chart diagram of the routine for checking the possible events that are reported by the adaptive RAID stripe selection unit 117 is presented. Within the DDN card 38, the flash cards 62 are connected over the ×8 PCIe bus 58 to the PCIe GEN 2.0 switch 50 which connects to the external x16 PCIe GEN 2.0 switch 46, as shown in FIGS. 2A-2B and 3. An event indicating the channel errors may indicate that:

1. The DDN card(s) 38 is not plugged in properly in the PCIe slot 42 in the modular enclosure 36 of the flash node 30;

2. The flash card interface 58 within the DDN cards 38 "could see channel errors on the interface between the flash FPGA 60 and the PCIe GEN 2.0 switch 50 thus reporting flash card failure as failed; and/or 3. The flash card 62 itself has gone bad.

In order to find out what part of the hardware has problems, the logic checks whether the DDN card is plugged in properly in the PCIe slot in block 300. If the ×8 PCIe to PCIe GEN 2.0 switch interface fails, the logic reports the flash channel failure in block 302 to the block 222 of FIG. 8B.

If in block 300, no failure is detected, the logic flows to block 304 to check the status of the flash card. In the case of flash card failure (either due to the channel errors on the interface between the flash FPGA 60 and the switch 50 or due to the flash card itself failure), the logic reports flash channel failures in block 306. If, however, in block 304, no flash card failure has been detected, the logic passes to block 308 to check the status of the DRAM 56.

In the case of the flash card failure detection, the DRAM 56 may accept host data and perform RAID calculations, but the flash card 62 itself cannot participate in a RAID stripe. There could be other events, such as DDN 38 card detection which may occur when a failed flash card 62 is replaced by a new one within the DDN card, or the DDN card 38 itself has been reinserted or replaced by a new one. The DRAM 56 failure event, if detected, indicates that no I/Os from hosts may be accepted. However, the flash card 62 may continue participation as a member of the RAID stripe.

If in block 308, DRAM failure is detected, the logic flows to block 310 to report DRAM channel failures. If however, in block 308 no DRAM failure is detected, the logic flows to block 312 to perform the routine for the "IB link down" checking to check the status of the IB module 44 on each DDN card 38. If IB link failure is detected, the logic flows to block 314 to report the IB link down. If, however, no IB link problem has been detected, the logic flows from block 312 to block 316 to check whether the new DDN card has been inserted.

If the new DDN card has been identified, the logic flows to block 318 to report that the new DDN card has been discovered. If, however, there was not a replacement of the DDN card in block 316, the logic passes to block 320 to detect whether the failed flash card 62 has been replaced with a new one. If the new flash card 62 has been determined, the logic flows to block 322 to report the new flash card discovery. If in block 320 no new flash card has been determined, the logic flows to block 326 to report all other events in block 220 of FIG. 8B.

Returning to FIGS. 8A-8B, when new events discovered in accordance with the flow chart presented in FIG. 10 have been reported from block 302, 306, 310, 318, 322, and 316, the logic flows to block 222 of FIG. 8B "Flash channel failure event.Mark channel as failed.Update flash statistics".

However, in block 220 if no new events are reported, the logic loops to block 214 to continue with normal flash node operation.

If, however, new events have been reported as a result of the "check event" routine presented in FIG. 10, the Flash Management Software reports the channel as failed, marks the channel as failed, and updates flash statistics in block 222. The number of "healthy" DDN cards in system is updated to H=H−1, and the adaptive RAID stripe selection unit 117 dynamically allocates new RAID stripes for new incoming requests.

If the requests are "write" requests, the host data continues to be protected by the RAID D+P scheme, but the RAID stripe size has been decreased by 1. In single channel failures, with the RAID D+P scheme, it is possible to reconstruct data using redundancy in RAID stripe. Therefore, data reliability during the single channel failures is ensured. Thus, during the "read" requests or reading data before flashing to the target storage, the failed channel data can be reconstructed. Upon detecting in block 224 that no more than one DDN card is plugged in improperly, the logic flows to block 228 where, for the case of the single channel failure, the data is marked as high priority for flush, and the flash statistics is updated.

If, however, in block 224, more than one DDN card is determined to be plugged in improperly, the case of multi-channel failure is determined in block 226.

Figure 11A:
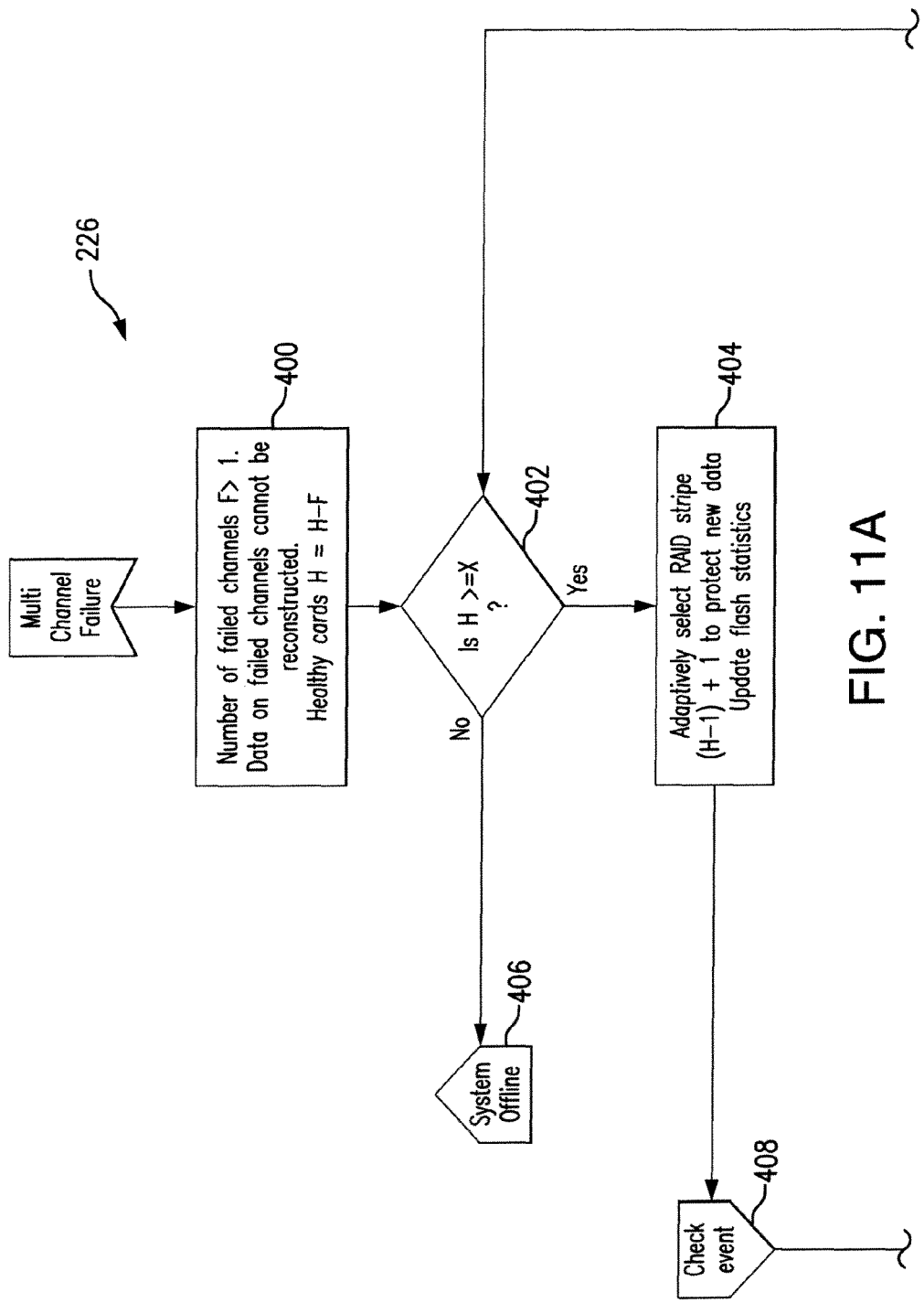
FIGS. 11A-11B represent a flow-chart diagram of the process for adaptive RAID stripe selection when a multi-channel failure occurs due to a DDN card failure in the RAID 5 configuration.
Figure 11B:
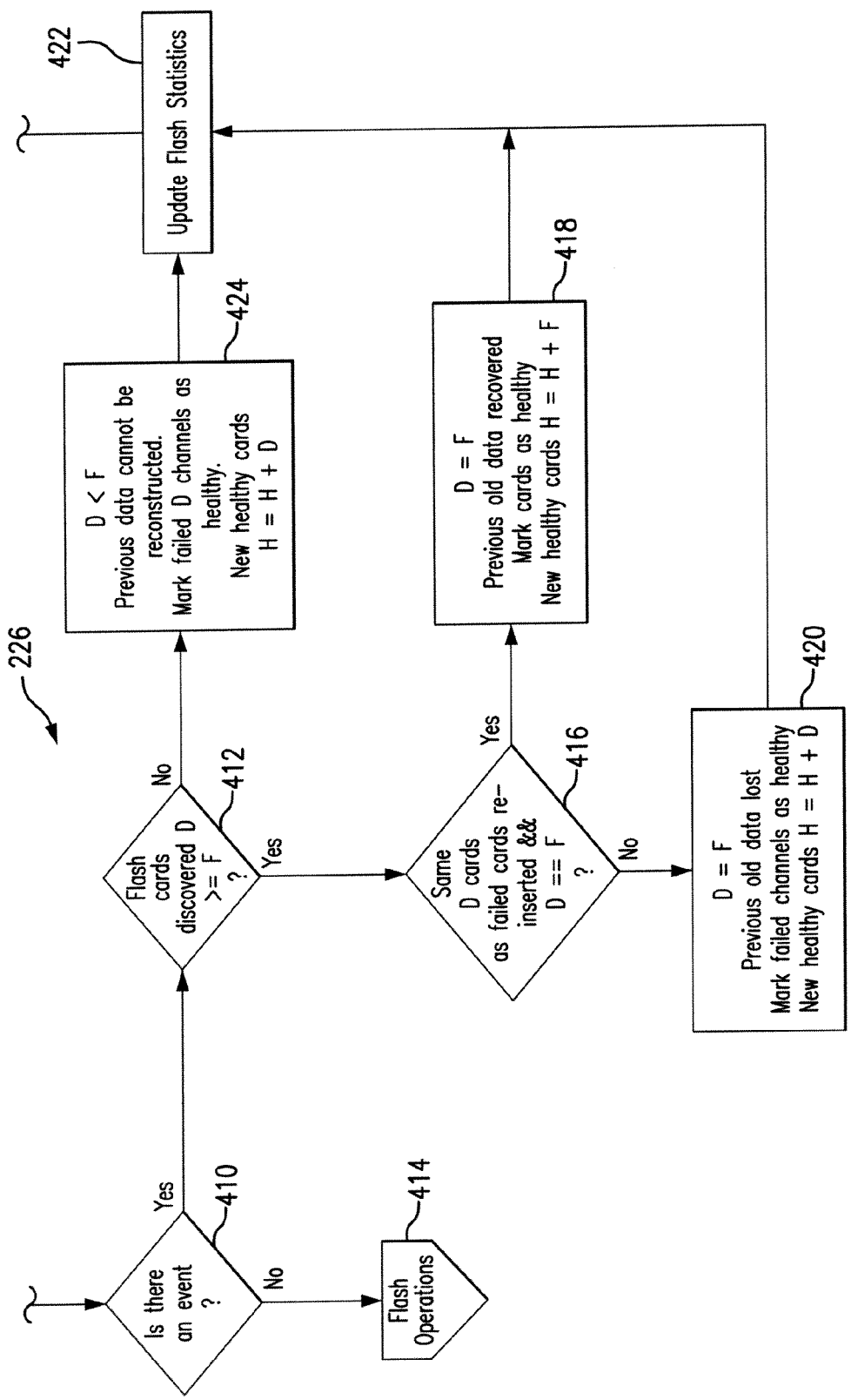

Referring to FIGS. 11A-11B, representing the flow chart diagram of the routine performed by the adaptive RAID stripe selection unit 117 in case of the multi-channel failure, F number of the DDN cards 38 are reported as failed, where F>1, and the number of the healthy DDN cards 38 in the flash node 32 changes to H=H−F in block 400. If in block 402, the number of the healthy DDN cards H is greater than or equal to X (the minimum number of healthy DDN cards configured for the flash node), the flash node continues the normal operation by protecting new incoming host data with the RAID D+P calculations using RAID stripe of size H=H−F in block 404 where the update flash statistics is updated to reflect that the RAID stripe size has been adaptively adjusted. During multi-channel failures with the RAID D+P protection, the previous data on the failed channels cannot be reconstructed, and the data is marked as unavailable for further use in block 400.

From block 404, the logic flows to block 408 "check event" where the check event routine 216 is performed in accordance with the flow chart presented in FIG. 10 discussed in previous paragraphs. If a new event has not been discovered in block 410, the logic flows to block 414 to resume normal flash operations of the flash node 32.

A D number of DDN cards may be discovered during normal flash operation in block 410. The discovered DDN cards may have an old flash card in which the host data is uncorrupted, and thus, when discovered again, all data may be retrieved if the associated RAID stripe information is still valid.

When D number of the DDN cards is detected, the number of healthy DDN cards in the flash nodes is updated to H+D. The discovered number D of the DDN cards could be equal to or less than the number F of failed channel(s). If in block 412, it is determined that the discovered number D of the DDN cards is equal to the number F of failed channels, the logic flows to block 416 to check whether the discovered D number of the DDN cards are the same as those "failed" DDN cards are reinserted. If those newly discovered DDN cards are the same cards which have been reinserted, the logic flows to block 418 where the newly discovered D cards are marked as "healthy", and the previous old data stored therein is recovered. The system dynamically selects the maximum RAID stripes size possible for a new incoming data protection.

If, however, in block 416 it is determined that the newly discovered D number of the DDN cards are different than those reinserted DDN cards, the logic flows to block 420 where the number of healthy cards is updated to H=H+D, and the failed channels are marked as healthy. In this situation, the previous data on the failed DDN cards is lost.

If in block 412, the number D of the newly discovered DDN cards 38 is smaller than F, the logic flows to block 424 where the number of the healthy cards is updated to H=H+D. In this scenario, previous data cannot be reconstructed.

The data from the blocks 420, 418 and 424 is then transmitted to block 422 for updating the flash statistics, and the logic loops to block 402 to check whether the number of the healthy DDN cards in the system meets the requirement of the minimum number X of the healthy DDN cards for supporting striping operation.

As shown in FIGS. 8A-8B, the logic flows from block 228 (corresponding to the routine performed when the single channel failure is detected) to block 230 to check whether the number of the healthy DDN cards in the system meets the requirement of the minimum number X of the healthy cards capable of supporting the striping operation. If the number of the healthy DDN cards is satisfactory, the logic flows to block 232 to adaptively select the RAID stripe size for the new number of the healthy cards, as well as to update the flash statistics.

After performing the check event routine in block 234 (corresponding to the check event routine 216 shown in FIG. 10), the logic flows to block 218 where it is determined if there is at least one new event determined. If there is no event, the logic flows to block 214 to continue with normal flash node operation.

If, however, in block 218, it is determined that there is a new event, the logic flows to block 236 "Discovered a DDN card", so that the number H of the healthy DDN cards is increased to H+1. The logic further flows to block 238 to determine whether the new number H=H+1 of the healthy DDN cards exceeds or equal to the minimum predetermined number X of the healthy DDN cards in the system. If "yes", the logic flows to block 240 to check whether the discovered DDN card is a new DDN card. If the newly discovered DDN card is a new DDN card, the logic flows to block 242 where the RAID stripe size is adapted to new (H−1)+1 available healthy DDN cards. The channel is then marked as healthy, and the update flash statistics is performed. From block 242 the logic loops to block 214 to continue with normal flash node operation.

If, however, in block 240 it is determined that the newly discovered DDN card is not a new one, the logic flows to block 244 where the newly discovered DDN card is reported as being a properly plugged in DDN card. In this case the old data contained in the DDN card is not lost. The logic further adaptively selects RAID stripe size for the new data, and the flash statistics is updated. From block 244 the logic flows to block 214 to resume the normal flash node operation.

If, however, in block 230, the number H of the healthy DDN cards is smaller than the predetermined minimum number X of the healthy DDN cards sufficient to support the normal RAID striping operation, the logic flows to block 210 and the system switches offline.

Figure 12A:
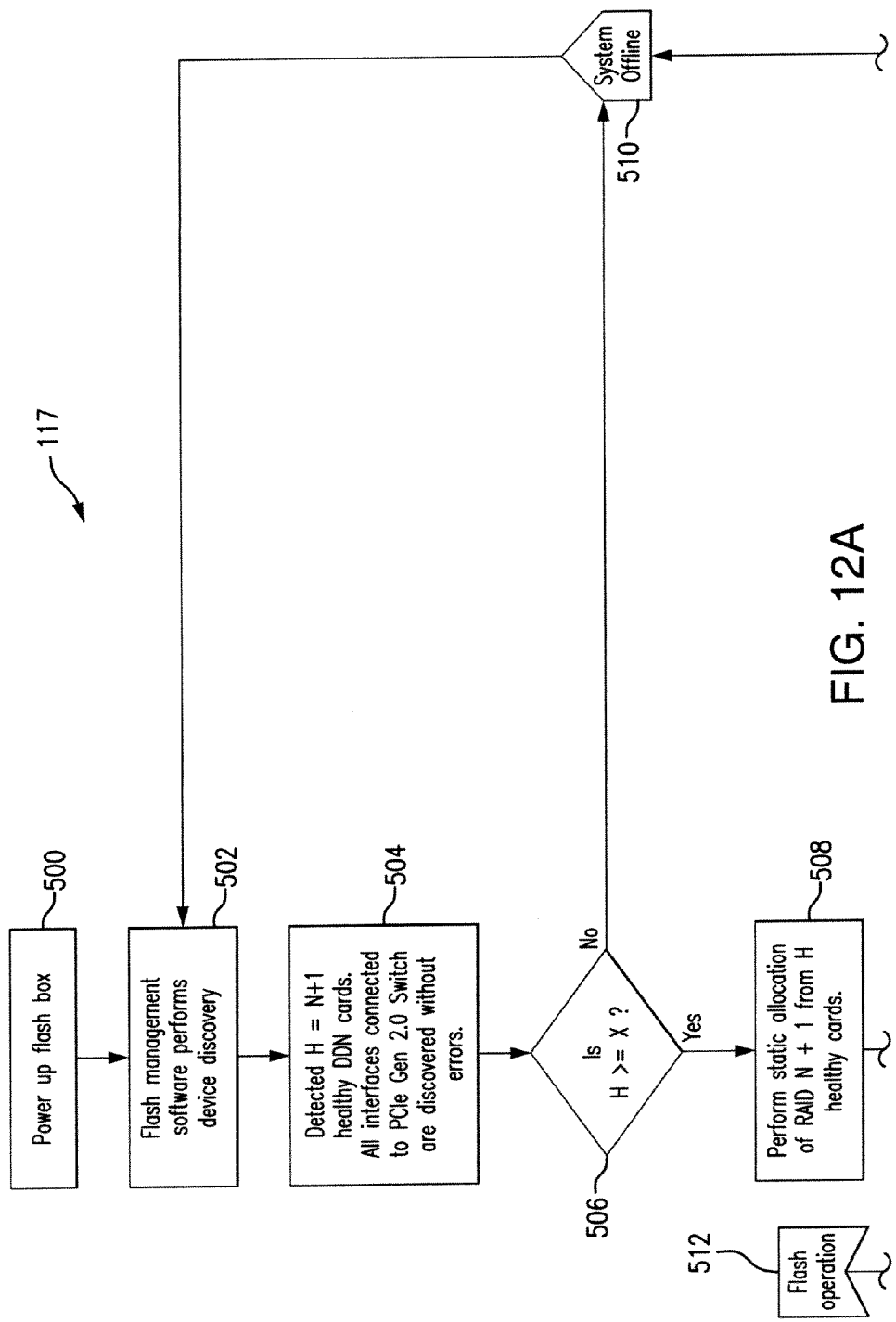
FIGS. 12A-12B represent a flow-chart diagram of the adaptive RAID stripe selection process when a single channel failure occurs due to a flash card failure in the RAID 5 configuration.
Figure 12B:
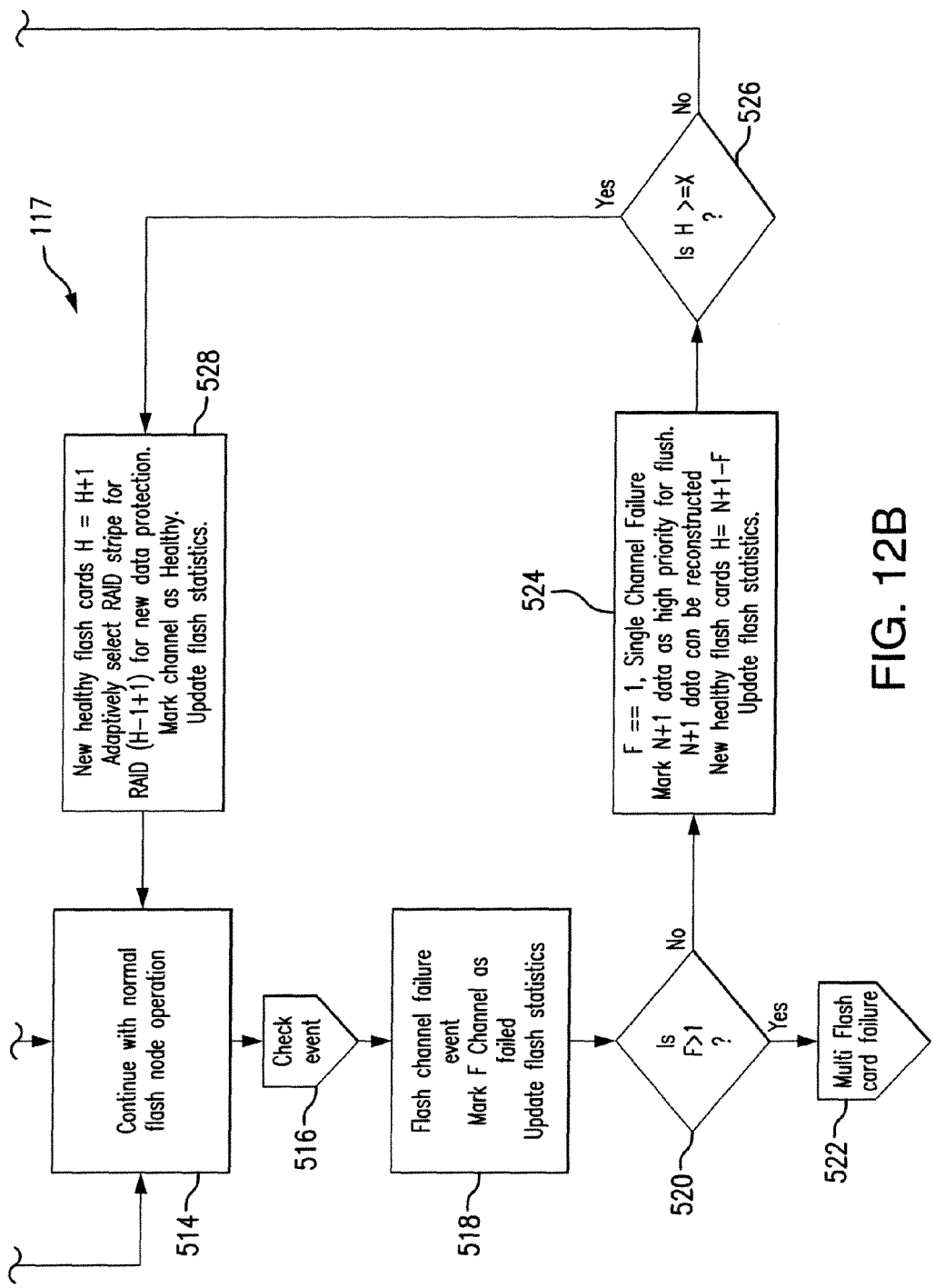

FIGS. 12A-12B represent a flow chart diagram of the routine performed by the adaptive RAID stripe selection unit 117 of the flash management software unit 106 for the single channel failure in case of the RAID D+P (RAID 5 configuration) when a flash card 62 fails. The flow chart presented in FIGS. 12A-12B is similar to the system operation in case of the single channel failure for the failed DDN card presented in FIGS. 8A-8B. However, the difference between these two scenarios is that the failed flash card indicates that the data on the card is lost and may only be reconstructed if a new flash card is inserted in its place, while the failed DDN card 38 means that data, if any, on the flash card within the DDN card remains safe and is available when the system discovers the DDN card. For example, the improper insertion of the DDN card in the PCIe slot is fixed by proper plugging in of the card into the slot. In the event of the single channel failure, the data reliability is ensured. The reconstructed data is marked with high priority for flush, and the new data is protected by adaptively selecting a full RAID stripe of the size H=H−1.

Specifically, referring to FIGS. 12A-12B, upon booting up the flash node 32 in block 500, the flash management software 106 performs the "device discovery" routine in block 502, and detects the number H of the healthy DDN cards in block 504, where H=N+1. The logic further flows to block 506 to determine whether the number H of the healthy DDN cards meets the requirement of the minimum number X of the healthy DDN cards. If in block 506, the logic determines that the minimum number X of the healthy DDN cards in the system sufficient to support the striping operation is not met, the logic flows to block 510 and the system "goes" offline requiring the system administrator intervention, as discussed in previous paragraphs with regard to FIG. 9.

If however, in block 506, the minimum requirement of number X of the healthy DDN cards in the system 10 is met, the logic flows to block 508 to perform static allocation of the RAID stripe from H=N+1 healthy DDN cards.

The configurations of the flash operation in block 512 are transmitted to block 514 where the system continues with normal flash node operation.

The system continually performs the routine of the "check event" to check for possible events during the normal flash node operations in block 516 in accordance with the flow chart presented in FIG. 10. If an event (or events) such as, for example, a flash channel failure event, is detected, F channels are marked as failed and the flash statistics is updated in block 518.

The logic further flows to the logic block 520 to determine whether F>1. If "yes", the logic flows to block 522 where the routine is performed corresponding to the multi-flash card failure presented in FIGS. 13A-13B and discussed in following paragraphs.

If, however, in block 520, F=1, the logic flows from block 520 to block 524 where a single channel failure is determined, so that the number H of healthy flash cards is updated to H=N+1−F. N+1 data may be reconstructed and is marked as high priority for flush.

The logic further flows to block 526 to determine whether the minimum number of X healthy DDN cards is met. If H is larger or equal to X, the logic flows to block 528 where the RAID stripe is adapted for the new number of the healthy flash cards H=H+1, and the flash statistics is updated to pass to block 514 to continue with normal flash node operation.

It however, in block 526 it is determined that the number of healthy flash cards does not meet the requirements of the minimum healthy flash cards, the system goes offline in block 510.

Figure 13A:
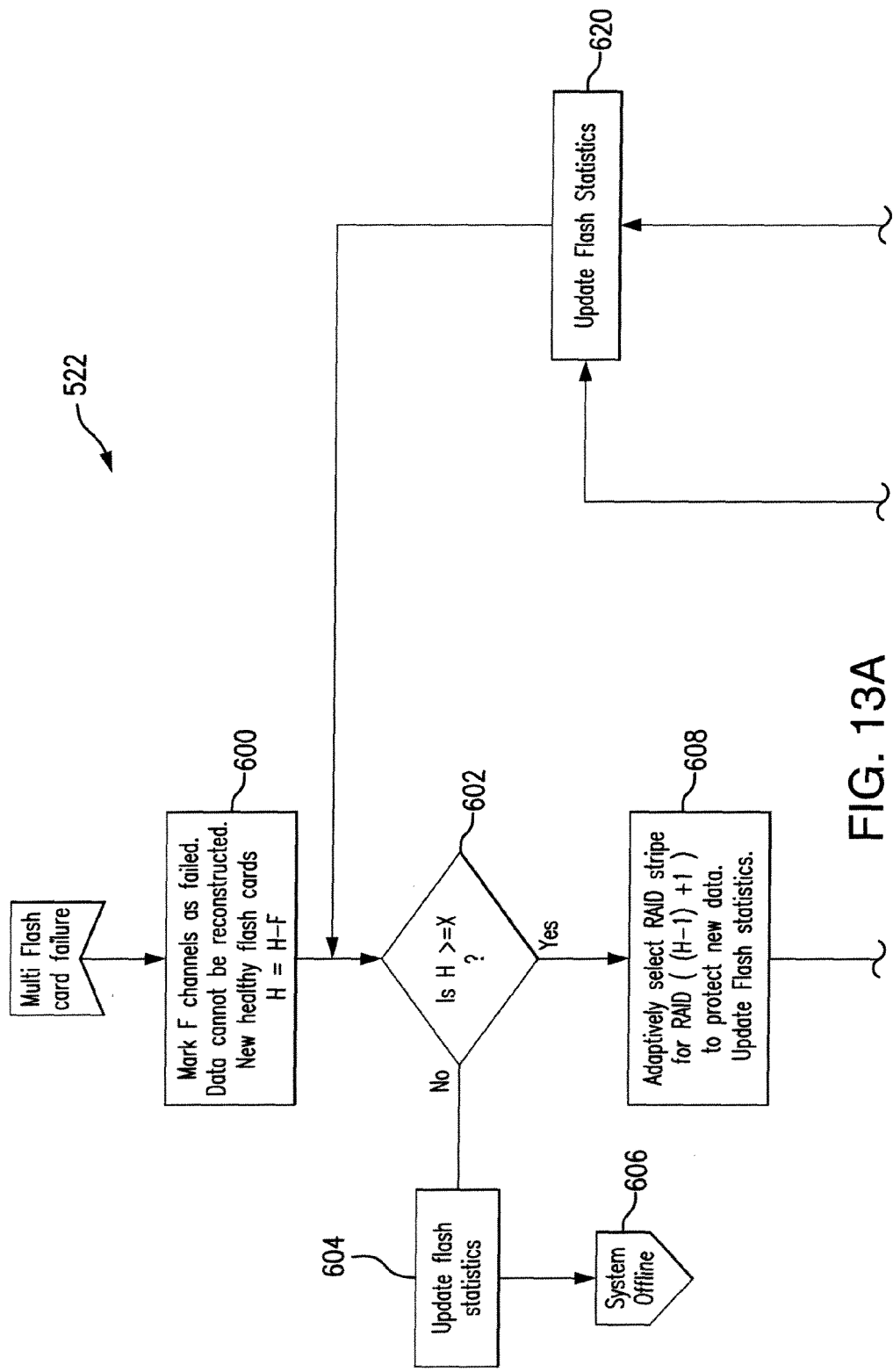
FIGS. 13A-13B represent a flow-chart diagram of the adaptive RAID stripe selection process when a multi-channel failure occurs due to a flash card failure in the RAID 5 configuration.
Figure 13B:
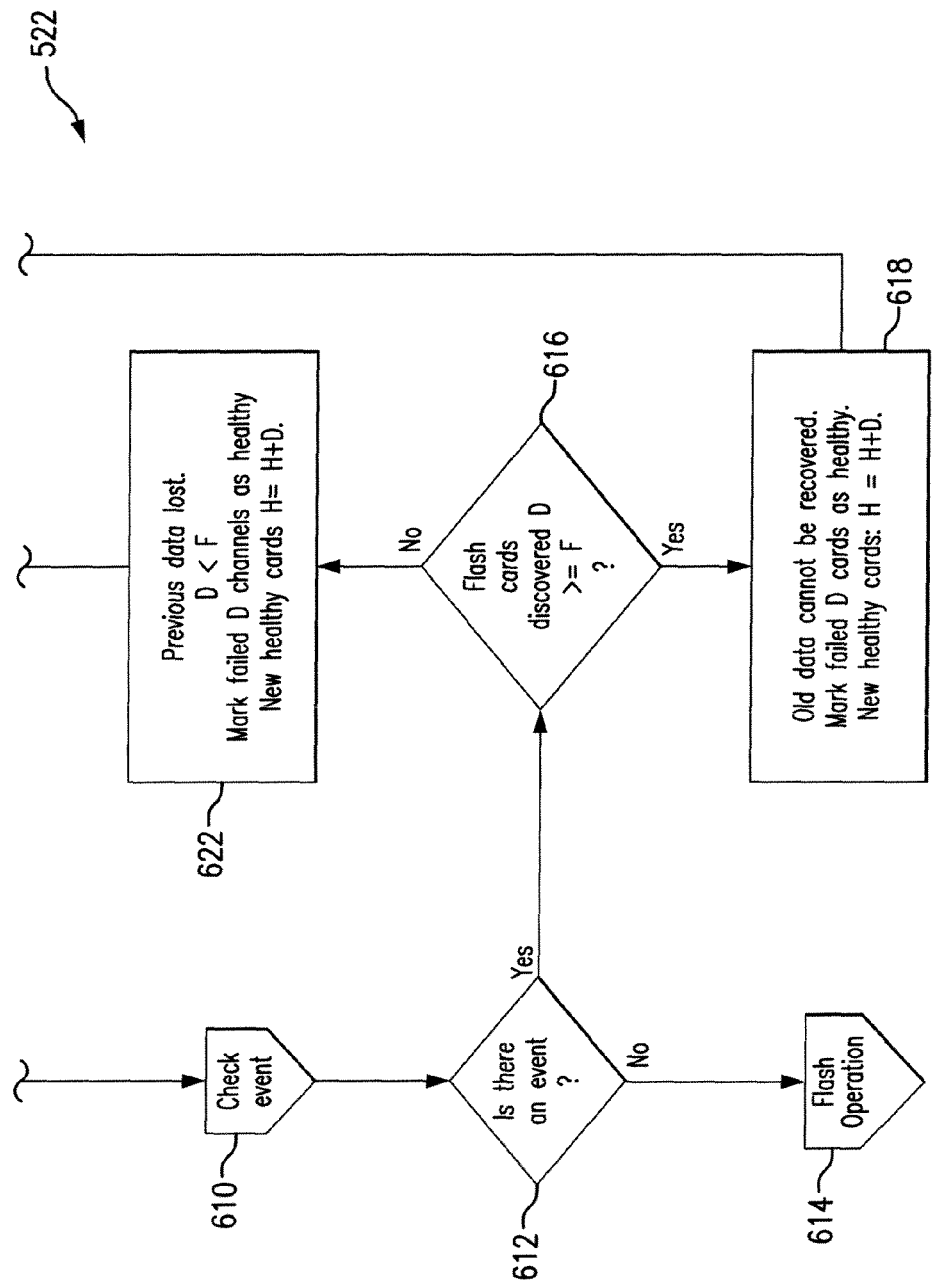

FIGS. 13A-13B demonstrate the multi-flash card failure scenario which is similar to the multiple DDN card failure discussed previously for RAID D+P with regard to FIGS. 11A-11B. A RAID stripe in the case of a multi-flash card failure scenario is adaptively selected for protecting the new incoming compute node data while previously existing failed channel data is marked as unavailable for further use. The new data is protected by RAID D+5 scheme using new full RAID stripe of the size H=H−F, where F is the number of failed channels.

Specifically, referring to FIGS. 13A-13B, when a multi-flash card failure is determined in block 520 of FIG. 12B, the logic in block 600 marks F channels as failed and the data cannot be reconstructed. The number of the new healthy flash cards H=H−F.

From block 600, the logic flows to the decision block 602, where it is determined whether the number of the healthy flash cards meets the minimum number X requirement preconfigured for the system. If the number H is smaller than the minimum number X, the logic flows to block 604 to update flash statistics, and the system goes offline in block 606. In block 606, the system administrator intervention is required to replace a failed flash card with the new one.

If, however, in block 602, the minimum number X requirement is met, the logic flows to block 608 where the RAID stripe size is adaptively selected for the new number of the healthy flash cards to protect new data, and the flash statistics is updated.

The logic in the adaptive RAID stripe selection unit 117 further passes to block 610 for the "check event" procedure similar to the "check event" process presented in FIG. 10. If there is an event detected (such as discovered healthy flash cards) in block 612, the logic flows to block 616 where the decision is made whether the number D of discovered flash cards exceeds or is equal to the failed flash cards. If in the block 616, D exceeds or is equal to F, the logic flows to block 618 where the failed D cards are marked as healthy, and the number H of the healthy cards is updated to H=H+D. In this case scenario the old data cannot be recovered.

If however, in the logic block 616, it is determined that D is smaller than F, the channels D are marked as healthy, new healthy cards number H=H+D, and the previous data are lost. The logic flows from block 618 and 622 to block 620 to update flash statistics, and further loops to block 602 to determine whether the new number H of healthy flash cards meets the requirements of the minimum number X of the flash cards sufficient to support the normal RAID striping operation in the system. If in block 612 no event is determined, the logic flows to block 614 to resume normal flash operation.

Figure 14A:
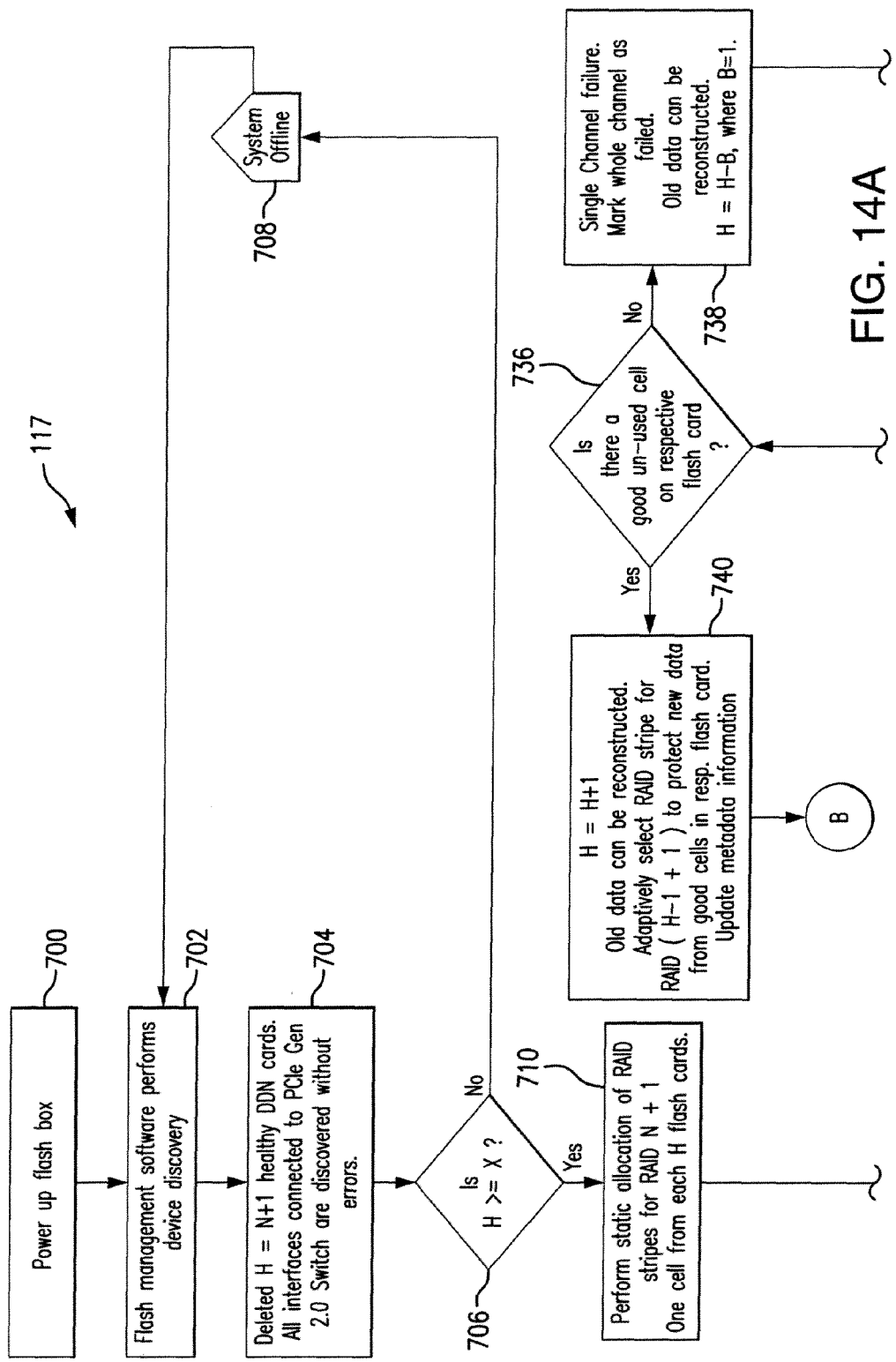
FIGS. 14A-14B represent a flow-chart diagram of the adaptive RAID stripe selection process when a flash cell failure is detected in the RAID 5 configuration.
Figure 14B:
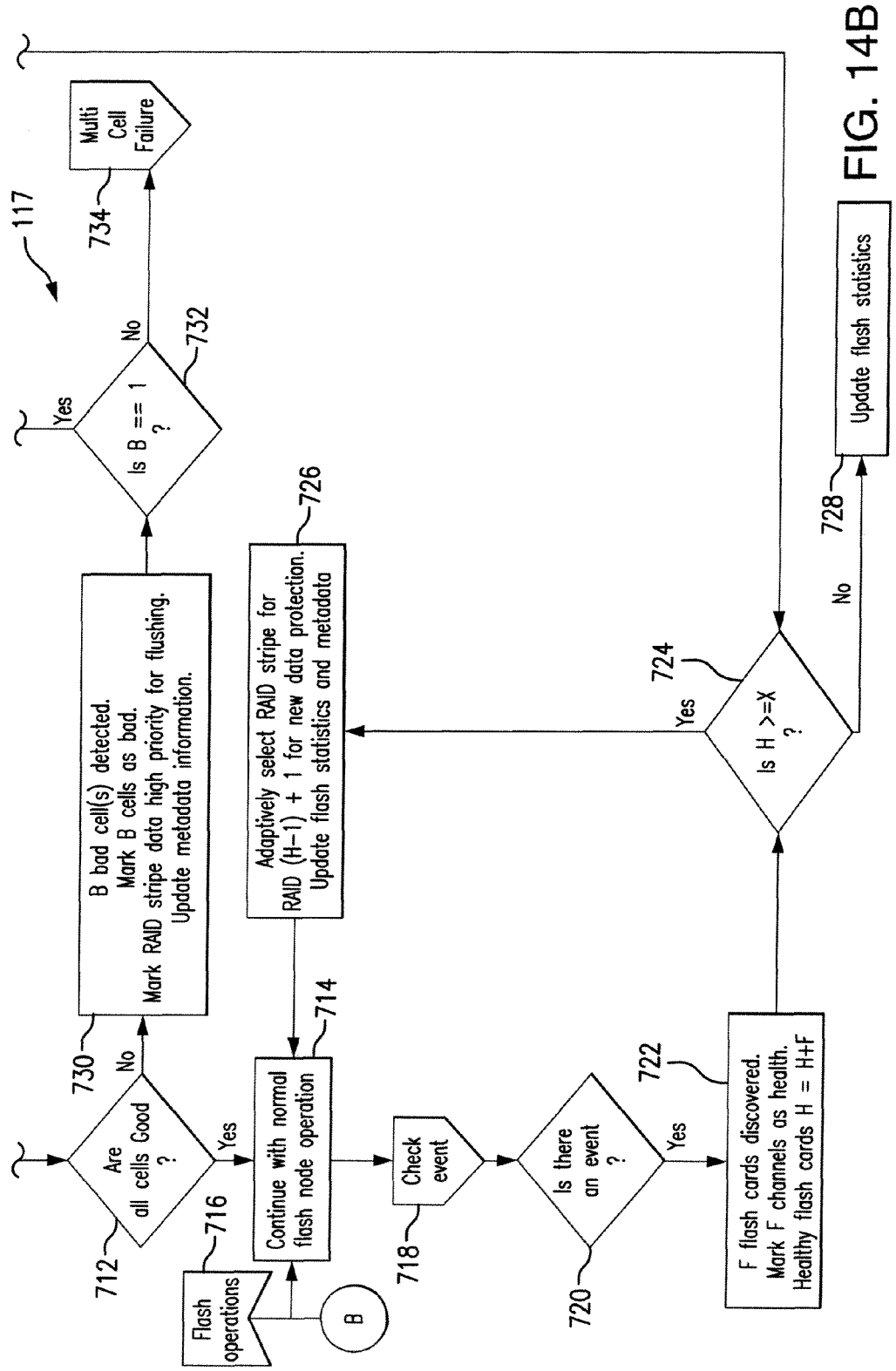

FIGS. 14A-14B demonstrates a flow chart diagram for the scenario of a flash cell failure. A flash card is divided into blocks or cells 119, best shown in FIG. 3. One cell 119 from each flash card 62 participates in forming a RAID stripe. The information about the health of the flash card's cells (or blocks) is monitored by the software 117.

Usually, the flash cells are sensitive and may often fail. Bad block manager software for flash node keeps track of the flash cells going bad. Thus, when a RAID stripe is allocated, and it is determined that one of the cells from a certain flash card has gone bad, another healthy cell from the same flash card is selected to form the RAID stripe. Thus, the old data in the cell marked as failed can be reconstructed for the RAID D+P scheme using redundant information.

The RAID stripe size doesn't change and new incoming data is still protected by the RAID D+P using a new RAID stripe of the same size. The RAID stripe size will not change as long as there are available unused healthy cells in the flash card which may participate in the RAID stripe building. In the event where no spare cells in a flash card are available, or an entire flash card is marked as failed, the RAID stripe adaptively changes to H=H−1 assuming there were H healthy components forming a RAID stripe.

Specifically, upon the booting up the flash node 32 in block 700, the adaptive RAID stripe selection unit 117 of the flash management software 106 performs device discovery in block 702 to detect the number of healthy DDN cards in the system. In block 704 the number H of the healthy DDN cards is discovered, the procedure passes to the decision block 706 where it is determined if the requirement for the minimum number X of the healthy DDN cards is met.

Figure 9:
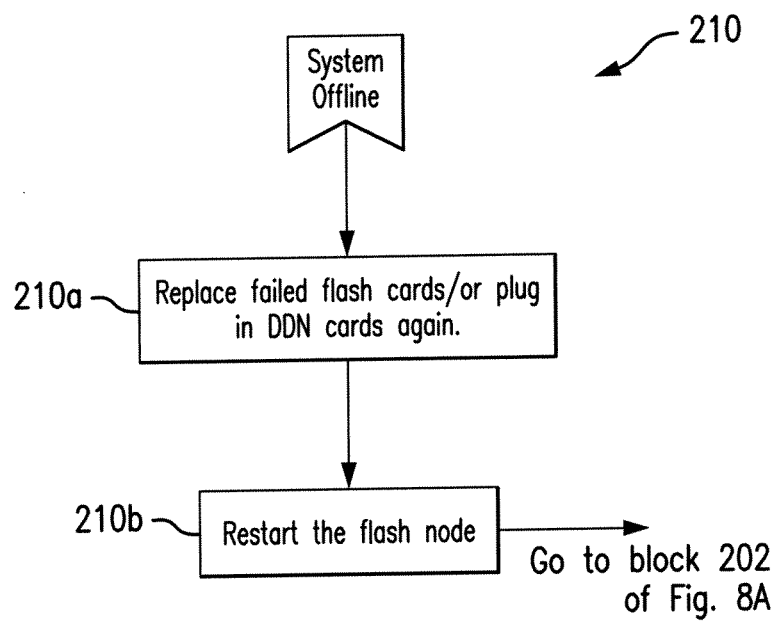
FIG. 9 is a flow-chart diagram of the system going off-line when a number H of "healthy" DDN cards is lower than a minimum pre-configured number X.

If the minimum requirement of the healthy DDN card is not met, the logic flows to block 708 for switching the system offline which requires the system administrator intervention similar to the process presented in FIG. 9 as discussed in previous paragraphs. Upon manual replacement of the failed or improperly plugged DDN cards, the logic loops to block 702.

If, however, in block 706, it is determined that the requirement for the minimum number X of the healthy DDN cards is met, the logic passes to block 710 where the static allocation of the RAID stripes is performed for the RAID scheme supported by N+1 components.

The logic further checks in block 712 whether all cells are good. If all cells are good, the logic flows from the decision block 712 to block 714 to continue with normal flash node operation. The block 716 shows the flow of logic for normal flash operation after a multi-cell failures are detected in block 734. The configuration of the system for the flash operation is obtained by block 714 from block 716.

From block 714, the logic passes to block 718 for the "check event" routine performed in accordance with the flow chart diagram presented in FIG. 10. Upon completion of the "check event" routine in block 718, the logic flows to the decision block 720 to determine if there is an event reported as a result of the "check event" routine.

In the case of a new event reported, the logic passes to block 722 where F flash cards are discovered so that the F channels are marked as healthy and the new number H of healthy flash cards discovered is updated to H=H+F. The logic further follows to the decision block 724 to determine whether H exceeds or is equal to the predetermined minimum number X of the healthy DDN flash cards. If the requirement is not met, the logic flows to block 728 to update flash statistics and further passes to the block 708 where the system goes offline.

If, however, in block 724, it is determined that the requirement for the minimum number X of the healthy flash card is met, the process flows to block 726 where the size of the RAID stripe is adaptively selected which may be supported by the available (H−1)+1 flash card for new data protection. The flash statistics and metadata are updated and the process loops into the block 714 to continue with the normal flash node operation.

If in block 712, it is determined that there are failed cells, e.g., B bad cells are detected, the logic flows to block 730 where B cells are marked as bad and RAID stripe data are marked high priority for flushing. The metadata information is updated, and the routine passes to the decision block 732 where it is determined whether a single or multi-cell failure is detected. If more than one defective cell is detected in block 732, the procedure flows to block 734 for adaptive RAID stripe selection according to the procedure corresponding to the multi-cell failure scenario with the RAID D+P protection as detailed in further paragraphs with regard to FIG. 15.

If, however, in the decision block 732, it is determined that a single failed cell is detected, the logic flows to the decision block 736 where it is determined whether there is a healthy unused cell on the respective flash card. If no more spare cells may be found in a flash card, the entire flash card is marked as failed under the single channel failure scenario. In this case, the number H of the healthy flash cards is H−B, where B=1.

In order to determine whether the new number of the healthy flash cards meets the minimum healthy cards requirement, the logic flows from block 738 to block 724.

If, however, in block 744, there are spare good cells available on the respective flash card, the logic passes to block 740 for adaptively selecting RAID stripe size for the new number H=H+1 healthy flash cards to protect new data from good cells in the respective flash cards. The metadata information is updated and all data can be reconstructed in this scenario. From block 740, logic passes to block 714 to continue with normal flash node operation.

Figure 15:
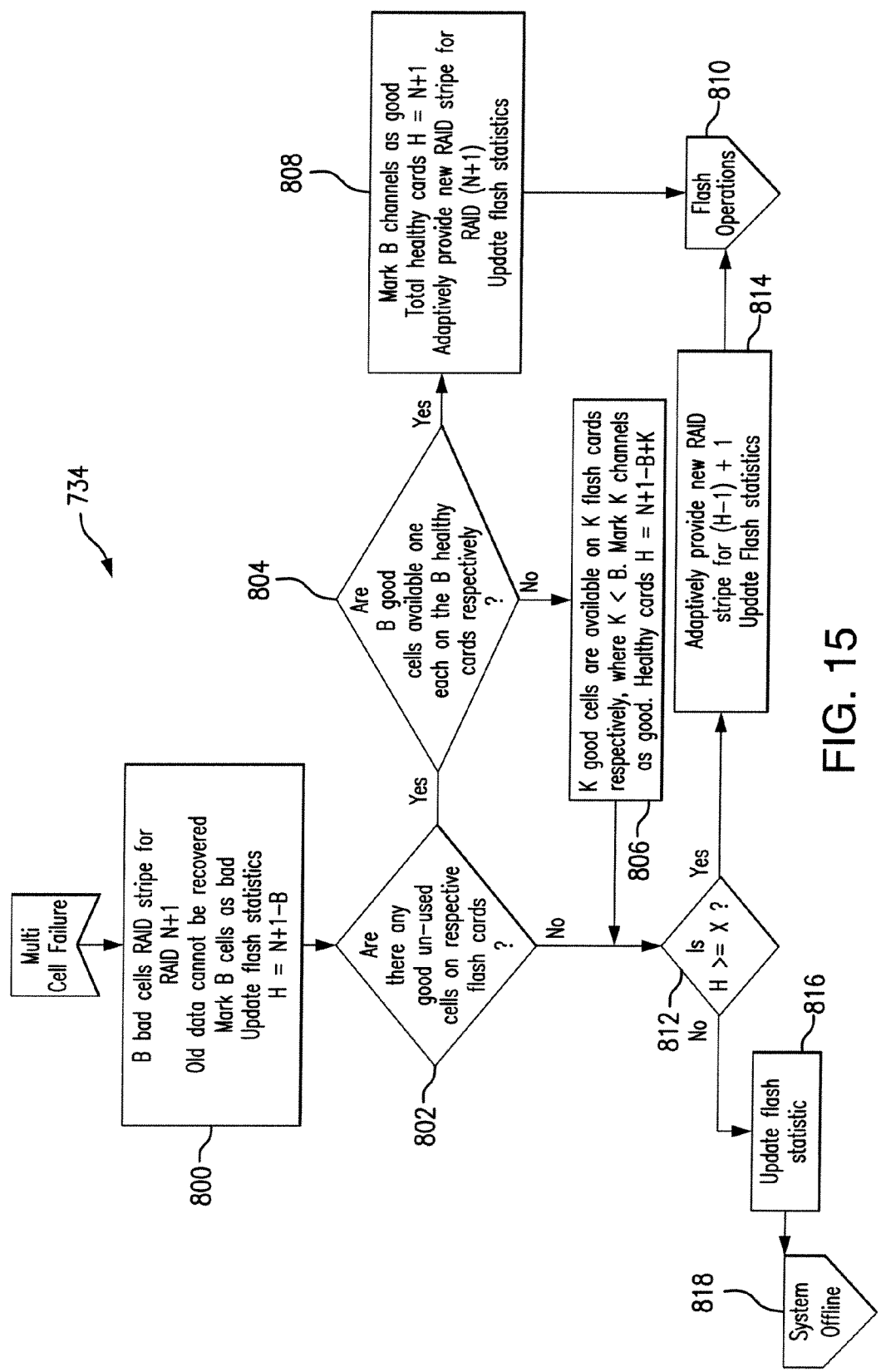
FIG. 15 is a flow-chart diagram of the adaptive RAID stripe selection process when a multi-cell failure occurs in the RAID 5 configuration.

Referring to FIG. 15, demonstrating the multi-cell failure scenario for the RAID D+P protection scheme, if more than one flash card reports "bad cells", and if these cells are a part of a RAID stripe, the RAID stripe size is not affected as long as there are spare healthy cells on respective flash cards that may replace bad cells in that RAID stripe. The RAID stripe size will change if there are no other spare cells available for use, or if the entire flash card is marked as failed. The old data cannot be recovered if two or more cells forming the RAID stripe "go bad" simultaneously. However, the new incoming data will be protected by RAID D+P protection scheme with RAID stripe of size H=H−F, where F indicates failed channels.

Specifically, as shown in FIG. 15, the adaptive RAID stripe selection for the multi-cell failure scenario with RAID D+P (RAID 5) protection scheme starts in block 800 where a number B of bad cells participating in a RAID stripe are detected. The B cells are marked as bad, and the flash statistics is updated for the new number of the cells H=N+1−B.

From block 800, the procedure flows to the decision block 802 to determine whether there are any good unused cells on respective flash cards. If there are spare good cells available, the logic flows to the decision block 804 to determine whether the B good cells are available, one each on the B healthy flash cards, respectively. If not, the logic flows to block 806 where K good cells are determined to be available on K flash cards, where K smaller than B.

K channels are marked as good, and the number of healthy cards H=N+1−B+K. The logic flows to decision block 812 to determine whether the criteria of the minimum number X of the healthy flash cards is met.

If in block 804, it is determined that there are B number of good cells available on each of the B healthy flash cards, respectively, the logic passes to block 808 where B channels are marked as good and the RAID stripe size is adaptively selected for the N+1 healthy cards. Flash statistics is updated and logic follows to block 810 to resume normal flash operations.

If in block 802, it is determined that there are no good spare cells on respective flash cards, the logic flows to the decision block 812 to determine whether the number of healthy flash cards H meets the minimum number X requirements. If the requirement is met, the logic flows to block 814 to adaptively provide a new RAID stripe size adjusted for the new number of the healthy flash card, e.g. (H−1)+1. The flash statistics is updated, and the procedure passes to the block 810 to resume normal flash operations.

If, however, in block 812, it is determined that the requirement for minimum healthy components is not met, the logic flows to block 816 to update flash statistics and the system goes offline in block 818.

FIGS. 16A-21B illustrate the adaptive RAID stripe selection process in the system configured for the RAID 6 (RAID D+$P_1$+$P_2$) protection. With the RAID 6 protection, the flash node 32 may tolerate 2 simultaneous channel failures, and by using redundancy may reconstruct the lost component data. The RAID stripe size will change (shrink or grow) in the event the entire channel is marked as failed due to either a flash card failure, DDN card failure, or an event discovery. The new data will be adaptively protected by the RAID 6 configuration with new RAID stripe of size H−F, where F could be 1, 2, or more, as long as the total number of healthy components forming the RAID stripe remains greater than the pre-configured minimum number X. If the number H of healthy components forming the RAID stripe is smaller than X, the system goes offline. The metadata information reflecting the RAID stripe changes is always updated along with other flash statistics which are maintained up to date. The normal operation is resumed once X or more healthy components forming an RAID stripe become available.

Figure 16A:
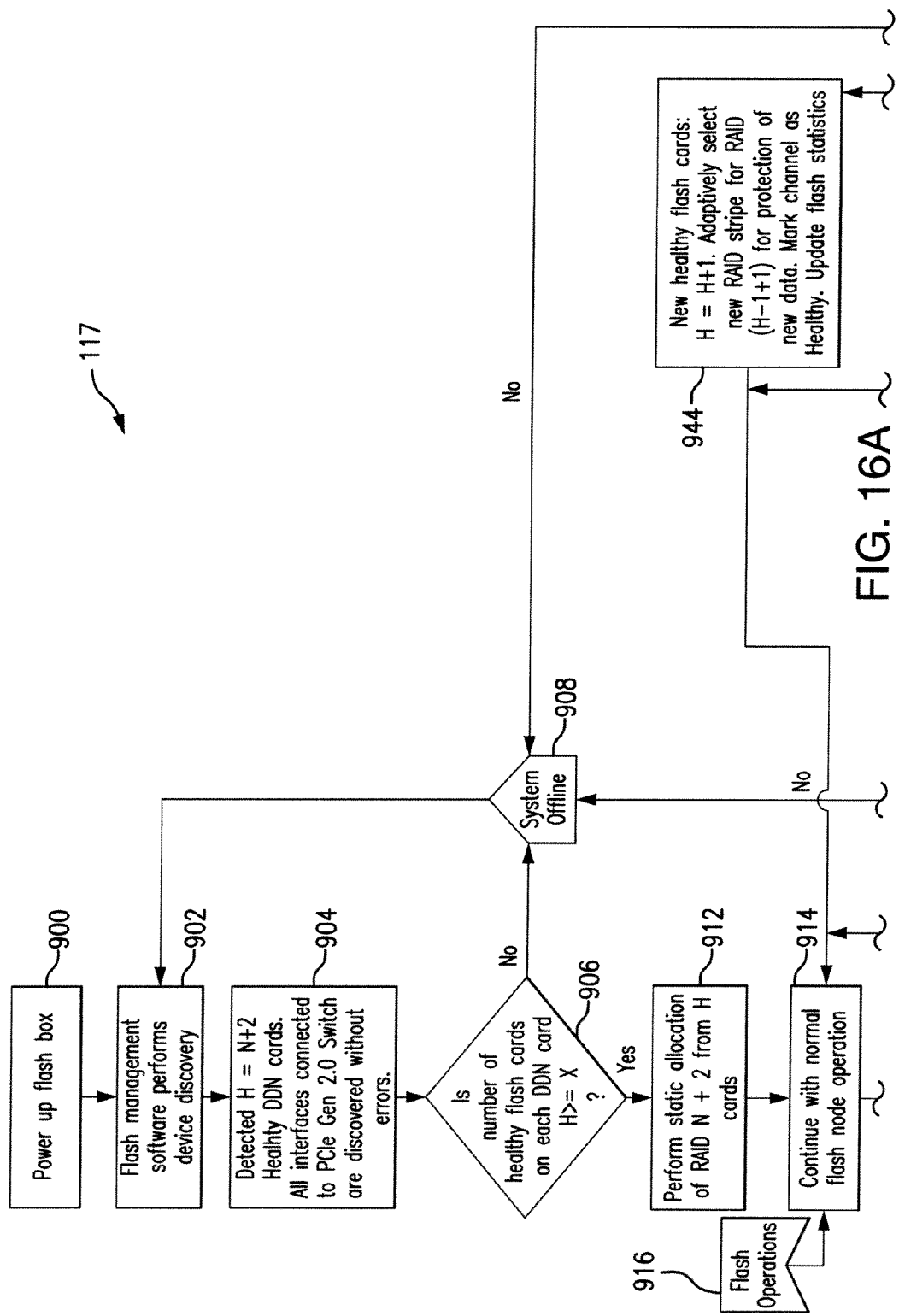
FIGS. 16A-16B represent a flow-chart diagram of the adaptive RAID stripe selection process when a DDN card failure occurs in the RAID 6 configuration.
Figure 16B:
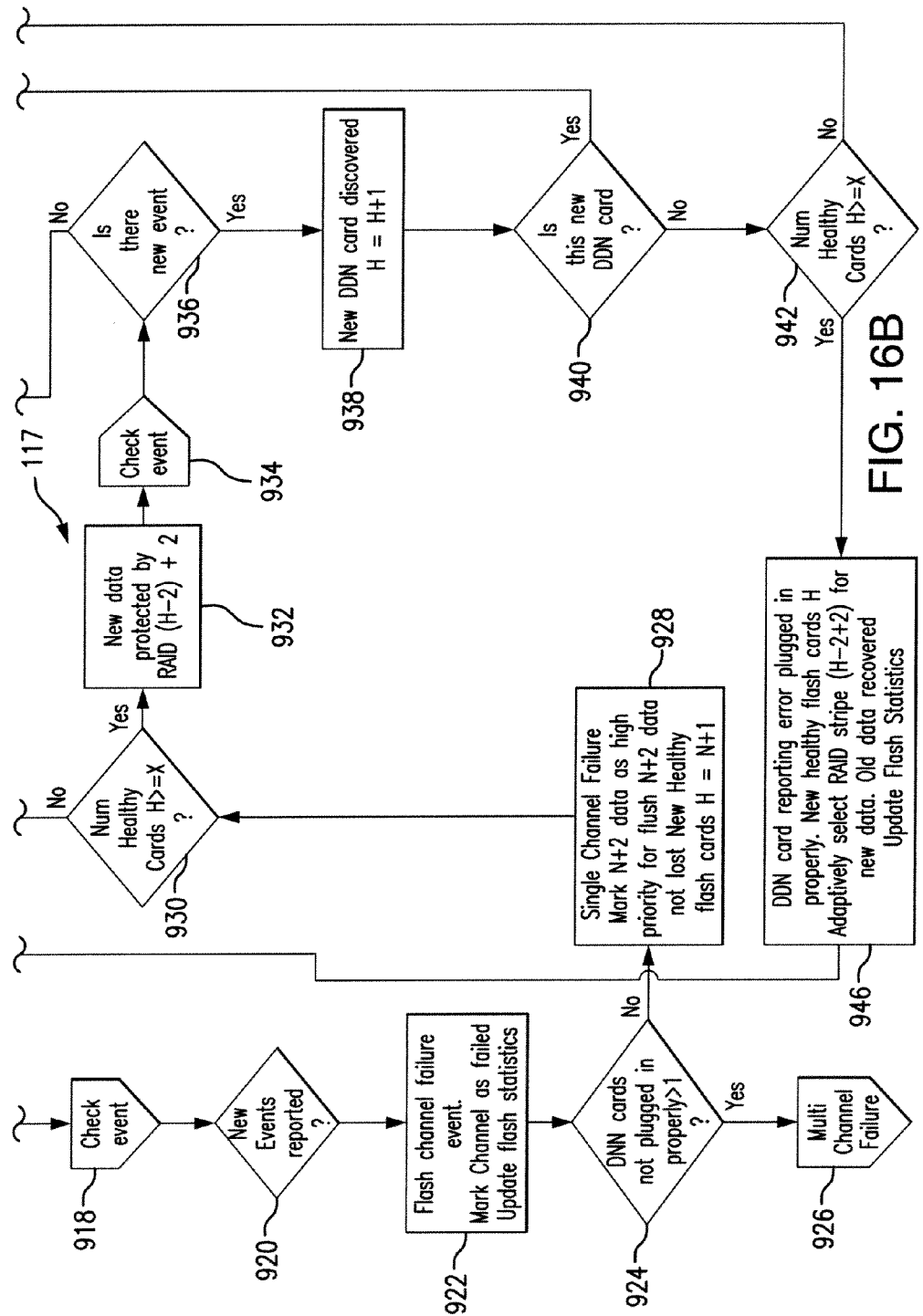

Specifically, referring to FIGS. 16A-16B showing the process of the adaptive RAID stripe selection for the DDN card failure detection scenario for the RAID 6 (D+$P_1$+$P_2$) configuration, upon booting up the system in block 900, the flash management software 106, and in particular the adaptive RAID stripe selection unit 117 performs device discovery in block 902. In block 904, H number of the healthy DDN cards are detected, where H=N+2, and all interfaces connected to the PCIe Gen 2.0 switch are discovered without errors. The logic flows to block 906 to determine whether the number of healthy flash cards H on each DDN card exceeds a predetermined minimum number X. If H<X, then the system goes offline in block 908 that requires the system administrator intervention to return to the block 902.

If, however, in the decision block 906, the logic determines that the minimum requirement is met, the procedure follows to block 912 to perform statistical allocation of all possible flash RAID stripes from N+1 DDN cards. The logic further follows to block 914 to continue with normal flash node operation in view of the configurations submitted from the flash operations block 916.

From block 914, the procedure flows to block 918 for the "check event" routine presented in FIG. 10 previously discussed. In the case of a new event reported in block 920, the procedure follows to block 922 to mark the flash channel as failed and updates the flash statistics. The logic further passes to the decision block 924 which determines whether the number of DDN cards which are not plugged in properly exceeds 1. If the number of the DDN cards which are not plugged in properly exceeds 1, the logic flows to 926 to perform the adaptive RAID stripe selection in accordance with a multi-channel failure procedure in block 926, as detailed in FIGS. 17A-17B to be further discussed.

If, however, in block 924, the number of the DDN cards which are not plugged in properly does not exceed 1, the logic flows to block 928 where the single channel failure is detected, and N+2 data are marked as high priority for flush. The new number of the healthy flash cards H=N+1 may participate in the striping procedure and in this situation N+2 data are not lost.

The logic flows to the decision block 930 where it is determined whether the new number H=N+1 of the healthy DDN cards meets the minimum number of healthy card requirements. If H is larger or equal X, the logic flows to block 932 where the new data are protected by RAID (H−2)+2, and the logic flows to block 932 for performing the "check event" routine corresponding to FIG. 10. If there is a new event discovered in block 936, the logic flows to block 938 "New DDN card discovered H=H+1".

Further, the procedure passes to the decision block 940 to determine whether the new DDN card discovered is a new card. If it is a new card, the logic flows to block 944 where the adaptive selection of the RAID stripe size is performed for the RAID (H−1+1) for protection of new data. The channel is marked as healthy, flash statistics is updated, and the logic flows to block 914 to continue with normal flash node operation.

If, however, in block 940, the discovered DDN card is not a new DDN card, the logic flows to decision block 942 where the number of healthy cards is checked on the minimum number of the healthy cards predefined for the system. If the minimum requirement is not met the logic flows from block 942 to block 908 for the system offline procedure. If however, in block 942, it is determined that the minimum number of healthy card requirements is met, the logic flows to block 946, where the DDN card reporting error is plugged in properly, and the RAID stripe size is adaptively selected for (H−2+2)

healthy components for new data. All data may be recovered, and flash statistics update is performed. From block 946, the procedure passes to block 914 to continue with normal flash node operation.

Figure 17A:
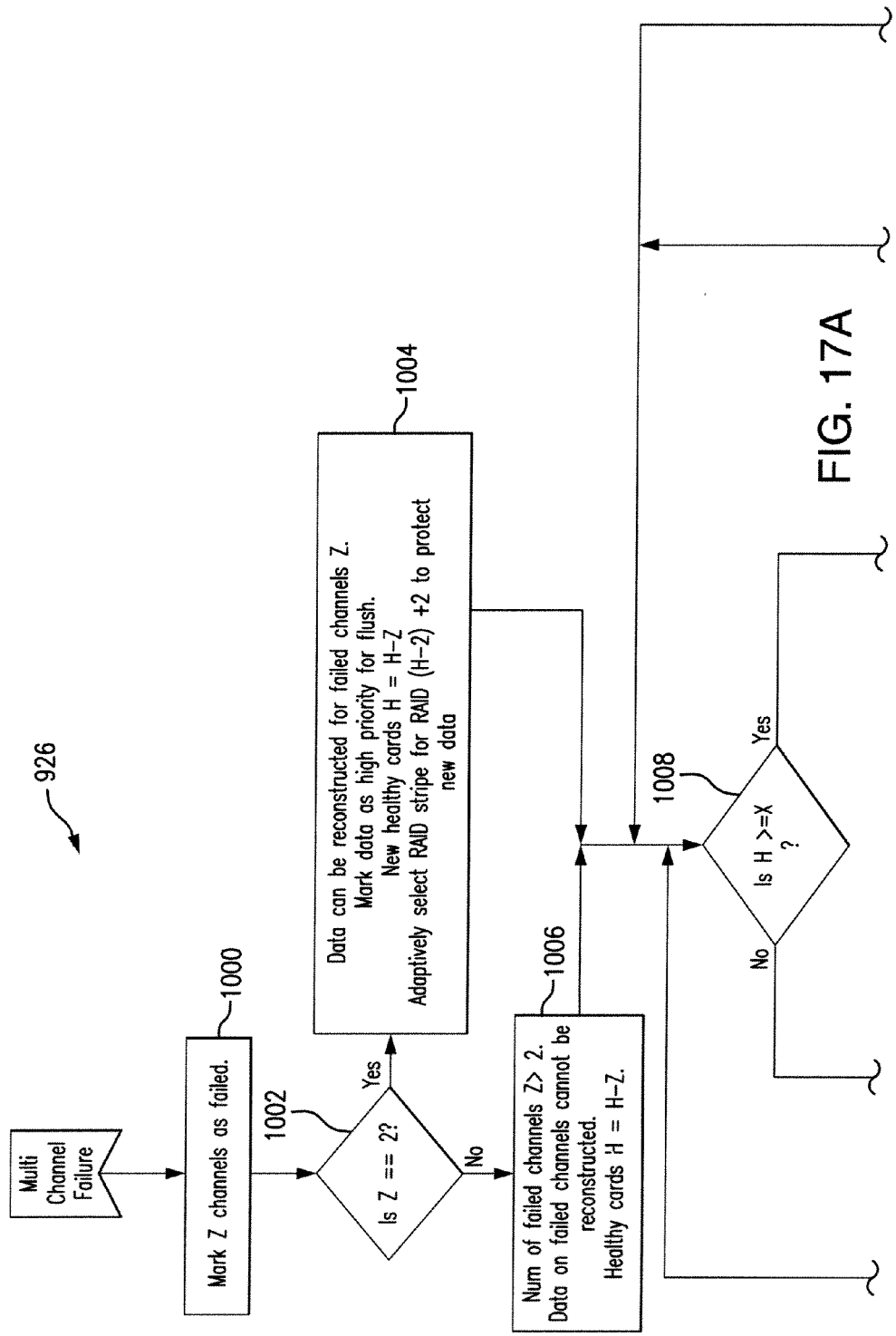
FIGS. 17A-17B represent a flow-chart diagram of the adaptive RAID stripe selection process when a multi-channel failure occurs due to a DDN card failure in the RAID 6 configuration.
Figure 17B:
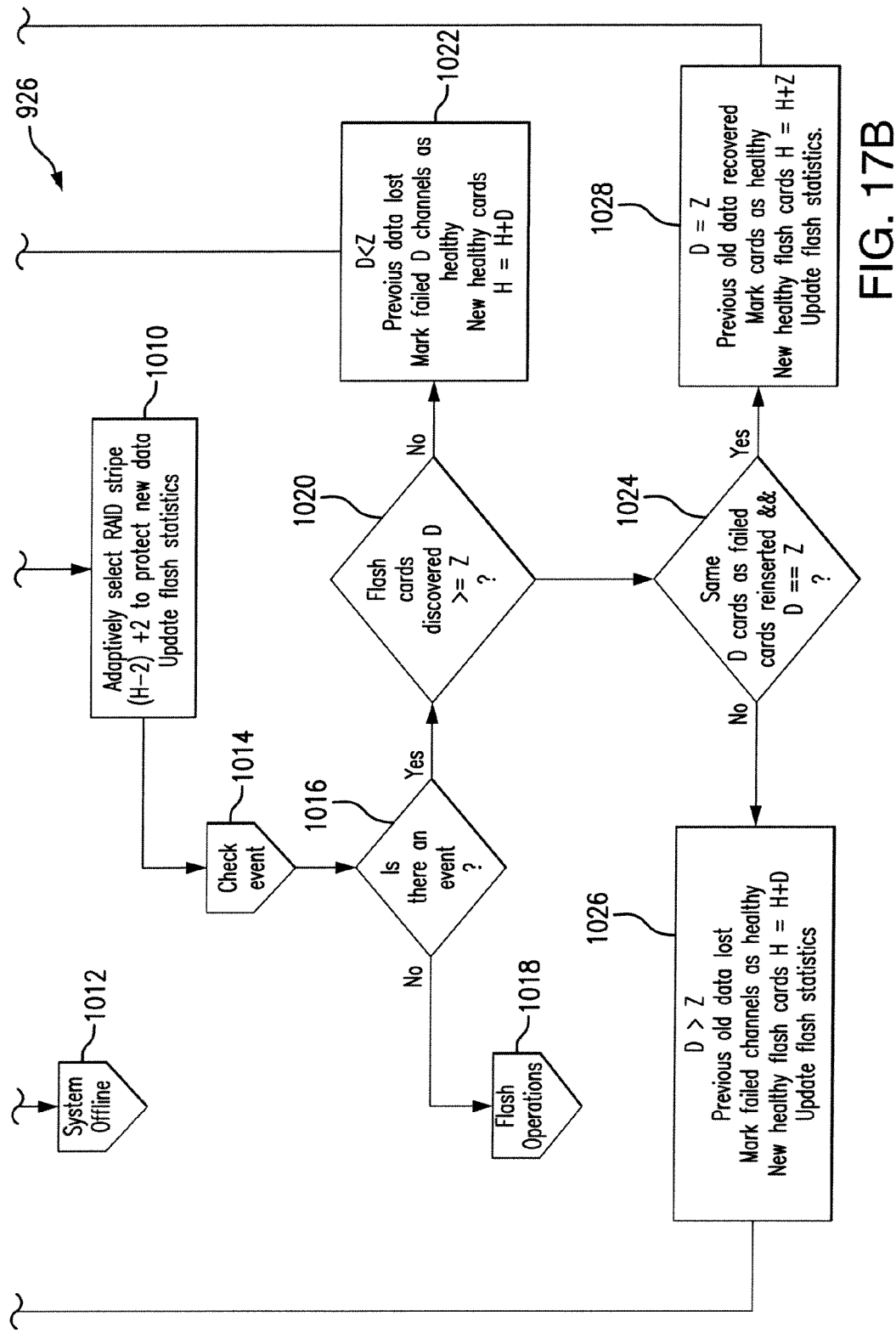

Referring to FIGS. 17A-17B, which detail the process of adaptive RAID stripe selection for the multi-channel failure scenario for RAID 6 configuration when multiple DDN card failures are detected, the process starts in block 1000 where Z channels are marked as failed. The logic proceeds to decision block 1002 to determine whether Z=2. If Z=2 the logic flows to block 1004 where the adaptive selection of the RAID stripe size for RAID (H−2)+2 scheme is performed to protect new data. The new number H of healthy DDN cards in H=H−Z. In this situation, data may be reconstructed for failed channels Z, and data is marked as high priority for flash.

If however, in the decision block 1002, Z is larger than 2, the data on the failed channels cannot be reconstructed. In block 1006, the number H of healthy cards is H=H−Z. From blocks 1004 and 1006, the logic flows to the decision block 1008 to determine whether the minimum number of healthy cards requirement is met. If the minimum number of healthy cards requirement is not met, the logic flows to block 1012 and the system goes offline which requires system administrator intervention in accordance with the flow chart presented in FIG. 9 previously discussed.

If, however, in the decision block 1008, the minimum number X of healthy cards requirement is met, the logic passes to block 1010 to adaptively select the RAID stripe size to the (H−2)+2 components to protect new data. Flash statistics is updated and the logic flows to block 1014 for "check event" routine detailed in previous paragraphs in conjunction with the flow chart diagram presented in FIG. 10.

If there is an event determined in block 1016, as a result of the "check event" routine of block 1014, the logic flows to the decision block 1020 to determine whether the number D of the discovered flash cards exceeds or equals the failed number Z. If the number of discovered flash cards D exceeds or is equal to Z, the logic flows to block 1040 to determine whether these are the same D cards as failed cards reinserted, D=Z. If yes, the logic flows to block 1028, where the cards are marked as healthy, and new number H of the healthy cards is H=H+Z. The flash statistics is updated and logic loops to block 1008.

If, however, in block 1024 it is determined that D is larger than Z, the logic passes to the block 1026, where the failed channels are marked as healthy, and the new number H of healthy card H=H+D. The flash statistics is updated, and the logic loops back to block 1008.

If in the decision block 1020, it is determined that D is smaller than Z, then logic flows to block 1022 to mark the D channels as healthy, where the new number H of healthy cards H=H+D and the previous data is lost. From block 1022 the procedure loops to block 1008.

If in block 1016, it is determined that there is no new event detected as a result of the check event procedure, the logic flows to block 1018 to resume normal flash operations.

Figure 18A:
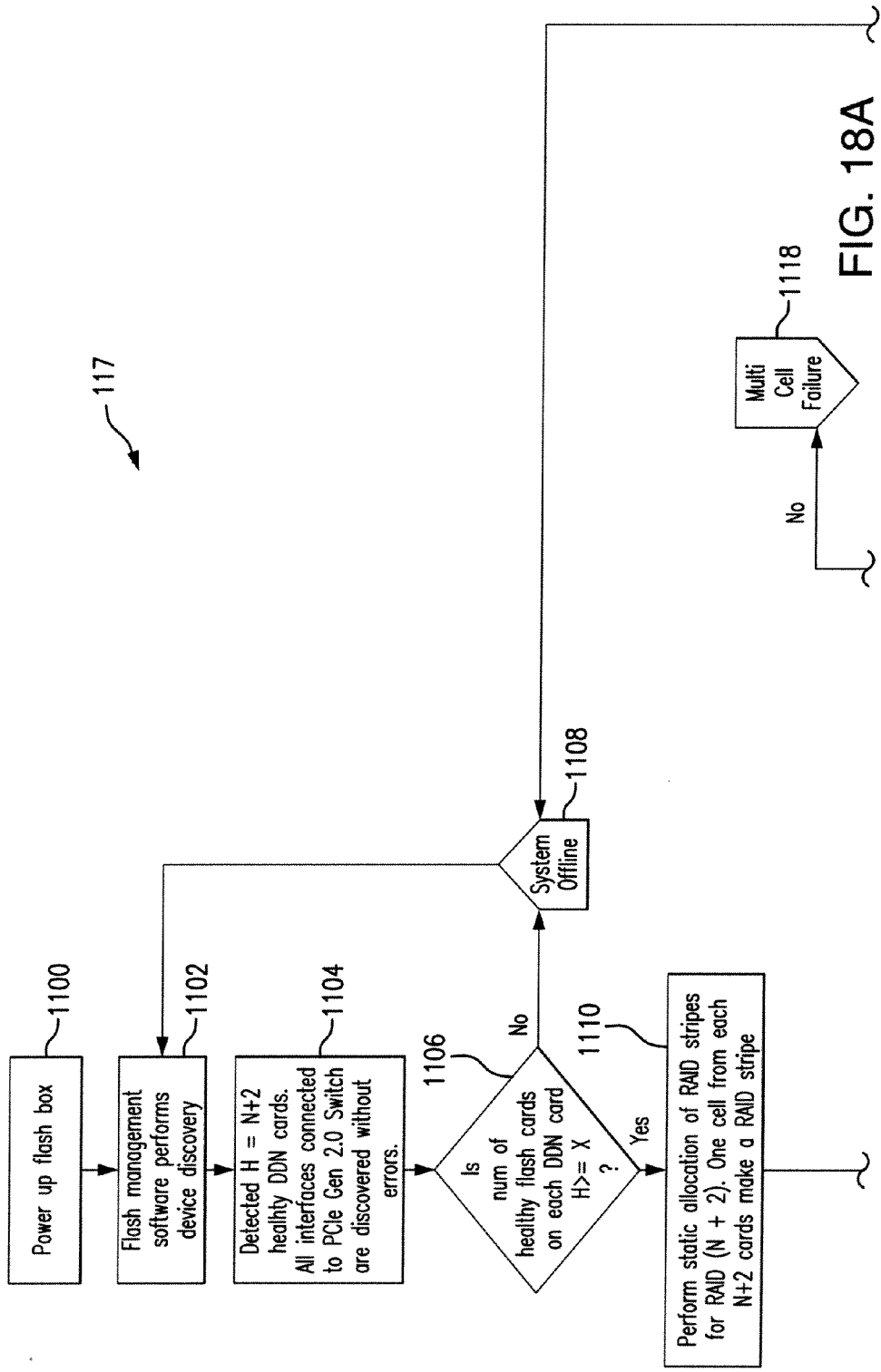
FIGS. 18A-18B represent a flow-chart diagram of the adaptive RAID stripe selection process when a flash cell failure is detected in RAID 6 configuration.
Figure 18B:
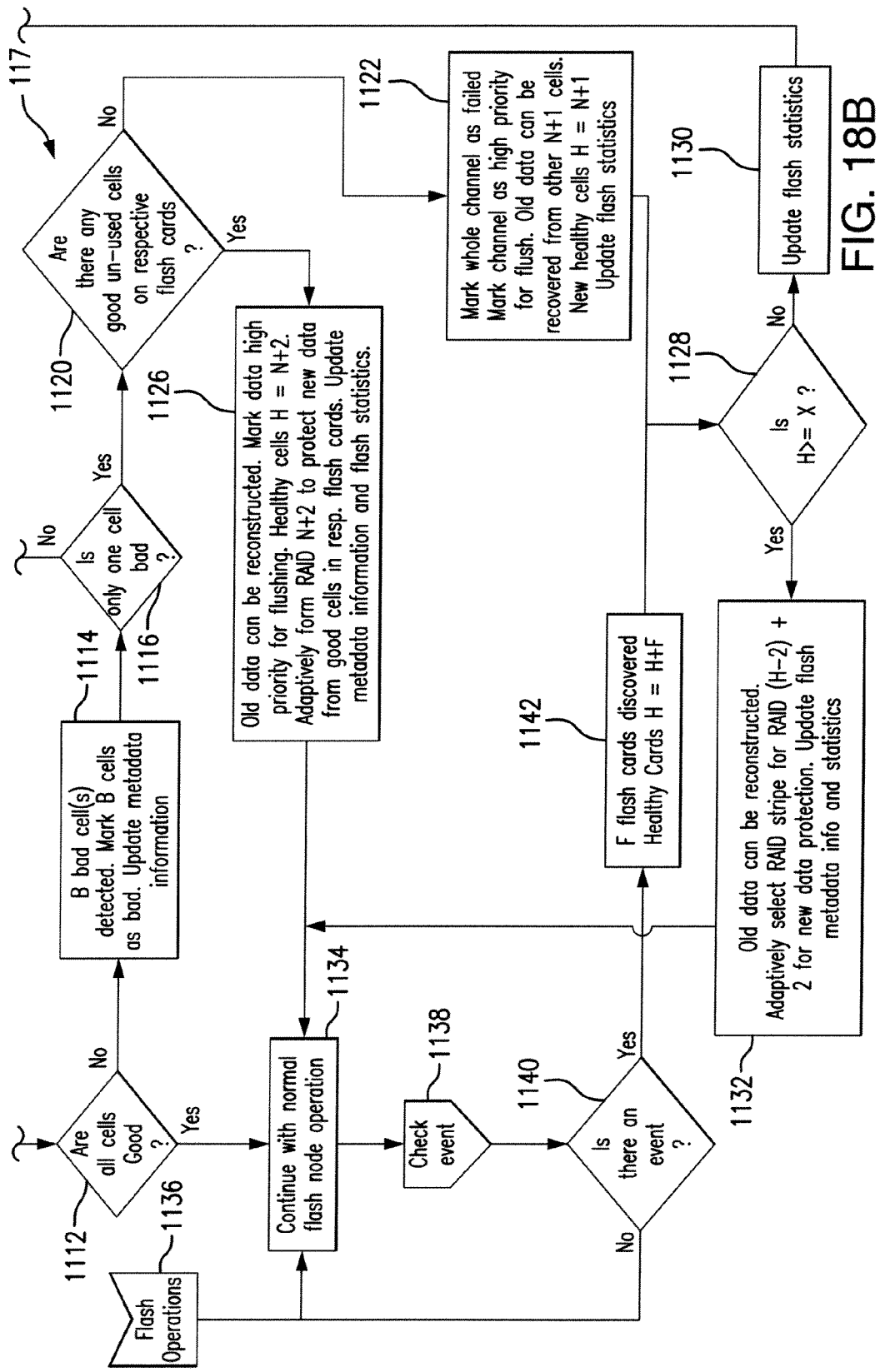

Referring to FIGS. 18A-18B, which detail the adaptive RAID stripe selection procedure for the flash cell failure scenario for the RAID 6 configuration, upon booting up the system in block 1100, the flash management software 106, and specifically the adaptive RAID stripe selection 117 thereof, performs the procedure of device discovery in block 1102. If all interfaces connected to the PCIe GEN 2.0 switch 46 are discovered without errors in block 1104, the number H=N+2 of healthy DDN cards is discovered. The logic flows to block 1106 to determine whether the number H of the healthy flash cards on each DDN card meets the minimum number of healthy cards X requirement. If the minimum number X of healthy cards requirement is not met, the system flows to the block 1108 and system goes offline as detailed in FIG. 9 and described in previous paragraphs. Upon system administrator intervention, the logic flows from the system of block 1108 to block 1102 to resume the routine of device discovery.

If, however, in the decision block 1106, the minimum number of the healthy cards requirement is met, the logic flows to block 1110, to perform statistical allocation of the RAID stripes for the RAID (N+2) healthy components. It is assumed that one cell from each N+2 cards contribute in the RAID stripe.

From block 1110, the procedure flows to the decision block 1112 to determine whether all flash cells 119 are good. If B bad cells are detected, the B cells are marked as bad, and the metadata information is updated in block 1114. The logic further flows to decision block 1116 to determine if one or more of the cells are bad. If only one cell is bad, the logic flows to the decision block 1120 to detect whether there are good unused cells on respective flash cards. If there are spare good cells, the logic passes to block 1126 to mark data high priority for flushing, and to adaptively form the RAID N+2 to protect new data from good cells in respective flash cards and old data may be reconstructed. The metadata information and flash statistics is updated, and the logic returns to block 1134 to continue with normal flash operation.

Figure 19A:
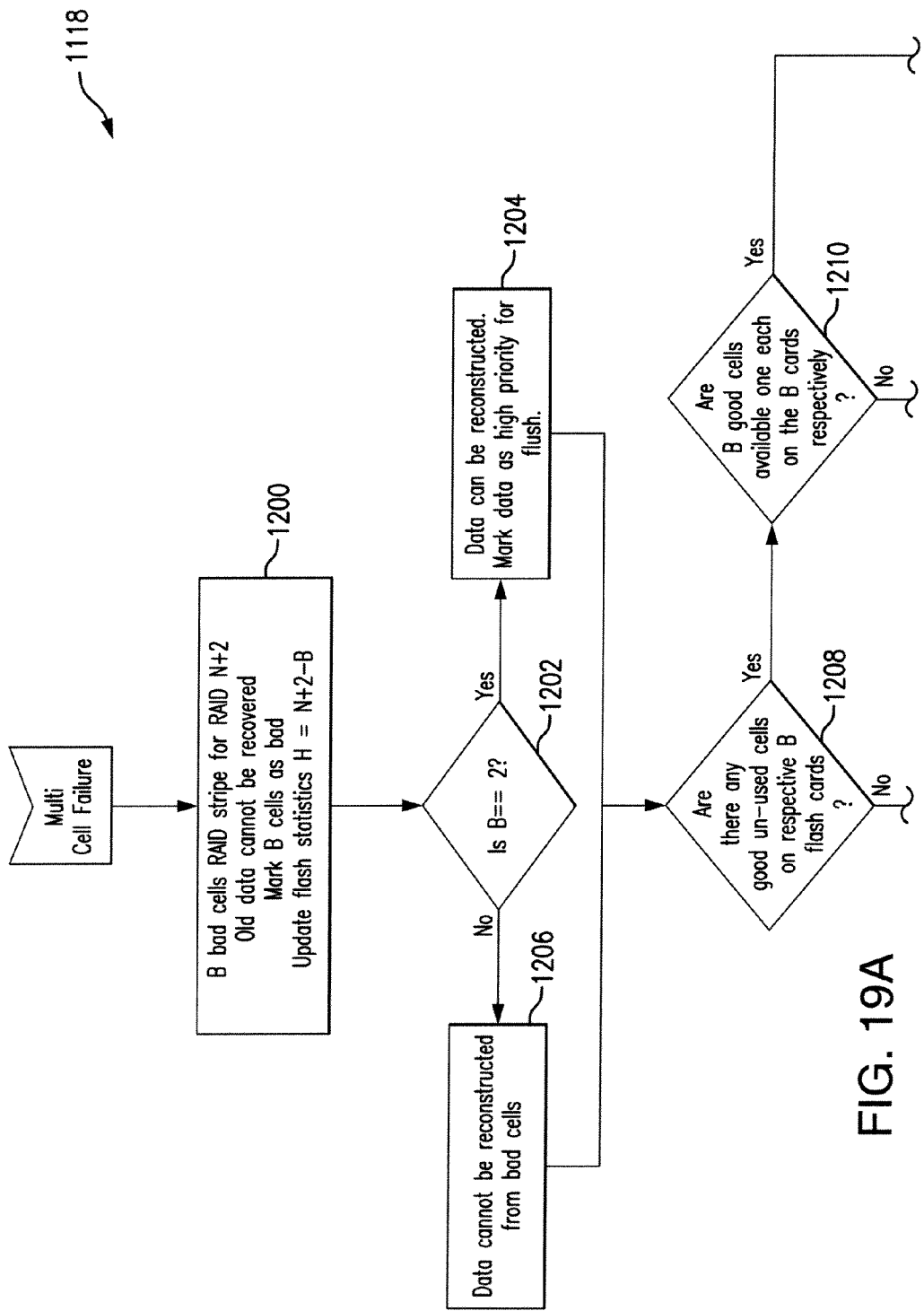
FIGS. 19A-19B represent a flow-chart diagram of the adaptive RAID stripe selection process when a flash cell failure is detected due to multi-cell failure in the RAID 6 configuration.
Figure 19B:
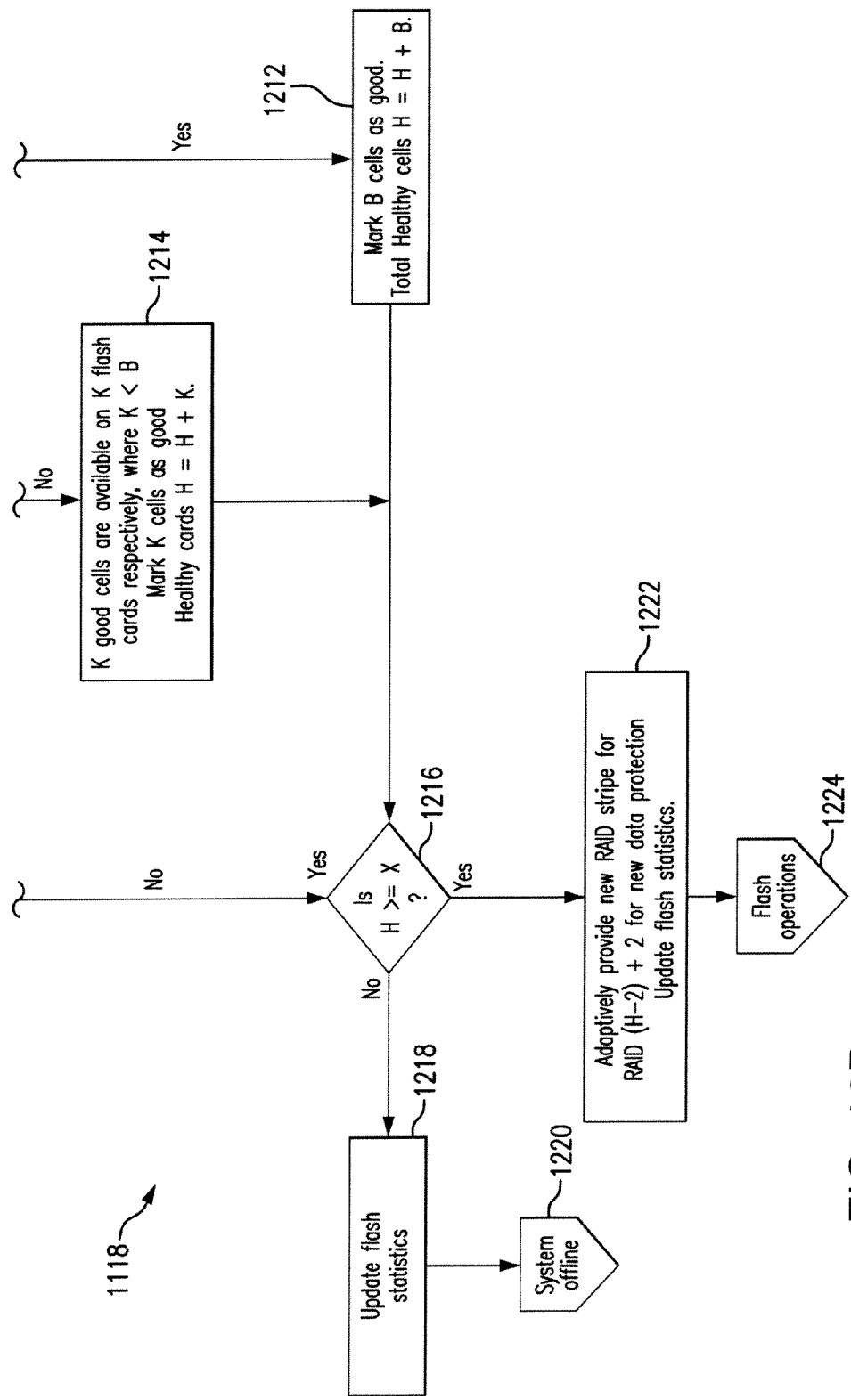

If, however, in block 1116, it is determined that more than 1 cell are bad, the logic flows to block 1118 to perform adaptive RAID stripe selection in accordance with multi-cell failure strategy presented in FIGS. 19A-19B and discussed in further paragraphs.

If in the decision block 1112, all cells are found healthy, the logic flows to block 1134 to continue with normal flash node operation. The logic further flows to block 1138 for the "check event" procedure which was discussed in conjunction with FIG. 10. If in the decision block 1140 it is determined that there are no new events detected during the check event procedure, the logic flows to block 1136 "Flash Operation" and block 1134 to continue with normal flash node operation.

If however, in the decision block 1140, the logic determines that there is a new event detected as a result of the "check event" routine, the flow chart passes to the block 1142 where in the case of F flash cards discovered, a number H of healthy cards H=H+F. From block 1142, the logic passes to the decision block 1128 to determine whether the number H of the new healthy cards meets the minimum number X of healthy cards requirement. If the minimum healthy cards requirement is met, the logic flows to block 132 to perform adaptive RAID stripe selection for RAID (H−2)+2 for new data protection, to update statistics and flash metadata information, and to return to block 1134 to continue with normal flash node operation.

If, however, in the decision block 1128 the minimum healthy cards requirement is not met, the logic flows to block 1130 to update flash statistics and loops to the "System Offline" block 1108.

If in the decision block 1120, no good spare cells on respective flash cards have been found, the logic flows to block 1122 where the entire channel is marked as failed, and the channel is marked as high priority for flush and all data may be recovered from the other N+1 cells. New healthy cells number H=N+1. This new healthy cells number is checked in the decision block 1128 for the minimum number X of healthy cells requirement.

Referring to FIGS. 19A-19B, which detail the adaptive RAID stripe selection procedure for multi-cell failure scenario for RAID 6 configuration, the procedure starts in block 1200 where B bad cells participating in RAID stripe for RAID N+2 protection scheme are found. These bad cells are marked as bad, and the flash statistics is updated. In this situation the old data cannot be recovered. The logic flows to the decision block 1202 to determine whether B is equal to or is larger than 2. If B is larger than 2, the logic flows to block 1206 "Data cannot be reconstructed from bad cells".

If however, in the decision block 1202, it is determined that B=2, the logic flows to block 1204 where the data can be reconstructed. The data is marked as high priority for flush. From both blocks 1206 and 1204, the procedure flows to the decision block 1208 to find whether there are any good spare cells on respective B flash cards. If there are B goods cells available, the logic flows from the decision block 1208 to the decision block 1210 to determine if there are B good cells available, one each on the B cards respectively. If there are B good cells available one each on the B cards respectively, the logic flows to block 1212 where the B cells are marked as good so that the total healthy cells number H=H+B. If, however, in block 1210 there are not B good cells available, one each on the B cards respectively, the logic flows to block 1214, where K good cells are available on K flash cards respectively, where K<B. The K cells are then marked as good. The number of the healthy cards is H=H+K. From blocks 1214 and 1212, the logic flows to the decision block 1216 to check whether the requirement for minimum number X of healthy cards is met.

If in the decision block 1208, there are not good unused cells on respective B flash cards, the logic flows to block 1216 to determine whether the minimum requirements for the number X of healthy cards is met. If there is a number H of the healthy cards exceeding or equal to the minimum number X of healthy cards predefined for the system, the logic flows to block 1222 to adaptively provide new RAID stripe for RAID (H−2)+2 for new data protection. The flash statistics is updated and the logic flows to block 1224 to resume the normal flash operations.

If, however, in block 1216 it is determined that the minimum number of healthy cards requirement is not met, the logic flows to block 1218 to update the flash statistics and further flows to block 1220 to switch the system offline.

Figure 20A:
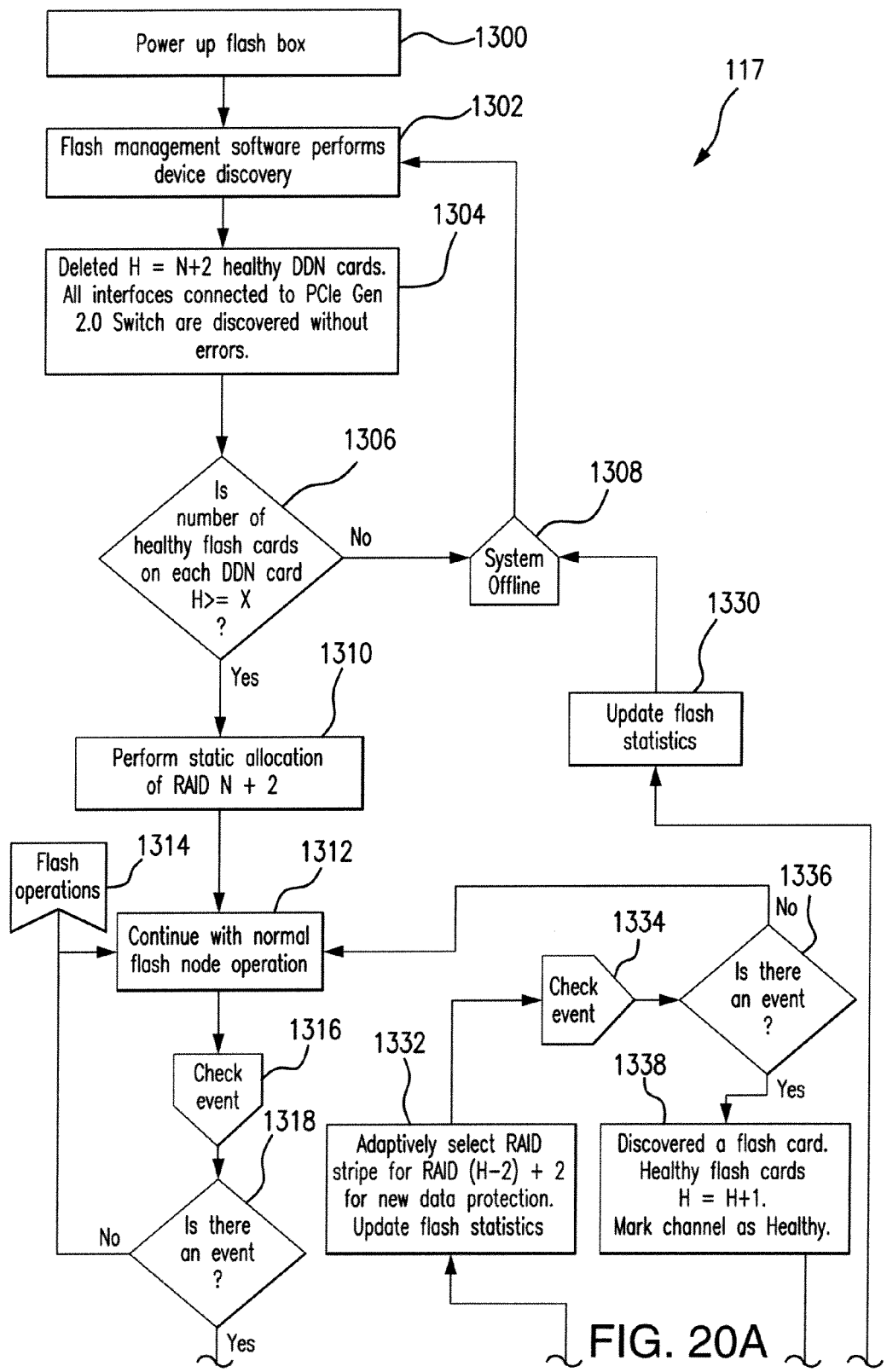
FIGS. 20A-20B represent a flow-chart diagram of the adaptive RAID stripe selection process when a flash card failure is detected in the RAID 6 configuration.
Figure 20B:
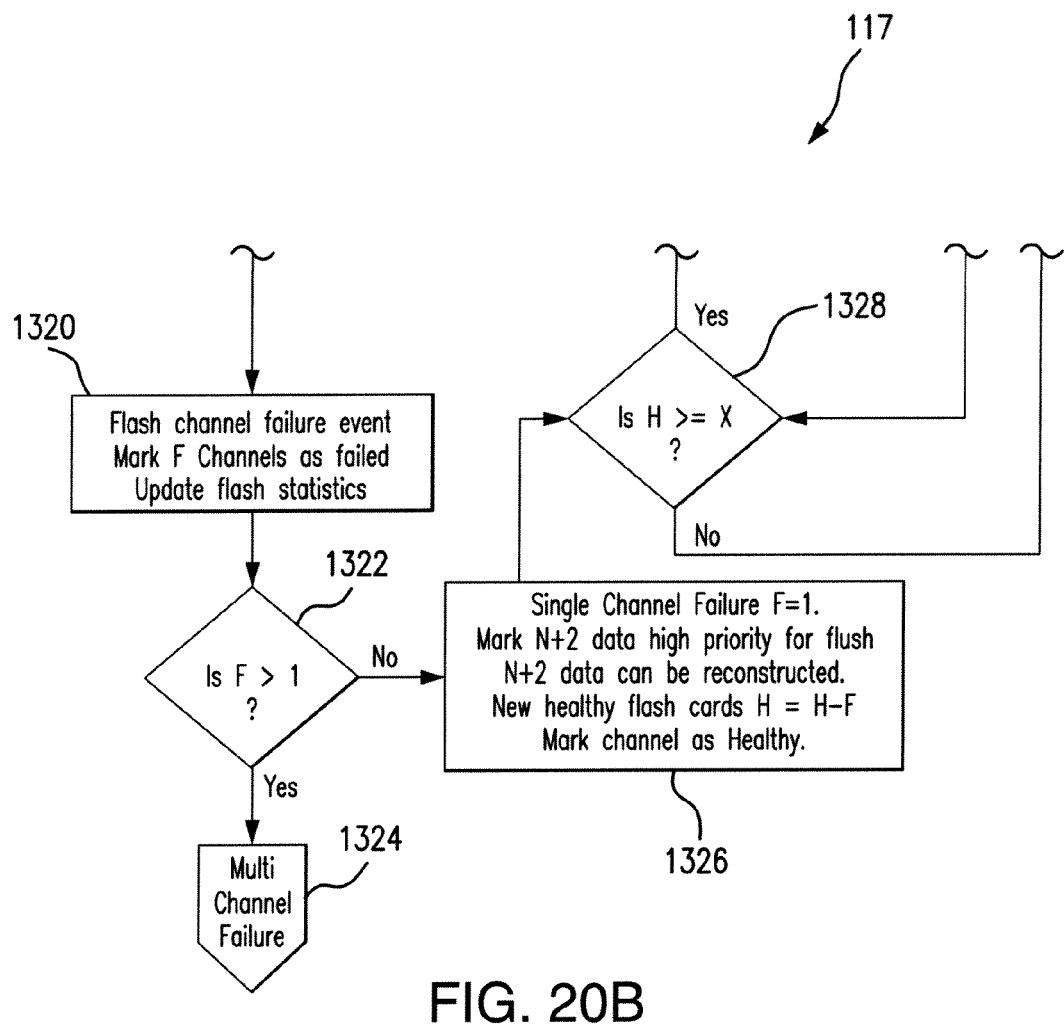

Referring to FIGS. 20A-20B which detail the adaptive RAID stripe selection procedure for the flash card failure scenario for RAID 6 (D+$P_1$+$P_2$) configuration, upon booting up the system in block 1300, the logic flows to block 1302 to perform device discovery. When H=N+2 of the healthy DDN cards is discovered in block 1304, the logic flows to the decision block 1306 to determine whether the detected healthy DDN cards number H meets the minimum number X of the healthy card requirement. If the requirement is not met, the logic flows to the block 1308 to switch system offline that requires system administrator intervention as presented in previous paragraphs in conjunction with FIG. 9.

If, however, in the decision block 1306, the minimum healthy card requirement is met, the logic performs static allocation for the RAID N+2 configuration in block 1310 and continues with normal flash node operation in block 1312. Flash operation configurations are presented to block 1312 from block 1314.

From block 1312, the logic flows to block 1316 to perform the "check event" routine detailed in FIG. 10. If there is a new event discovered in block 1318, the logic flows to block 1320 to mark F channel as failed and to update flash statistics. If, however, in block 1318 it is determined that no new event is found the logic returns to block 1312 to continue with a normal flash mode operation.

From block 1320 the logic flows to the decision block 1322 to determine whether this is a single or multi-channel failure. If it is a multi-channel failure, e.g., F exceeds 1, the logic flows to block 1324 to perform the adaptive RAID stripe selection routine in accordance with the multi-channel failure scenario which will be detailed in further paragraphs in conjunction with FIGS. 21A-21B.

If, however, in block 1322, it is determined that it is a single channel failure, the logic flows to block 1326 where N+2 data is marked with high priority for flush and the N+2 data may be reconstructed. The channel is marked as healthy and the number of healthy flash cards H=H−F is discovered.

From block 1326 the logic flows to decision block 1328 to determine whether the new number H of healthy flash cards meets the minimum number of healthy cards requirement. If the requirement is not met the logic flows to block 1330 to update flash statistics, and further flows to block 1308 to switch the system offline for system administrator intervention. If, however, in block 1328 it is determined that the minimum healthy cards requirement is met, the logic flows to block 1332 where the procedure of the adaptive RAID stripe selection is performed for RAID (H−2)+2 healthy components for new data protection. The flash statistics is updated and the logic flows to block 1334 to perform the "check event" routine previously discussed.

If in block 1336, it is determined that no new event have been found, the logic flows to block 1312 to continue with normal flash node operation. If, however, in the decision block 1336 it was determined that a new event has been detected, the logic flows to block 1338 to mark the channel as healthy and to change the healthy flash cards number H to H=H+1 due to the discovered flash card. From block 1338, the logic passes to the decision block 1328 to check the minimum healthy cards requirements.

Figure 21A:
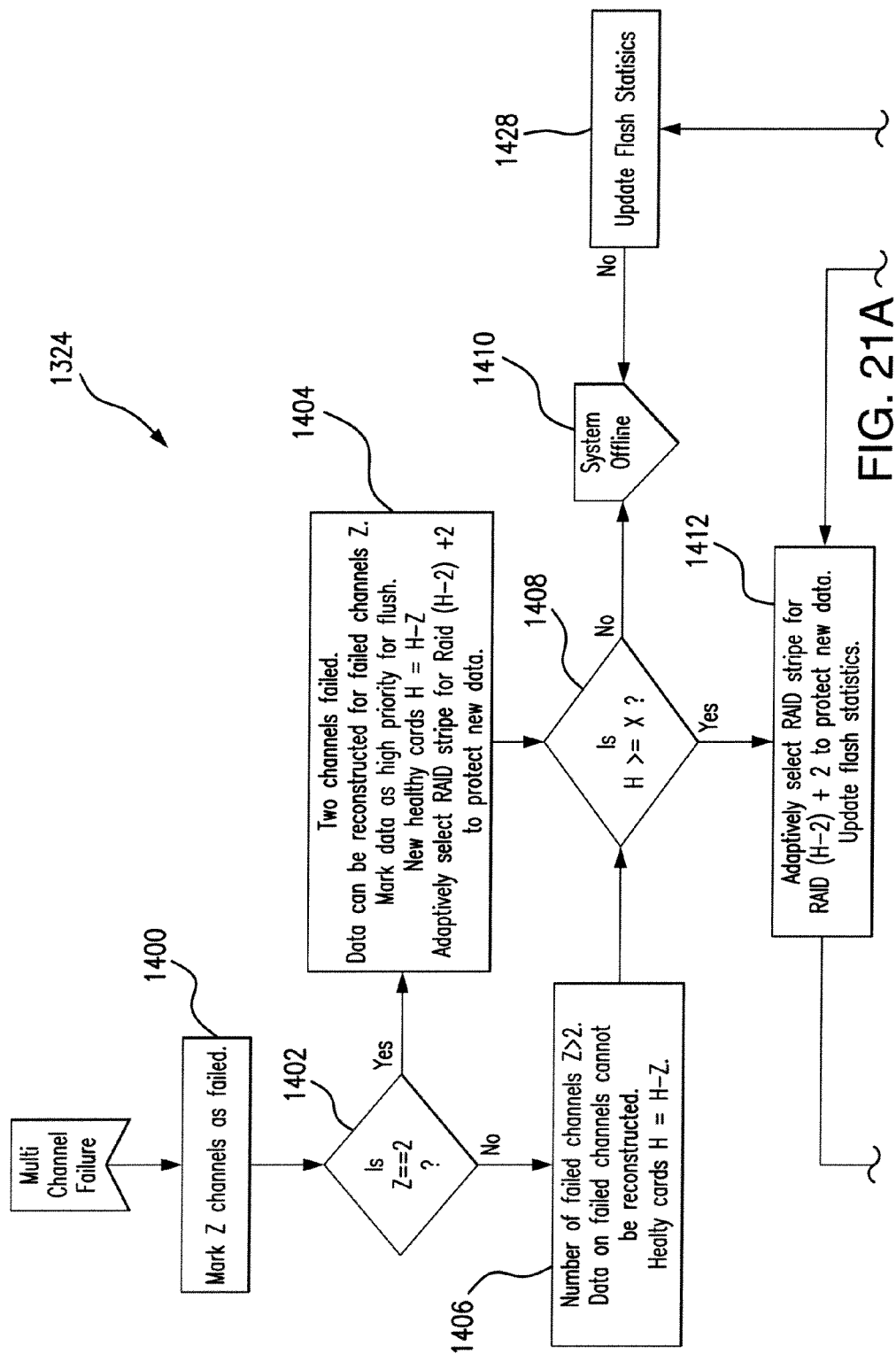
FIGS. 21A-21B represent a flow-chart diagram of the adaptive RAID stripe selection process when a multi-channel failure occurs due to a flash card failure in the RAID 6 configuration.
Figure 21B:
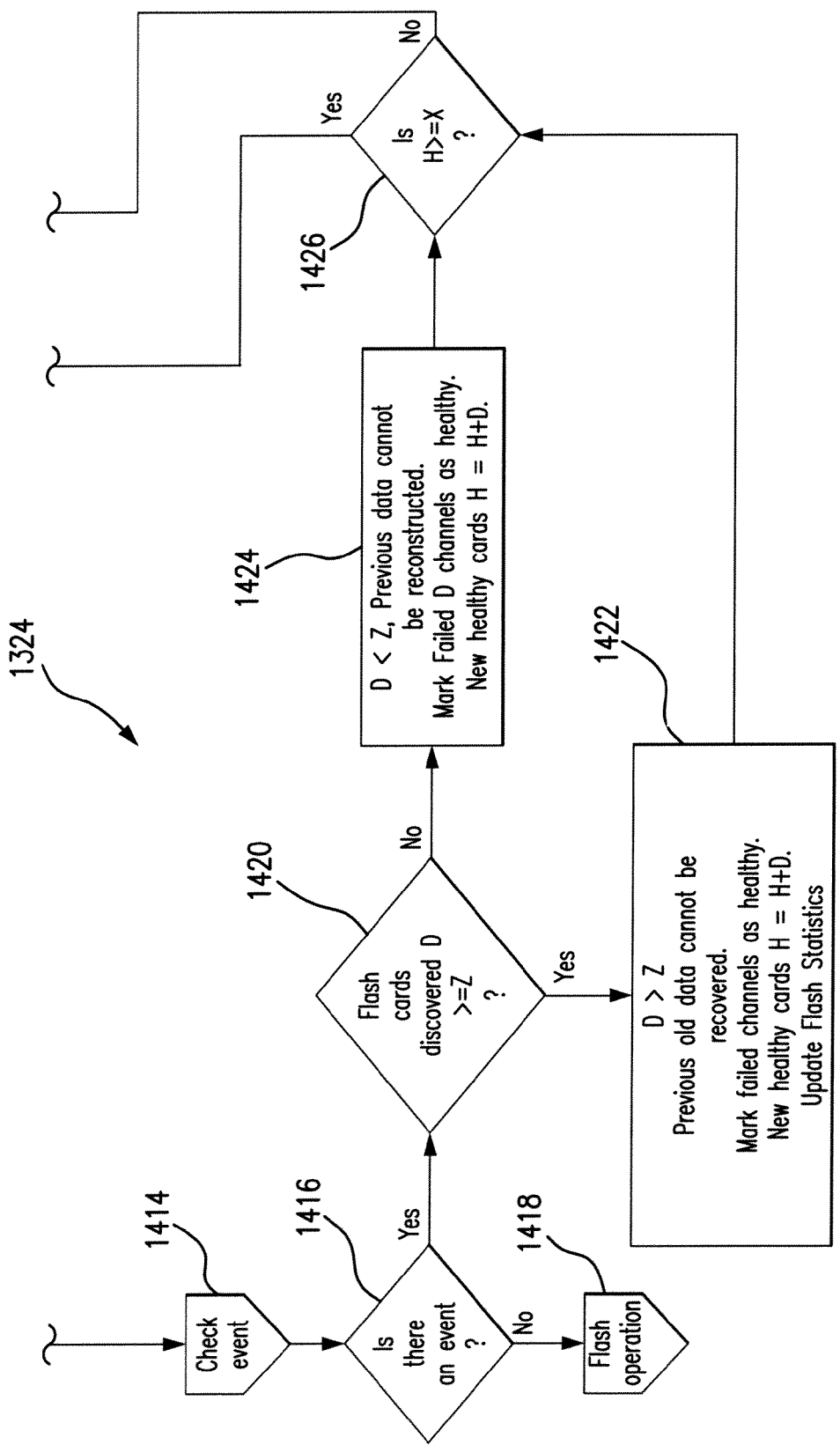

Referring to FIGS. 21A-21B detail the adaptive RAID stripe selection routine for flash card detection failure scenario for multi-channel failures for RAID 6 (D+$P_1$+$P_2$) configuration. The procedures starts in block 1400 to mark the channels as failed. The logic flows to the decision block 1402 to determine whether Z=2. If the number Z of the failed channels is larger than 2, the logic flows to block 1406 where the number of healthy cards is updated to H=H−Z and data on the failed channels cannot be reconstructed.

If, however, in block 1402, two channels have failed, data can be constructed for failed channels Z and the data are marked as high priority for flush. New healthy cards number H=H−Z. The logic adaptively selects RAID strip size for the RAID (H−2)+2 healthy components to protect new data.

The logic passes from the blocks 1404 and 1406 to the decision block 1408 to determine whether the new number of healthy cards meets the requirements of the minimum number of healthy cards. If the requirement is not met, the logic passes to block 1410 to switch the system offline. If, however, in block 1408, the minimum requirement for the healthy cards is met, the logic flows to block 1412 to adaptively select the RAID stripe size for RAID (H−2)+2 healthy components to protect new data. The flash statistics is updated, and the logic flows to block 1414 for the "check event" procedure detailed in FIG. 10.

From block 1414, the software follows to the decision block 1416 where the decision is made whether a new event has been detected in the check event procedure. If the event has not been detected, the logic flows to block 1418 to resume the normal flash node operation. If, however, in block 1416, the new event has been detected, the logic flows to the decision block 1420 to determine whether the number D of the discovered flash cards exceeds or is equal to the number of the D failed channels. If D is larger or equal than Z, the logic flows to block 1422, the failed channels are marked as healthy, and the flash statistics is updated. In this situation, previous old data cannot be recovered. New number H of the healthy cards in H=H+D. From block 1422, the logic flows to the decision block 1426 to determine whether the new number of the healthy cards H meets the minimum requirement for healthy cards predefined for the system.

If D is smaller than Z, the previous data cannot be reconstructed. In this case the failed data D channels are marked as healthy in block 1424, where new healthy cards number H=H+D. From block 1424, the procedure follows to block 1426 to determine whether the minimum number of healthy cards requirement is met. If in block 1426, the minimum requirements are not met, the logic flows to block 1428 to update flash statistics, and further to block 1410 to switch the system offline for the system administrator intervention.

If however, in the decision block 1426, the logic determines that the minimum requirement is met, the procedure passes to block 1412 to adaptively select the RAID stripe size for RAID (H−2)+2 health components to protect new data. The flash statistics is updated.

The system and method for data migration between computer cluster architectures (computer nodes, client nodes, file servers) and data storage devices in the form of the RAID storages, as described in previous paragraphs, permits aggregation and organization of the data transfers to the RAID storage in a manner that is most efficient for the target storage devices independent of the highly randomized input/output activity of the computer cluster architectures due to inclusion of the intermediate data migration handling system between the data generating entity and data storage disks. The intermediate data migration handing system includes an intermediate data storage module and a data controller module controlling the data migration through the intermediate data storage module.

The attained bandwidth maximization, target storage power consumption minimization, due to exploitation of the target storage devices in the most optimal manner, is combined in the present system with data reliability and integrity which are attained due to the capability of the subject system of performing RAID calculations over the random data egressed from the high speed computer nodes before storing the data.

The RAID protection provided in the present system complimented with adaptive RAID stripe selection results in a high tolerance to failure and preserves the computer nodes' data integrity. The RAID calculations are performed on all ingress data from the computer nodes into the intermediate data storage module, and are used on the egress data from the intermediate data storage module to the target storage for data reconstruction and data integrity checking. The adaptive selection of the maximum RAID stripe size supported by "healthy" storage component (DDN cards, Flash Memory cards, flash cells) available in the intermediate data storage module during boot-up and runtime of the system, ensures data reliability in real time.

Although this invention has been described in connection with specific forms and embodiments thereof, it will be appreciated that various modifications other than those discussed above may be resorted to without departing from the spirit or scope of the invention as defined in the appended claims. For example, equivalent elements may be substituted for those specifically shown and described, certain features may be used independently of other features, and in certain cases, particular applications of elements may be reversed or interposed, all without departing from the spirit or scope of the invention as defined in the appended claims.

What is claimed is:

1. A system for data migration between at least one data generating entity and at least one array of data storage units, wherein said at least one array of data storage units is controlled by a storage controller, comprising:
   an intermediate data migration handling system installed between said at least one data generating entity and said at least one array of data storage units to decouple data transfers to said data storage units of said at least one array thereof from an input/output activity of said at least one data generating entity,
   said intermediate data migration handling system including:
   at least one intermediate data storage module operatively coupled to said at least one data generating entity to store data received therefrom,
   a plurality of data storage entities associated with said at least one intermediate data storage module,
   at least one data migration controller module operatively coupled between said at least one intermediate data storage module and said at least one array of data storage units to control data transfers therebetween,
   a virtualized Redundant Array of Independent Disks (RAID) unit residing in said at least one data migration controller module operatively coupled to said intermediate data storage module, wherein said RAID unit is configured to apply RAID calculations to data ingress from said at least one data generating entity prior to writing said data in said intermediate data storage module, said RAID calculations including data RAID striping across said plurality of data storage entities associated with said at least one intermediate data storage module, and
   an adaptive RAID stripe selection unit operatively coupled to said RAID unit and configured to adaptively select a RAID stripe size depending on availability of healthy data storage entities from said plurality thereof.

2. The system of claim 1, wherein said at least one data migration controller module includes said storage controller of said at least one array of data storage units and a data storage management unit operatively coupled to said at least one intermediate data storage module and said storage controller to generate requests for data transfers between said at least one intermediate data storage module and at least one designated data storage unit of said at least one array of data storage units in a transfer mode substantially independent of the input/output activity of said at least one data generating entity based on predetermined conditions of said intermediate data migration handling system and said at least one array of data storage units.

3. The system of claim 1, wherein said adaptive RAID stripe selection unit operates in accordance with a failure tolerance level pre-configured for said RAID unit.

4. The system of claim 2, wherein said plurality of data storage entities include at least one data storage entity selected from a group consisting of at least one data storage card housed in said at least one intermediate data storage module, at least one flash memory card residing on said at least one data storage card, and at least one memory cell residing on said at least one flash memory card.

5. The system of claim 1, wherein said adaptive RAID stripe selection unit monitors, in real time, an availability status of at least one of said plurality of data storage entities and adaptively changes the size of a respective RAID stripe in accordance with a number H of healthy data storage entities capable of supporting the RAID striping of said data ingress from said at least one data generating entity, where said H≥X, and wherein X is a minimum number of healthy data storage entities predefined for the RAID unit.

6. The system of claim 4, wherein said at least one intermediate data storage module includes a storage modular enclosure, and wherein a plurality of data storage cards are housed in said storage modular enclosure, said intermediate data storage module further including:
at least one front end interface coupling a respective at least one of said plurality of data storage cards to said at least one data generating entity, and
at least one back end interface coupling said respective at least one data storage card to said at least one data migration controller module.

7. The system of claim 6, wherein said at least one front end interface and said at least one back end interface support a data transfer protocol selected from a group consisting of: Fibre Channel (FC), Infiniband (IB), PCIe and Ethernet protocols.

8. The system of claim 7, wherein each of said plurality of data storage cards includes a Dynamic Random Access Memory (DRAM) block and a Flash Memory Unit, including a Non-Volatile Random Access Memory (NVRAM) block composed of a plurality of flash memory cards, said DRAM block being operatively coupled between said at least one data generating entity and said NVRAM block, and wherein the data is stored in said NVRAM block or read therefrom through said DRAM block in accordance with a request received at said DRAM block from said at least one data generating entity.

9. The system of claim 8, further comprising a Field-Programmable Gate Array (FPGA) Controller residing on each of said plurality of data storage cards and operatively coupled to said at least one data generating entity through said at least one front end interface, said FPGA Controller including a Flash FPGA Controller Unit and a Redundant Arrays of Independent Disks (RAID) FPGA Controller unit, wherein said Flash FPGA Controller unit is operatively coupled between said at least one data generating entity and said Flash Memory Unit, and wherein said RAID FPGA Controller is operatively coupled between said at least one data generating entity and said DRAM block.

10. The system of claim 9, wherein said Flash FPGA Controller Unit includes, at a front end thereof, a first PCIe Interface Unit coupled to said at least one front end interface of said at least one data storage card, a Flash Control block operatively coupled to said Flash Memory Unit, at an input thereof, a first Work Order Interface Unit coupled, at an input thereof, to said first PCIe interface unit and, at an output thereof, to said Flash Control block to command the data flow to/from said Flash Memory Unit, as requested by said at least one data generating entity.

11. The system of claim 10, wherein said RAID FPGA Controller Unit includes, at a front end thereof, a second PCIe interface unit coupled to said at least one front end interface of said at least one data storage card, an RAID operation block operatively coupled to said DRAM, and a second Work Order Interface Unit operatively coupled between said second PCIe interface unit and said RAID operation block to command the data flow to/from said DRAM, as requested by said at least one data generating entity.

12. The system of claim 11, wherein said RAID operation block includes Parity/Data Generation Unit, RAID memory, and a Scatter/Gather Pointer List,
wherein RAID Parity Data are written from said Parity/Data Generation Unit into said DRAM as instructed by said second Work Order Interface Unit,
wherein data read from said DRAM are transferred to said Flash Control block via said first and second PCIe interfaces upon a request issued by said Flash Control Unit,
wherein data are striped across a plurality of Flash memory cards in said Flash memory block,
wherein said Scatter/Gather Pointer List is placed into said DRAM to define how to reconstruct fragmented data in said DRAM, and
wherein said RAID operation block locates and processes said RAID Parity data in said DRAM as specified by said Scatter/Gather Pointer List.

13. The system of claim 8, wherein said at least one data migration controller module further includes a controller modular enclosure, said data storage management unit and said storage controller being housed in said controller modular enclosure, wherein said data storage management unit is operatively coupled to said intermediate data storage module and is configured to control data writing in said intermediate data storage module and data flushing therefrom.

14. The system of claim 8, wherein said virtualized RAID unit maintains, in real time, a search information on the data saved in said Flash Memory Unit.

15. The system of claim 13, wherein said data migration controller module further includes a timer unit coupled to said data storage management unit, said timer unit determining an elapsed time since a previous data transfer from said at least one data generating entity, and wherein said data storage management unit issues a data flushing command from said intermediate data storage module upon receipt of a signal from said timer unit.

16. The system of claim 8, wherein said virtualized RAID unit generates parity value for said data, allocates space in said DRAM block for data D values and parity P values, and performs said data RAID striping prior to storing said data into said Flash Memory Unit.

17. The system of claim 14, wherein said virtualized RAID unit further comprises a data reconstruction unit, said data reconstruction unit retrieves redundant data stored in said Flash Memory Unit using said search information, and applies said redundant data to repair corrupted data or to replace lost data in said intermediate data storage module.

18. The system of claim 1, wherein said at least one array of data storage units has an RAID storage structure, and wherein said virtualized RAID unit corresponds to said RAID storage structure.

19. The system of claim 1, further configured to operate in a pass-through mode, wherein said at least one data migration controller module is configured to pass data output from said at least one data generating entity directly to at least one designated data storage unit of said at least one array of data storage units under predetermined conditions.

20. The system of claim 8, wherein said system further includes a metadata unit, and wherein said data storage management unit dynamically maintains information in said metadata unit current with said data stored in said flash memory unit, on a status on said plurality storage entities, and adaptive changes of said RAID striping in real time.

21. A method for data migration between at least one data generating entity and a plurality of data storage units, comprising the steps of:
(a) operatively coupling an intermediate data storage module to said at least one data generating entity, and providing a plurality of data storage entities in said intermediate data storage module, (b) operatively coupling at least one data migration controller module between said intermediate data storage module and said plurality of data storage units, said at least one data migration controller module including a data storage management unit and a storage controller for said plurality of data storage units, (c) operatively coupling a virtualized Redundant Array of Independent Disks (RAID) unit to said at least one data migration controller module, (d) operatively coupling a virtualized adaptive RAID stripe selection unit to said virtualized RAID unit, (e) sending a "write" request from said at least one data generating entity to said intermediate data storage module during an Input/Output (I/O) cycle of said at least one data generating entity, (f) generating, at said data storage management unit, at least one parity value P for data D, (g) discovering available healthy data storage entities from said plurality thereof, (h) determining whether a number H of the healthy data storage entities meets a requirement of a predefined minimum number X of healthy data storage entities, (i) selecting, at said virtualized adaptive RAID stripe selection unit, a maximum size of a respective RAID stripe supported by said H of the discovered healthy data storage entities, and (j) RAID striping said data D and at least one parity value P across said H healthy data storage entities in accordance with said selected size of said respective RAID stripe.

22. The method of claim 21, further comprising the steps of:
after said step (j),
upon meeting predetermined conditions, building, at said data storage management unit, a command for a most efficient data transfer from said intermediate data storage module to said plurality of data storage units,
sending, from said data storage management unit, another "write" request to said storage controller of a target data storage unit, and
flushing said data D from said intermediate data storage module to said target data storage unit of said plurality thereof upon receipt of permitting signal from said storage controller.

23. The method of claim 21, further comprising the steps of: pre-configuring said RAID unit to a failure tolerance level, and selecting the size of said respective RAID stripe in accordance thereto.

24. The method of claim 23, wherein said plurality of data storage entities include at least one data storage entity selected from a group consisting of: at least one data storage card housed in said intermediate data storage module, at least one flash memory card residing on said at least one data storage card, and at least one memory cell residing on said at least one flash memory card.

25. The method of claim 24, further comprising the steps of:
monitoring, in real time, an availability status of said plurality of data storage entities, and
adaptively changing the size of said respective RAID stripe accordingly.

26. The method of claim 25, further comprising the step of:
maintaining, in real time, metadata information in accordance with the changes in a status of said data storage entities, and dynamic changes of the size of said respective RAID stripes.

27. The method of claim 24, further comprising the steps of:
upon detection of a single channel failure due to at least one said data storage card failure, protecting "write" requests from said at least one data generating entity by RAID D+P scheme,
decreasing the size of said respective RAID stripe by 1, and,
upon "read" command, using said decreased RAID stripe in data reconstruction.

28. The method of claim 24, further comprising the steps of:
upon detection of a multi-channel failure due to a failure of F data storage cards or flash memory cards, where F is an integer, marking the data priorly stored at the failed F data storage cards or flash memory cards unavailable, and
selecting a RAID stripe size corresponding to H=H−F available healthy data storage entities for RAID protection of new ingress data.

29. The method of claim 24, further comprising the steps of:
upon detection of a flash memory card failure, RAID protecting a new data by adaptively selecting the size of a decreased RAID stripe corresponding to H=H−P flash memory cards,
replacing the failed flash memory card,
upon "read" command, using said decreased RAID stripe in data reconstruction, and
marking reconstructed data with high priority for flush to the data storage units.

30. The method of claim 24, further comprising the steps of:
upon detection of a flash cell on a respective flash memory card failure, selecting another flash cell on said respective flash memory card to form said respective RAID stripe,
marking said respective flash memory card as failed if no spare healthy flash cells are available, and
adaptively changing the size of said respective RAID stripe to H−1.

31. The method of claim 24, further comprising the steps of:
upon detection of failure F flash cells on a respective flash memory card, where F is an integer, changing said respective RAID stripe size to a decreased RAID stripe corresponding to H=H−F if no spare healthy flash cells are available on said respective flash memory card, and
RAID protecting new ingress data by RAID D+P with said decreased RAID stripe.

32. The method of claim 24, further comprising the steps of:
upon failure of an F channels, selecting the size of said respective RAID stripe to be a decreased RAID stripe corresponding to H=H−F healthy data storage entities, where F is an integer, and
adaptively RAID protecting new ingress data by a data plus dual parity RAID configuration with said decreased RAID stripe as long as H−F≤X, where X is the minimum number of healthy data storage entities capable of supporting the data RAID striping.

33. The method of claim 21, further comprising the steps of:
prior to said step (f), performing an efficiency check by comparing a length of said "write" request to a predefined length for efficiency and checking an availability of memory space in said intermediate data storage module for said "write" request, searching said intermediate data storage module for matching request, and creating metadata entry, if memory space is available, and switching to a pass-through mode, thereby passing said "write" request directly to said storage controller of said plurality of data storage units, if memory space is not available, or if said "write" request is shorter then said predefined length for efficiency.

* * * * *